US006154753A

United States Patent [19]
McFarland

[11] Patent Number: 6,154,753
[45] Date of Patent: Nov. 28, 2000

[54] DOCUMENT MANAGEMENT SYSTEM AND METHOD FOR BUSINESS QUALITY MODELING

[75] Inventor: Jonna A. McFarland, Sterling, Va.

[73] Assignee: Cable & Wireless, Inc., Vienna, Va.

[21] Appl. No.: 08/710,106

[22] Filed: Sep. 12, 1996

Related U.S. Application Data

[60] Provisional application No. 60/003,793, Sep. 15, 1995, provisional application No. 60/004,149, Sep. 22, 1995, and provisional application No. 60/013,825, Mar. 21, 1996.

[51] Int. Cl.⁷ .................................................. G06F 17/21
[52] U.S. Cl. ............................................ 707/508; 707/530
[58] Field of Search .............................. 705/7; 395/678, 395/500; 706/47; 707/515, 516, 540, 507, 500, 505, 508, 530; 382/175

[56] References Cited

U.S. PATENT DOCUMENTS

| | | | |
|---|---|---|---|
| 4,823,303 | 4/1989 | Terasawa ................................ | 707/515 |
| 4,862,376 | 8/1989 | Ferriter et al. ...................... | 364/468.14 |
| 5,051,930 | 9/1991 | Kuwabara et al. ...................... | 707/516 |
| 5,228,100 | 7/1993 | Takeda et al. .......................... | 382/175 |
| 5,233,513 | 8/1993 | Doyle ......................................... | 705/7 |
| 5,267,155 | 11/1993 | Buchanan et al. ...................... | 707/540 |
| 5,404,509 | 4/1995 | Klein ....................................... | 707/101 |
| 5,459,865 | 10/1995 | Heninger et al. ....................... | 395/678 |
| 5,490,243 | 2/1996 | Millman et al. ........................ | 707/507 |
| 5,541,846 | 7/1996 | Secrest ................................ | 364/468.17 |
| 5,564,005 | 10/1996 | Weber et al. ........................... | 345/326 |
| 5,666,549 | 9/1997 | Tsuchiya et al. ....................... | 707/500 |
| 5,704,029 | 12/1997 | Wright, Jr. .............................. | 707/505 |
| 5,737,494 | 4/1998 | Guinta et al. ............................. | 706/47 |
| 5,737,581 | 4/1998 | Keane .................................... | 395/500 |

OTHER PUBLICATIONS

International Search Report.
Margaret Levine Young and David C. Kay. WordPerfect 6.1 for Windows for Dummies(TM) 2nd. (Foster City: IDG Books Worldwide, Inc. 1994) pp. 271–278, 86–89, 210 & 362, Jan. 1, 1994.

*Primary Examiner*—James R. Trammell
*Assistant Examiner*—John Leonard Young
*Attorney, Agent, or Firm*—Finnegan, Henderson, Farabow, Garrett & Dunner L.L.P.

[57] ABSTRACT

A computer implemented system and method and a computer readable medium for complying with the requirements of a quality standard known as ISO 9000. The areas covered include controlled documentation, training management, meetings and reports, process improvement requests, project management, and audit management. All controlled documents have a security and revision control portion that controls the access and approval capabilities of the documents. The system is form controlled. Certain individual fields of the forms require the entry of data, and field's control are controlled by certain fields of other forms, with the fields being updated by other fields in the system, operator entry of data, and a combination of control by both the system and operator entry. The system includes an ISO matrix relating each document to an ISO clause. The system has a controlling document for each delineated activity, and all other documents relating to such activity are linked as a child of the controlling document. An audit trail is created by storing and making available previous iterations of current documents as child documents, insuring that the first issue, subsequent changes to content, movement to draft status, reprieval, and reissue are available for auditing the activities of the business.

25 Claims, 92 Drawing Sheets

FIGURE 16-B-1-F-1
DOCUMENT - TEMPLATE
(SCREEN LAYOUT SHOWING FIELD NAMES
AND FIELD LABEL NAMES)

| DCRSECT |

DOCUMENT REFERENCE NUMBER | REFNO | DOCUMENT TITLE:
| DOCTITLE | REVISION LEVEL:| REVLVL |

RELATED ISO CLAUSE:| CLAUSE |

THE ISO CLAUSE FIELD IS A REQUIRED FIELD. IF YOU ARE UNSURE WHAT TO ENTER, CONTACT YOUR FACILITATOR

DOCUMENT OWNER TITLE (MAIN):| APPAUTH | DEPARTMENT | SUBCLASS | SECURITY CLASSIFICATION | SECLASS |

PLACE YOUR CURSOR IN THE ABOVE FIELDS AND PRESS ENTER, SELECT FROM THE LIST PROVIDED, OR ADD A NEW KEYWORD

DOCUMENT OWNER TITLE (JOINT, 1): | APPAUTH_1 |

PLACE YOUR CURSOR IN THE ABOVE FIELD AND PRESS ENTER, SELECT FROM THE LIST PROVIDED, OR ADD A NEW KEYWORD

DOCUMENT OWNER TITLE (JOINT, 2): | APPAUTH_2 |

PLACE YOUR CURSOR IN THE ABOVE FIELD AND PRESS ENTER, SELECT FROM THE LIST PROVIDED, OR ADD A NEW KEYWORD

COMMENTS: | COMMENTS |

TITLE: | SUBJECT |

ENTER THE TITLE OF YOUR DOCUMENT ONE SPACE TO THE RIGHT OF "DRAFT."

CATEGORY: | CATEGORIES |

*FIG. 12A*

| UNAPPROVE | CHANGE | REVISION | LEVEL | VIEW | MASTER | LIST |
|---|---|---|---|---|---|---|
| APPSECT | | | | | | |

REVIEWED BY: REVNAME

APPROVED BY(MAIN): APPNAME  POSITION: APPTITLE

APPROVED BY (JOINT, 1) : APPNAME_1 POSITION: APPTITLE_1

APPROVED BY (JOINT, 2) : APPNAME_2 POSITION: APPTITLE_2

DCRSECT_1

| APPROVE (MAIN) | APPROVE (JOINT, 1) | APPROVE (JOINT,2) |
|---|---|---|

EMPLREV

REVIEW ACKNOWLEDGEMENT

DOCBODY

---

PRINTED COPIES ARE UNCONTROLLED DOCUMENTS

CABLE & WIRELESS, INC.

PROCTITLE

BODY

IN THE EVENT THAT PRINTED COPIES ARE MADE, IT IS THE USER'S RESPONSIBILITY TO ENSURE THAT THEY ARE USING THE MOST CURRENT ISSUE OF THE DOCUMENT.

©COPYRIGHT 1994,1995 CABLE & WIRELESS, INC. ALL RIGHTS RESERVED.

---

HIDDEN FIELDS:

FIG. 12A CONT.

DOCUMENT
(SCREEN LAYOUT AS SHOWN IN THE EDIT MODE)

DOCUMENT CONTROL RECORD

DOCUMENT REFERENCE NUMBER: DOCUMENT TITLE: REVISION LEVEL: 1.0

DOCUMENT OWNER TITLE (MAIN): DEPARTMENT: SECURITY CLASSIFICATION: READ ONLY

DOCUMENT OWNER TITLE (JOINT, 1):

DOCUMENT OWNER TITLE (JOINT, 2):

COMMENTS:

TITLE:          DRAFT-

CATEGORY:

UNAPPROVE    CHANGE REVISION LEVEL   VIEW MASTER LIST

REVIEWED BY:
APPROVED BY (MAIN):   POSITION:   APPROVAL DATE:
APPROVED BY (JOINT, 1):  POSITION:   APPROVAL DATE:
APPROVED BY (JOINT, 2) : POSITION:  APPROVAL DATE:

DOCUMENT CONTROL RECORD

APPROVE  (MAIN) APPROVE (JOINT, 1)  APPROVE (JOINT, 2)

EMPLOYEE REVIEW

REVIEW ACKNOWLEDGMENT

---

PRINTED COPIES ARE UNCONTROLLED DOCUMENTS

CABLE & WIRELESS, INC.

DRAFT-

IN THE EVENT THAT PRINTED COPIES ARE MADE, IT IS THE USER'S RESPONSIBILITY TO ENSURE THAT THEY ARE USING THE MOST CURRENT ISSUE OF THE DOCUMENT.

COPYRIGHT 1994, 1995 CABLE & WIRELESS, INC. ALL RIGHTS RESERVED.

*FIG. 13*

FIGURE 16-B-1-F-1
MISSION CRITICAL PROCESS
(SCREEN LAYOUT SHOWING FIELD NAMES
AND FIELD LABEL NAMES)

DCRSECT

DOCUMENT REFERENCE NUMBER REFRO DOCUMENT TITLE:
DOCTITLE REVISION LEVEL: REVLVL

RELATED ISO CLAUSE: CLAUSE

THE ISO CLAUSE FIELD IS A REQUIRED FIELD. IF YOU ARE UNSURE WHAT TO ENTER, CONTACT YOUR FACILITATOR

DOCUMENT OWNER TITLE (MAIN): APPAUTH DEPARTMENT
SUBCLASS SECURITY CLASSIFICATION SECLASS

PLACE YOUR CURSOR IN THE ABOVE FIELDS AND PRESS ENTER, SELECT FROM THE LIST PROVIDED, OR ADD A NEW KEYWORD

DOCUMENT OWNER TITLE (JOINT 1): APPAUTH_1

PLACE YOUR CURSOR IN THE ABOVE FIELD AND PRESS ENTER, SELECT FROM THE LIST PROVIDED, OR ADD A NEW KEYWORD

DOCUMENT OWNER TITLE (JOINT 2): APPAUTH_2

PLACE YOUR CURSOR IN THE ABOVE FIELD AND PRESS ENTER, SELECT FROM THE LIST PROVIDED, OR ADD A NEW KEYWORD

COMMENTS: COMMENTS

TITLE: SUBJECT

ENTER THE TITLE OF YOUR DOCUMENT ONE SPACE TO THE RIGHT OF "DRAFT."

CATEGORY: CATEGORIES

PLACE YOUR CURSOR IN THE ABOVE FIELD AND PRESS ENTER, SELECT FROM THE LIST PROVIDED, OR ADD A NEW KEYWORD

PLACE YOUR CURSOR IN THE ABOVE FIELD AND PRESS ENTER, SELECT FROM THE LIST PROVIDED, OR ADD A NEW KEYWORD

*FIG. 15A*

| UNAPPROVE | CHANGE REVISION LEVEL | VIEW MASTER LIST |

APPSECT

REVIEWED BY: REVNAME

APPROVED BY(MAIN): APPNAME POSITION: APPTITLE

APPROVED BY (JOINT, 1) : APPNAME_1 POSITION: APPTITLE_1

APPROVED BY (JOINT, 2) : APPNAME_2 POSITION: APPTITLE_2

DCRSECT_1

| APPROVE (MAIN) | APPROVE (JOINT, 1) | APPROVE (JOINT, 2) |

EMPIREV

REVIEW ACKNOWLEDGEMENT

DOCBODY

PRINTED COPIES ARE UNCONTROLLED DOCUMENTS

*FIG. 15A (cont.)*

CABLE & WIRELESS, INC.

[ DEPT_1 ]

[ PROCTITLE ]

SHORT DESCRIPTION:

[ SHORTDES ] — 202

RECOVERABILITY:

| [RECVBL] 204 | EXPLANATION: [EXPLAIN] 206 | ACCEPTABLE OUTAGE INTERVAL: [AOINT] — 208 |

RELATED DOCUMENTS: [RELDOCS] — 214

HARDWARE REQUIREMENTS:     SOFTWARE REQUIREMENTS:
[HRDWREQ] — 212     [SFTWREQ]

GRAPHICS:

[ BODY ]

IN THE EVENT THAT PRINTED COPIES ARE MADE, IT IS THE USER'S RESPONSIBILITY TO ENSURE THAT THEY ARE USING THE MOST CURRENT ISSUE OF THE DOCUMENT.

© COPYRIGHT 1994, 1995 CABLE & WIRELESS, INC. ALL RIGHTS RESERVED.

HIDDEN FIELDS: [LAST EDITOR] [TIMES MODIFIED]

*FIG. 15B*

FIGURE 16-B-1-F-1
MISSION CRITICAL SYSTEM
(SCREEN LAYOUT SHOWING FIELD NAMES
AND FIELD LABEL NAMES)

DCRSECT

DOCUMENT REFERENCE NUMBER REFRO  DOCUMENT TITLE:
DOCTITLE REVISION LEVEL: REVLVL

RELATED ISO CLAUSE: CLAUSE

THE ISO CLAUSE FIELD IS A REQUIRED FIELD. IF YOU ARE UNSURE WHAT TO ENTER, CONTACT YOUR FACILITATOR

DOCUMENT OWNER TITLE (MAIN): APPAUTH DEPARTMENT SUBCLASS SECURITY CLASSIFICATION SECLASS

PLACE YOUR CURSOR IN THE ABOVE FIELDS AND PRESS ENTER, SELECT FROM THE LIST PROVIDED, OR ADD A NEW KEYWORD

DOCUMENT OWNER TITLE (JOINT 1): APPAUTH_1

DOCUMENT OWNER TITLE (JOINT 2): APPAUTH_2

PLACE YOUR CURSOR IN THE ABOVE FIELD AND PRESS ENTER, SELECT FROM THE LIST PROVIDED, OR ADD A NEW KEYWORD

PLACE YOUR CURSOR IN THE ABOVE FIELD AND PRESS ENTER, SELECT FROM THE
LIST PROVIDED, OR ADD A NEW KEYWORD

COMMENTS:   COMMENTS

TITLE:   SUBJECT

ENTER THE TITLE OF YOUR DOCUMENT ONE SPACE TO THE RIGHT OF "DRAFT."

CATEGORY:   CATEGORIES

PLACE YOUR CURSOR IN THE ABOVE FIELD AND PRESS ENTER, SELECT FROM THE LIST PROVIDED, OR ADD A NEW KEYWORD

PLACE YOUR CURSOR IN THE ABOVE FIELD AND PRESS ENTER, SELECT FROM THE LIST PROVIDED, OR ADD A NEW KEYWORD

*FIG. 15C*

| UNAPPROVE | CHANGE | REVISION | LEVEL | VIEW | MASTER | LIST |
|---|---|---|---|---|---|---|
| APPSECT | | | | | | |

REVIEWED BY: REVNAME
APPROVED BY(MAIN): APPNAME POSITION: APPTITLE
APPROVED BY (JOINT, 1): APPNAME POSITION: APPTITLE_1
APPROVED BY (JOINT, 2): APPNAME POSITION: APPTITLE_2

DCRSECT_1

APPROVE (MAIN)   APPROVE (JOINT, 1)   APPROVE (JOINT,2)

REVIEW ACKNOWLEDGEMENT

DOCBODY

PRINTED COPIES ARE UNCONTROLLED DOCUMENTS

*FIG. 15C (cont.)*

CABLE & WIRELESS, INC.

DEPT_1

PROCTITLE

SYSTEM DESCRIPTION:

SHORTDES

RECOVERABILITY:

| RECVBL | EXPLANATION: EXPLAIN | ACCEPTABLE OUTAGE INTERVAL: AOINT |
|---|---|---|

SUPPORTED PROCESSES: RELDOCS

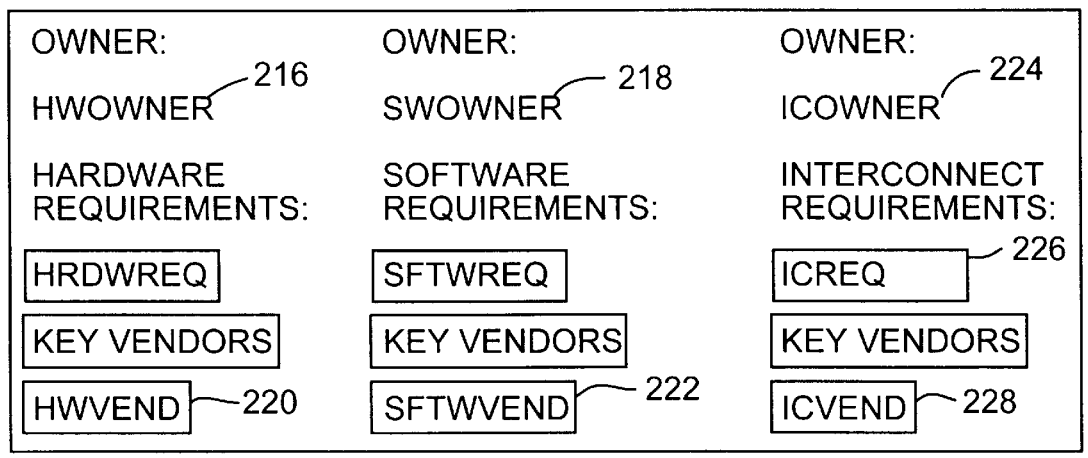

GRAPHICS:

BODY

IN THE EVENT THAT PRINTED COPIES ARE MADE. IT IS THE USERS RESPONSIBILITY TO ENSURE THAT THEY ARE USING THE MOST CURRENT ISSUE OF THE DOCUMENT.

© COPYRIGHT 1994,1995 CABLE & WIRELESS, INC. ALL RIGHTS RESERVED.

*FIG. 15D*

FIELD ACCESS CONTROL

THE FOLLOWING FORMS AND THEIR RELATED FIELDS RECEIVE ACCESS CONTROL FROM THE DCRSECT FIELD OF THE DOCUMENT FORM.

FORM: DOCUMENT
FIELDS: BODY

FORM: MISSION CRITICAL PROCESS
FIELDS: SHORTDES, RECVRBL, EXPLAIN, AOINT, RELDOCS, HRDWREQ, SFTWREQ, BODY

FORM: MISSION CRITICAL SYSTEM
FIELDS: SHORTDES, RECVRBL, EXPLAIN, AOINT, HWOWNER, HRDWREQ, HWVEND, SWOWNER, SFTWREQ, SWVEND, ICOWNER, ICREQ, ICVEND

FORM: PERSONNEL JOB DESCRIPTION
FIELDS: DATE, JTITLE, DPTNAME, STITLE, DPTNO, ESUPVS, EXNON, PURPOSE, JDUTIES, EFUNCTS, PREEXP, MINEDU, CWIDE, DIVWIDE, DPTWIDE, LIMITED, PRESCRIB, SOMEDEC, ANALYZE, ASSIGN, QUESSISS, BROADOBJ

FORM: PROCESS
FIELDS: SCOPE, FREQUENCY, PROCESS, WRKINSTRUCTIONS, LASTEDITOR, TIMESMODIFIED, IMODI

FORM: WORK INSTRUCTION
FIELDS: SCOPE, FREQUENCY, PROCESS, WRKINSTRUCTIONS, LAST EDITOR, TIMES MODIFIED, IMOD!!

FIG. 16D

PERSONNEL JOB DESCRIPTION FORM
REFERENCE FIGURE 5

[DCRSECT]

DOCUMENT REFERENCE NUMBER: [REFNO] DOCUMENT TITLE: [DOCTITLE]
REVISION LEVEL: [REVLVL]

RELATED ISO CLAUSE: [CLAUSE]

THE ISO CLAUSE FIELD IS A REQUIRED FIELD. IF YOU ARE UNSURE WHAT TO ENTER, CONTACT YOUR FACILITATOR

DOCUMENT OWNER TITLE (MAIN): [APPAUTH] DEPARTMENT [SUBCLASS]
SECURITY CLASSIFICATION [SECLASS]

PLACE YOUR CURSOR IN THE ABOVE FIELDS AND PRESS ENTER, SELECT FROM THE LIST PROVIDED, OR ADD A NEW KEYWORD

DOCUMENT OWNER TITLE (JOINT, 1): [APPAUTH_1]

PLACE YOUR CURSOR IN THE ABOVE FIELD AND PRESS ENTER, SELECT FROM THE LIST PROVIDED, OR ADD A NEW KEYWORD

DOCUMENT OWNER TITLE (JOINT, 2): [APPAUTH_2]

PLACE YOUR CURSOR IN THE ABOVE FIELD AND PRESS ENTER, SELECT FROM THE LIST PROVIDED, OR ADD A NEW KEYWORD

COMMENTS: [COMMENTS]

TITLE: [SUBJECT]

ENTER THE TITLE OF YOUR DOCUMENT ONE SPACE OF THE RIGHT OF "DRAFT."

CATEGORY: [CATEGORIES]

PLACE YOUR CURSOR IN THE ABOVE FIELD AND PRESS ENTER, SELECT FROM THE LIST PROVIDED, OR ADD A NEW KEYWORD

PLACE YOUR CURSOR IN THE ABOVE FIELD AND PRESS ENTER, SELECT FROM THE LIST PROVIDED, OR ADD A NEW KEYWORD

[UNAPPROVE] [CHANGE REVISION LEVEL] [VIEW MASTER LIST]
[APPSECT]

FIG. 18A

REVIEWED BY: [REVNAME]

APPROVED BY (MAIN): [APPNAME] POSITION [APPTITLE]

APPROVED BY (JOINT, 1) [APPNAME_1] POSITION [APPTITLE_1]

APPROVED BY (JOINT, 2) [APPNAME_2] POSITION [APPTITLE_2]

[DCRSECT_1]

[APPROVE (MAIN)] [APPROVE (JOINT, 1)] [APPROVED (JOINT, 2)]
[EMPLREV]
[REVIEW ACKNOWLEDGEMENT]
[DOCBODY]

---

PRINTED COPIES ARE UNCONTROLLED DOCUMENTS

DATE: [DATE] —234    JOB DESCRIPTION

JOB TITLE: [JTITLE] —238    DEPT. NAME: [DEPTNAME] —242

TITLE - SUPERVISOR: [STITLE] —238    DEPT #: [DPTNO] — 244

EMPLOYEE SUPERVISEE: [ESUPVS] — 240    EXEMPT/NON-EXEMPT: [EXNON] — 246

[PURPOSE] —247    PURPOSE OF JOB

[JDUTIES] —248    DUTIES OF JOB

ESSENTIAL FUNCTIONS:

[EFUNCTS] —250

MINIMUM PREVIOUS EXPERIENCE REQUIRED TO PERFORM THE JOB.

[PREEXP] —252

MINIMUM EDUCATION LEVEL REQUIRED TO PERFORM THE JOB

[MINEDU] —254

SCOPE OF DUTIES    EFFECTS OF DUTIES

*FIG. 18A (cont.)*

| | | | |
|---|---|---|---|
| COMPANY WIDE | [CWIDE] 256 | SIGNIFICANTLY/INFREQUENTLY REVIEWED | [SGINFRQREV] 257 |
| DIVISION WIDE | [DIVWIDE] 258 | REVIEWED OCCASIONALLY | [REVOCC] 259 |
| DEPARTMENT WIDE | [DPTWIDE] 260 | REVIEWED FREQUENTLY | [REVFREQ] 261 |
| LIMITED TO EMPLOYEE'S SPECIFIC JOB FUNCTION | [LIMITED] 262 | CLOSELY MONITORED | [CLMON] 263 |

<u>TO BE COMPLETED FOR THOSE WHO HAVE SUPERVISORY RESPONSIBILITY ONLY.</u>

PROCEDURES AND METHODS TO BE FOLLOWED ARE PRESCRIBED          [PRESCRIB] 264

STANDARD PROCEDURE AS ARE PRESCRIBED, BUT ALTERNATIVES ARE AVAILABLE AND SOME DECISIONS MADE.          [SOMEDOC] 266

MUST ANALYZE FACTS - DETERMINE ACTIONS WITH BROAD POLICY LIMITS          [ANALYZE] 268

<u>INDICATE LEVEL OF SUPERVISION WHICH BEST DESCRIBES SUPERVISOR'S DUTIES.</u>

ASSIGNMENTS REGULARLY CHECKED BY SUPERVISOR          [ASSIGN] 270

WORK PERFORMED UNDER STANDARD PROCEDURES - QUESTIONABLE ISSUES REFERRED TO SUPERVISOR          [QUESTIONS] 272

WORK PERFORMED UNDER BROAD OBJECTIVES - UNUSUAL ISSUES REFERRED TO SUPERVISOR          [BROADOBJ] 274

© COPYRIGHT 1994, 1995 CABLE & WIRELESS, INC. ALL RIGHTS RESERVED

*FIG. 18A (cont.)*

TRAINING LOG FORM

NAME OF STUDENT: GEORGE STEPHENS, JR.
CHARGEABLE COST CENTER:
CURRENT SUPERVISOR: JONNA MCFARLAND

| CLASS OR PROCESS | COMPLETION DATE (MM-DD-YY): |
|---|---|
| ○ PROCESS<br>○ INTERNAL CLASS<br>○ EXTERNAL CLASS | |

| ACTION PLAN | STATUS: ○ ACCOUNTABLE<br>○ PROFICIENT<br>○ EXPERT |
|---|---|
| | LEGEND:<br>ACCOUNTABLE - HAS BEEN TRAINED<br>PROFICIENT - USES SKILLS SUCCESSFULLY IN JOB<br>EXPERT: CAN TRAIN OTHERS PROPERLY |

COMMENTS:

[EDIT TRAINING LOG] [SAVE CHANGES]

USER TIP:
BE SURE TO FILL IN THE GROUP.
(POSITION THE CURSOR IN THE GROUP FIELD AND PRESS ENTER. SELECT A GROUP ENTRY FROM LIST PROVIDED OR ENTER A NEW GROUP NAME IN THE SPACE PROVIDED).

*FIG. 18B*

TRAINING MANAGEMENT CONTROL RECORD

NAME:    DEPARTMENT:    COST CENTER:

CURRENT SUPERVISOR:

| ? EMPLOYER ? | SAVE CHANGES | LOG COMPOUND TRAINING | ????? |

FIG. 18C

CABLE & WIRELESS
EMPLOYEE DEVELOPMENT PLANNING
STRATEGY & ANALYSIS

DEVELOPMENT PLAN FOR YEAR:
MCFARLAND

EMPLOYEE: GEORGE STEPHENS, JR.

CURRENT SUPERVISOR: JONNA

3 YEAR CAREER GOAL:

PLANNED DEVELOPMENT ACTIVITIES:

| CLASS, SEMINAR, OR PROJECT TITLE | DEVELOPMENT PURPOSE |
|---|---|
|  |  |
|  |  |
|  |  |
|  |  |
|  |  |
|  |  |
|  |  |
|  |  |

EMPLOYEE COMMENTS:

MANAGER'S COMMENTS:

FIG. 18D

PROCESS FORM
REFERENCE FIGURE 6

[DCRSECT]
DOCUMENT REFERENCE NUMBER: [REFNO]   DOCUMENT TITLE: [DOCTITLE]
REVISION LEVEL: [REVLVL]

RELATED ISO CLAUSE: [CLAUSE]
THE ISO CLAUSE FIELD IS A REQUIRED FIELD. IF YOU ARE UNSURE WHAT TO ENTER, CONTACT YOUR FACILITATOR

DOCUMENT OWNER TITLE (MAIN): [APPAUTH]   DEPARTMENT: [SUBCLASS]
SECURITY CLASSIFICATION: [SECLASS]

PLACE YOUR CURSOR IN THE ABOVE FIELDS AND PRESS ENTER, SELECT FROM THE LIST PROVIDED, OR ADD A NEW KEYWORD

DOCUMENT OWNER TITLE (JOINT, 1):   [APPAUTH_1]
PLACE YOUR CURSOR IN THE ABOVE FIELD AND PRESS ENTER, SELECT FROM THE LIST PROVIDED, OR ADD A NEW KEYWORD

DOCUMENT OWNER TITLE (JOINT, 2):   [APPAUTH_2]
PLACE YOUR CURSOR IN THE ABOVE FIELD AND PRESS ENTER, SELECT FROM THE LIST PROVIDED, OR ADD A NEW KEYWORD

COMMENTS:   [COMMENTS]

TITLE:   [SUBJECT]

ENTER THE TITLE OF YOUR DOCUMENT ONE SPACE TO THE RIGHT OF "DRAFT."

CATEGORY:   [CATEGORIES]

PLACE YOUR CURSOR IN THE ABOVE FIELD AND PRESS ENTER, SELECT FROM THE LIST PROVIDED, OR ADD A NEW KEYWORD

PLACE YOUR CURSOR IN THE ABOVE FIELD AND PRESS ENTER, SELECT FROM THE LIST PROVIDED, OR ADD A NEW KEYWORD

[UNAPPROVE] [CHANGE REVISION LEVEL] [VIEW MASTER LIST]

[APPSECT]
REVIEWED BY: [REVNAME]
APPROVED BY (MAIN): [APPNAME]        POSITION:   [APPTITLE]
APPROVED BY (JOINT, 1): [APPNAME_1]  POSITION:   [APPTITLE_1]
APPROVED BY (JOINT, 2): [APPNAME_2]  POSITION:   [APPTITLE_2]
[DCRSECT_1]

*FIG. 20*

[APPROVE (MAIN)] [APPROVE (JOINT, 1)] [APPROVE (JOINT, 2)]
[EMPIREV]
[REVIEW ACKNOWLEDGEMENT]
[DOCBODY]

---

PRINTED COPIES ARE UNCONTROLLED DOCUMENTS

CABLE & WIRELESS, INC.

[PROCTITLE]

1.0 SCOPE

[SCOPE] 278

2.0 FREQUENCY

[FREQUENCY] 276

3.0 PROCESS

[PROCESS] 280

4.0 RELATED WORK INSTRUCTIONS

[WRKINSTRUCTIONS] 282

©COPYRIGHT 1994, 1995 CABLE & WIRELESS, INC. ALL RIGHTS RESERVED

---

HIDDEN FIELDS | LAST EDITOR | TIMES MODIFIED | IMODI

*FIG. 20 (cont.)*

WORK INSTRUCTION FORM
REFERENCE FIGURE 7

[DCRSECT]

DOCUMENT REFERENCE NUMBER: [REFNO] DOCUMENT TITLE: [DOCTITLE]
REVISION LEVEL: [REVLVL]

RELATED ISO CLAUSE: [CLAUSE]

THE ISO CLAUSE FIELD IS A REQUIRED FIELD. IF YOU ARE UNSURE WHAT TO ENTER, CONTACT YOUR FACILITATOR

DOCUMENT OWNER TITLE (MAIN): [APPAUTH] DEPARTMENT: [SUBCLASS]
SECURITY CLASSIFICATION: [SECLASS]

PLACE YOUR CURSOR IN THE ABOVE FIELDS AND PRESS ENTER, SELECT FROM THE LIST PROVIDED, OR ADD A NEW KEYWORD

DOCUMENT OWNER TITLE (JOINT, 1): [APPAUTH_1]

PLACE YOUR CURSOR IN THE ABOVE FIELD AND PRESS ENTER, SELECT FROM THE LIST PROVIDED, OR ADD A NEW KEYWORD

DOCUMENT OWNER TITLE (JOINT, 2): [APPAUTH_2]

PLACE YOUR CURSOR IN THE ABOVE FIELD AND PRESS ENTER, SELECT FROM THE LIST PROVIDED, OR ADD A NEW KEYWORD

COMMENTS: [COMMENTS]

TITLE: [SUBJECT]

ENTER THE TITLE OF YOUR DOCUMENT ONE SPACE TO THE RIGHT OF "DRAFT."

CATEGORY: [CATEGORIES]

PLACE YOUR CURSOR IN THE ABOVE FIELD AND PRESS ENTER, SELECT FROM THE LIST PROVIDED, OR ADD A NEW KEYWORD

PLACE YOUR CURSOR IN THE ABOVE FIELD AND PRESS ENTER, SELECT FROM THE LIST PROVIDED, OR ADD A NEW KEYWORD

AUTHOR: [AUTHOR]    DATE: [DATE]
[UNAPPROVE] [CHANGE REVISION LEVEL] [VIEW MASTER LIST]
[APPSECT]

*FIG. 22*

REVIEWED BY: [REVNAME]
APPROVED BY (MAIN): [APPNAME]    POSITION: [APPTITLE]
APPROVED BY (JOINT, 1) [APPNAME_1]    POSITION: [APPTITLE_1]
APPROVED BY (JOINT, 2) [APPNAME_2]    POSITION: [APPTITLE_2]
[DCRSECT_1]
[APPROVE (MAIN)] [APPROVE (JOINT,1)] [APPROVE (JOINT, 2)]
[EMPIREV]
[REVIEW ACKNOWLEDGEMENT]
[DOCBODY]

---

PRINTED COPIES ARE UNCONTROLLED DOCUMENTS

CABLE & WIRELESS, INC.
[PROCTITLE]

1.0 PURPOSE
   [SCOPE]

2.0 FREQUENCY
   [FREQUENCY]

3.0 TASK
   [PROCESS]

4.0 RECORDS
   [WRKINSTRUCTIONS]

©COPYRIGHT 1994, 1995 CABLE & WIRELESS, INC. ALL RIGHTS RESERVED

---

HIDDEN FIELDS: [LAST EDITOR] [TIMES MODIFIED] [IMODI]

*FIG. 22 (cont.)*

MEETING AGENDA
(SCREEN LAYOUT SHOWING FIELD NAMES AND FIELD LABEL NAMES)

DEPT.: [DEPARTMENT] /311

MEETING TITLE: [MGTTL] /312

AUTHOR: [AUTHOR] /308

---

PRINTED DOCUMENTS ARE UNCONTROLLED COPIES

CABLE & WIRELESS, INC.
[TITLE_1]

MEETING DATE: [DATE]

AGENDA

INVITEES: [EMPLOYEE] /314

GENERAL BUSINESS:

[MISCEL]
314
COMMENTS:
[COMMENTS]

UPDATE /VIEW ACTION ITEMS

IT IS THE RESPONSIBILITY OF THE USER TO ENSURE THAT THEY ARE USING THE LATEST VERSION OF THIS DOCUMENT.

COPYRIGHT 1994, 1995 CABLE & WIRELESS, INC. ALL RIGHTS RESERVED

*FIG. 26*

MEETING AGENDA
(SCREEN LAYOUT AS SHOWN IN THE EDIT MODE)

DEPT.:

PRINTED DOCUMENTS ARE UNCONTROLLED COPIES

CABLE & WIRELESS, INC.

MEETING DATE:
AGENDA:

INVITEES:

GENERAL BUSINESS:

COMMENTS:

COPYRIGHT 1994, 1995 CABLE & WIRELESS, INC. ALL RIGHTS RESERVED.

FIG. 27

(SCREEN LAYOUT SHOWING FIELD NAMES AND FIELD LABEL NAMES)

DEPARTMENT  TREVAUTH

DATE ENTERED INTO LOG: TUDAY —332  ASSIGNED TO: EMPLOYEE

| ACTION ITEM: | ACTEM —323 | DUE DATE (MM-DD-YY): | APDATE —330 |
| --- | --- | --- | --- |
| ACTION PLAN | ACTPLN —324 | STATUS: | ASTAT —340 |
| COMMENTS: | COMMENTS —328 | DEPT.: | DEPT —330 |

○ EDIT ACTION ITEM    SAVE CHANGES

○ ASSIGN ACTION ITEM    CREATE NEW ACTION ITEM

INSTRUCTIONS
BE SURE TO FILL IN THE DEPT.
(TIP: POSITION THE CURSOR IN THE FIELD AND PRESS ENTER. SELECT DEPARTMENT FROM LIST PROVIDED.)

COPYRIGHT 1994, 1995 CABLE & WIRELESS, INC. ALL RIGHTS RESERVED.

*FIG. 30*

(SCREEN LAYOUT AS SHOWN IN THE EDIT MODE)

DATE ENTERED INTO LOG: 09/19/95    ASSIGNED TO:

| ACTION ITEM: | DUE DATE (MM-DD-YY): 10/19/95 |
|---|---|
| | STATUS: ○ CLOSED / ● DUE / ○ OVERDUE  — 344 |
| ACTION PLAN: | DEPT.: |
| COMMENTS: | |

EDIT ACTION ITEM   SAVE CHANGES
ASSIGN ACTION ITEM   CREATE NEW ACTION ITEM

INSTRUCTIONS
BE SURE TO FILL IN THE DEPT.
(TIP: POSITION THE CURSOR IN THE FIELD AND PRESS ENTER. SELECT DEPARTMENT FROM LIST PROVIDED.)

© COPYRIGHT 1994, 1995 CABLE & WIRELESS, INC. ALL RIGHTS RESERVED.

*FIG. 31*

COMPLAINT FORM
(SCREEN LAYOUT SHOWING FIELD LABELS AND FIELD NAMES)

PRINTED DOCUMENTS ARE UNCONTROLLED COPIES

OPERATOR: [OPERATOR]　　DATE: [DATE]　　MODIFIED: [LEDATE]

CABLE & WIRELESS, INC.
CUSTOMER COMPLAINT FORM

CALLER NAME: [CALLNAME]　　CALL BACK TELEPHONE NUMBER　([AC])-[NXX]-[STANO]
　　　　　　　　　　　　356　　　　　　　　　　　　　　　　　　　　　　356
STATUS: [ASTAT]
　　　　　　358
TITLE: [CALLTTL]
　　　　　　356
COMPANY NAME: [CONAME]

DEPT. RECEIVING COMPLAINT: [DEPARTMENT]　　DUE DATE: [APDATE]
　　　　　　　　　　　　　　　　　　　　　　　　　　　　　　　　　359
TYPE OF COMPLALINT: [COMPTYPE]
　　　　　　　　　　　　360

DESCRIPTION OF COMPLAINT/INQUIRY: [KISSUES]
　　　　　　　　　　　　　　　　　　　　356
NOTIFICATION

RESOLUTION ASSIGNED TO: [EMPLOYEE]
　　　　　　　　　　　　　　　　356
RESOLUTION: [ACTEM]
　　　　　　　　356　　362

| FOLLOW-UP: | [FUTYPE] |
| [FUDATE] | -364 |
| COMMENTS | [FUCOMMENTS] |

FIG. 33

(SCREEN LAYOUT AS SHOWN IN THE EDIT MODE)
PRINTED DOCUMENTS ARE UNCONTROLLED COPIES
CABLE & WIRELESS, INC.
CUSTOMER COMPLAINT FORM

CALLER NAME:   CALL BACK TELEPHONE NUMBER. ()   STATUS:   ☐ OPEN
☐ RESOLVED
☐ CLOSED

TITLE:
COMPANY NAME:

DEPT. RECEIVING COMPLAINT:   DUE DATE: 10/19/95   TYPE OF COMPLAINT:

☐ COURTESY
☐ RESPONSIVENESS
☐ SERVICE QUALITY
☐ BILLING INQUIRY
☐ ORDER INQUIRY
☐ INTERNAL
☐ OTHER

DESCRIPTION OF COMPLAINT/INQUIRY:

NOTIFICATION

RRESOLUTION ASSIGNED TO:

RESOLUTION:

| FOLLOW-UP 09/28/95 | ○ ONCE |
| | ○ WEEKLY FOR 2 WEEKS |
| | ○ WEEKLY FOR A MONTH |
| | ○ WEEKLY - UNTIL SATISFIED |
| COMMENTS | |

© COPYRIGHT 1994, 1995 CABLE & WIRELESS, INC. ALL RIGHTS RESERVED.

*FIG. 34*

MEETING MINUTES FROM
(SCREEN LAYOUT SHOWING FIELD LABELS AND NAMES)

DEPT.: [ DEPARTMENT ]—376

MEETING TITLE: [ MGTTL ]—378

AUTHOR: [ AUTHOR ]—370

---

PRINTED DOCUMENTS ARE UNCONTROLLED COPIES

CABLE & WIRELESS, INC.

[ TITLE_1 ]—371

MEETING DATE: [ DATE ]

KEY ISSUES: [ KISSUES ]—382

ATTENDEES: [ EMPLOYEE ]—380

GENERAL BUSINESS:

[ MISCEL ]—382

NEW ACTION ITEMS: (CLICK ON BUTTONS BELOW TO REVIEW OR UPDATE ACTION ITEM LOG)

[ AITEMS ]
                  — 382
COMMENTS:

[ COMMENTS ]

—384
LOG ACTION ITEM   UPDATE/VIEW ACTION ITEMS

IT IS THE RESPONSIBILITY OF THE USER TO ENSURE THAT THEY ARE USING THE LATEST VERSION OF THIS DOCUMENT.

COPYRIGHT 1994, 1996 CABLE & WIRLESS, INC. ALL RIGHTS RESERVED.

*FIG. 36*

MEETING MINUTES FORM
(SCREEN LAYOUT AS SHOWN IN THE EDIT MODE)

PRINTED DOCUMENTS ARE UNCONTROLLED COPIES

CABLE & WIRELESS, INC.
MEETING DATE:

KEY ISSUES:

ATTENDEES:

GENERAL BUSINESS:

NEW ACTION ITEMS: (CLICK ON BUTTONS BELOW TO REVIEW OR UPDATE ACTION ITEM LOG)

COMMENTS:

COPYRIGHT 1994, 1996 CABLE & WIRLESS, INC. ALL RIGHTS RESERVED.

*FIG. 37*

MONTHLY REPORTS FORM
(SCREEN LAYOUT SHOWING FIELD LABELS AND FIELD NAMES)

MONTHLY REPORT
GENERIC TEXT WITH GRAPHICS

DEPT.: | DEPARTMENT |
AUTHOR: | AUTHOR |

PRINTED DOCUMENTS ARE UNCONTROLLED COPIES

CABLE & WIRELESS, INC.

| DEPARTMENT_1 |

MONTHLY REPORT
FOR THE MONTH OF | DATE |

KEY ISSUES: | KISSUES |

CRITICAL SUCCESS FACTORS:

| CRITFAC |

PROCESS IMPROVEMENTS:

| IMP |

REVERSE TRENDS

| REVTRND |

PROCESS MANAGEMENT ISSUES:

| QAISSUES |

RESOURCES & PERSONNEL:

| RESOURCES |

CUSTOMER CONCERNS & INQUIRIES (INTERNAL & EXTERNAL):

| COMPLAINTS |

*FIG. 39*

MONTHLY REPORTS

GENERAL BUSINESS:

| MISCEL |

COMMENTS

| COMMENTS |

UPDATE/VIEW ACTION ITEMS

IT IS THE RESPONSIBILITLY OF THE USER TO ENSURE THAT THEY ARE USING THE LATEST VERSION OF THIS DOCUMENT.

COPYRIGHT 1994, 1996 CABLE & WIRELESS, INC. ALL RIGHTS RESERVED.

*FIG. 39 (cont.)*

MONTHLY REPORT FORM
(SCREEN LAYOUT AS SHOWN IN THE EDIT MODE)

PRINTED DOCUMENTS ARE UNCONTROLLED COPIES

CABLE & WIRELESS, INC.
MONTHLY REPORT
FOR THE MONTH OF 08/95

KEY ISSUES:

CRITICAL SUCCESS FACTORS:

PROCESS IMPROVEMENTS:

REVERSE TRENDS:

PROCESS MANAGEMENT ISSUES:

RESOURCE & PERSONNEL:

CUSTOMER CONCERNS & INQUIRIES (INTERNAL & EXTERNAL):

GENERAL BUSINESS:

COMMENTS:

© COPYRIGHT 1994, 1996 CABLE & WIRELESS, INC.
ALL RIGHTS RESERVED.

FIG. 40

PROJECT PLANNING DOCUMENT
(SCREEN LAYOUT SHOWING FIELD NAMES, FIELD LABEL NAMES & BUTTON NAMES)

 
SAVE   MODIFY PLANNING DOCUMENT

PROCESS ENGINEERING
PROJECT PLANNING DOCUMENT
STRATEGY & ANALYSIS

PROJECT TITLE: [PROJTITLE]~44    TARGET DATE: [TARGDATE]~448

SELECT PROJECT OWNER            OWNER: [PROJOWNER]~458

DEPARTMENT: [DEPT]~438

SELECT STEERING COMMITTEE       STEERING COMMITTEE: [STEERCOM]~454

SELECT PROJECT TEAM LEADER      TEAM LEADER: [PROJLEAD]~446

SELECT PROJECT TEAM             TEAM: [PROJTEAM]~442

SELECT REVIEW AUTHORITY         REVIEW AUTHORITY: [PROJREVIEW]~452

SELECT PROJECT APPROVAL AUTHORITY APPROVAL AUTHORITY: [PROJAPP]~444

    
CREATE TASKS   REVIEW TASKS BY ASSIGNMENT   LOG PROJECT   RELATED ISSUE

COPYRIGHT 1994, 1995 CABLE & WIRELESS, INC. ALL RIGHTS RESERVED.

*FIG. 45*

PROJECT ISSUE FORM
(SCREEN LAYOUT SHOWING FIELD NAMES, FIELD LABEL NAMES & BUTTON NAME)

| DISPLAYSUBJECT |―460

KEY THOUGHT: | SUBJECT |―456

AUTHOR: | FROM |―462     DATE: | DATE |―464

| BODY |―458

GENERATE RESPONSE ○―466

COPYRIGHT 1994, 1995 CABLE & WIRELESS, INC. ALL RIGHTS RESERVED.

*FIG. 47*

PROJECT TASK FORM
(SCREEN LAYOUT SHOWING FIELD NAMES, FIELD LABEL NAMES & BUTTON NAMES)

PROJECT TASK
PROJECT PLANNING DOCUMENT
STRATEGY & ANALYSIS

⚠️?

DEPT.: [DEPT] ─470    PROJECT: [PROJTITLE] ─486

TASK START DATE: [TASKSTART] ─476    TASK DUE DATE: [TASKDATE] ─476

ASSIGNED TO: [EMPLOYEE] ─478

| TASK: [PTASK] ─478<br><br>SAVE | STATUS: [PSTAT] ─480 |
|---|---|
| BUTTON ZONE<br>　EDIT TASK DOCUMENT ─482<br>　CREATE NEW TASK ─458<br>　VIEW TIMELINE ─492<br>　ASSIGN TASK ─484<br>　LOG TASK RELATED ISSUE ─490 | REVIEW AUTHORITY<br>[TREVAUTH]<br>474 |

©COPYRIGHT 1994, 1995 CABLE & WIRELESS, INC. ALL RIGHTS RESERVED.

*FIG. 49*

PROJECT TASK FORM
(SCREEN LAYOUT AS SHOWN IN THE EDIT MODE)
PROJECT TASK
PROJECT PLANNING DOCUMENT
STRATEGY & ANALYSIS

DEPT: DATABASE ADMINISTRATION

PROJECT: CALLING CARD II/PERSONAL OFFICE UPGRADES

TASK START DATE: 09/18/95   TASK DUE DATE:

ASSIGNED TO: TBD

| TASK: FRO: PLATFORM SUPPORTS CALLING CARD II.<br><br>SAVE | STATUS:<br>⊙ OPEN<br>○ REVISION<br>○ CLOSED<br>○ COMPLETED<br>○ UNASSIGNED |
|---|---|
| BUTTON ZONE<br>    EDIT TASK DOCUMENT<br>    CREATE NEW TASK<br>    VIEW TIMELINE<br>    ASSIGN TASK<br>    LOG TASK RELATED ISSUE | REVIEW AUTHORITY<br>ROBERT DOWNER/CABLE &<br>WIRELESS - USA |

©COPYRIGHT 1994, 1995 CABLE & WIRLESS, INC. ALL RIGHTS RESERVED.

FIG. 50

PROCREQ — 528

SAVE — 554    EDIT IMPROVEMENT REQUEST — 552

PROCESS IMPROVEMENT REQUEST

TOPIC: PROJTITLE — 538    REQUEST DATE: TARGDATE — 530    STATUS: PSTAT — 540

AFFECTED ORGANIZATION(S): PROJOWNER — 542    RESPONSE DUE DATE: RESPDUE — 532

AUTHOR: PROJLEAD — 534    REVIEW AUTHORITY: PROJREVIEW — 544

EXPLANATION: PROJTEAM — 544

A RESPONSE WILL BE ENTERED INTO THE SYSTEM WITHIN 30 DAYS.

NOTIFICATION — 550

EVALREQ — 536

ASSIGNED FOR RESEARCH: EMPLOYEE — 546

APPROVAL AUTHORITY: PROJAPP — 538

ASSIGN FOR RESEARCH — 548    REVIEW REQUESTS BY ASSIGNMENT    LOG REQUEST RESPONSE — 556

© COPYRIGHT 1994, 1995 CABLE & WIRELESS, INC. ALL RIGHTS RESERVED.

*FIG. 58*

IMPROVEMENT REQUEST ENTRY

SAVE   EDIT IMPROVEMENT REQUEST
  ＼554      ＼552

PROCESS IMPROVEMENT REQUEST

TOPIC:    REQUEST DATE: 10/10/95 09:26:22 PM   STATUS: ○ OPEN
                                                    ○ CLOSED
                                               540

AFFECTED ORGANIZATION(S):

RESPONSE DUE DATE: 11/09/95 08:26:22 PM

AUTHOR: ELMER REINHARDT/CABLE & WIRELESS - USA

REVIEW AUTHORITY:

EXPLANATION:

A RESPONSE WILL BE ENTERED INTO THE SYSTEM WITHIN 30 DAYS.

NOTIFICATION — 550

MANAGEMENT REQUEST EVALUATION

ASSIGNED FOR RESEARCH:
APPROVAL AUTHORITY:
                   — 548
ASSIGN FOR RESEARCH   REVIEW REQUESTS BY ASSIGNMENT
LOG REQUEST RESPONSE

©COPYRIGHT 1994, 1995 CABLE & WIRELESS, INC.
   ALL RIGHTS RESERVED.

*FIG. 59*

DISPLAYSUBJECT ⌐558

KEY THOUGHT: SUBJECT ⌐566

AUTHOR: FROM ⌐560           DATE: DATE ⌐562

BODY

GENERATE RESPONSE ⌐570

©COPYRIGHT 1994, 1995 CABLE & WIRELESS, INC.
ALL RIGHTS RESERVED.

HIDDEN FIELDS: ORIGINALSUBJECT

*FIG. 60*

CABLE & WIRELESS
AUDIT PLANNING & CONTROL DOCUMENT
AUDIT STATUS: [ASTAT]

| SCHEDULED AUDIT DATE (MM-DD-YY) [APDATE] AUDIT COMPLETE DATE (MM-DD-YY) [COMPDATE] ~624 | DEPT: [DEPARTMENT] 620 MGR: [MGRNAME] PHONE: [MGRPHN] SCOPE: [ASCOPE] 622 TYPE: [ATYPE] AUDITORS: [EMPLOYEE] PHONE: [ADTPHN] COMPANY: [ADTCO] | ENTER THE NUMBER OF OBSERVATIONS: [OBS] ENTER THE NUMBER OF NONCOMPLIANCES:[MNCS] ENTER THE NUMBER OF NONCOMPLIANCES:[MINCS] |
|---|---|---|
| AUDITOR'S COMMENTS: | [ACOMMENTS] | ENTER THE DOCUMENTS TO REVIEW: [DOCS] ENTER THE CHECKLISTS TO GENERATE: [CHKLST] ENTER THE CORRECTIVE ACTIONS TO VERIFY FROM PREVIOUS AUDIT: [VERCA] |
| MANAGER'S COMMENTS: | [MCOMMENTS] | FOLLOW-UP AUDIT DATE FOR THIS AUDIT: [FUAUDIT] |

BUTTON ZONE:

*FIG. 65*

ENTER A NONCOMPLIANCE   VIEW NON-COMPLIANCE LIST

ENTER AN OBSERVATION

GENERATE A CHECKLIST

©COPYRIGHT 1994, 1995 CABLE & WIRELESS, INC. ALL RIGHTS RESERVED.

IT IS THE RESPONSIBILITY OF THE USER TO ENSURE THAT THEY ARE USING THE LATEST VERSION OF THIS DOCUMENT.

*FIG. 65 (cont.)*

CABLE & WIRELESS
INTERNAL AUDITOR ELIGIBILITY FORM

NAME: [EMPLOYEE]   CURRENT DEPT.: [DEPARTMENT]   ISO TRAINING: [ISOTRN]

EXTENSION: [IAEXT]   COUNTRY: [COUNTRY]

MANAGER: [MANAGER]   MANAGER'S EXTENSION: [MGREXT]

*FIG. 67*

CABLE & WIRELESS
INTERNAL AUDITOR ELIGIBILITY FORM

NAME: CURRENT DEPT.: ISO TRAINING:
- ☐ ISO AWARENESS SEMINAR
- ☐ INTERNAL AUDITING FOR AN ISO 9000 SYSTEM
- ☐ ISO 9000 LEAD ASSESSOR CLASS/EXAM

EXTENSION: COUNTRY:

MANAGER: MANAGER'S EXTENSION:

*FIG. 68*

DOCUMENT MANAGEMENT SYSTEM AND METHOD FOR BUSINESS QUALITY MODELING

This application claims the benefit of (1) Provisional Application No. 60/003,793 entitled "Management System and Process" filed on Sep. 15, 1995 in the U.S. Patent and Trademark Office, (2) Provisional Application No. 60/004,149 entitled "Management System and Process" filed on Sep. 22, 1995 in the U.S. Patent and Trademark Office, and (3) Provisional Application No. 60/013,825 entitled "Management System" filed on Mar. 21, 1996 in the U.S. Patent and Trademark Office. The contents of the aforesaid three provisional applications are incorporated by reference and relied upon.

BACKGROUND OF THE INVENTION

1. Field of the Invention

The present invention relates to methods and systems for meeting quality standards; and more particularly, to a computer readable medium and a computer implemented system and method that enables an organization to carry on its business activities in accordance with the requirements of quality standards.

The present invention is useful for every type of business organization. However, it is particularly suited to the service aspects of a manufacturing organization or a service organization per se, and will be described in that connection.

Although the invention is important for insuring high quality process management as desired or practiced by many business organizations, or as defined by many quality control and standards organizations, it is particularly useful for complying with the applicable worldwide standards of the International Organization for Standards (ISO) and the corresponding quality standards of the American National Standards Institute, (ANSI) and being certified thereby. Thus, the present invention will be described in connection with an organizations compliance with the requirements of the applicable standards known as ISO 9000, the corresponding ASQC orf ANSI, known as Q9000, and other quality standards having similar requirements, all of which are hereafter referred to collectively as ISO 9000.

2. Description of Related Art

Customer certification of a supplier, which usually consists of an audit that insures that the supplier is complying with the terms of a contract, can become a burdensome and expensive on going task for both the supplier and the customer. Third party certification, on the other hand, may demonstrate compliance with a specifically selected quality system. In this type of certification, typically, a neutral third party examines the particular quality system of the supplier, and issues a written certification directed to that particular system. Certain companies may go through the motions of compliance with a quality standard in order to get the certificate, without actually improving quality. This, of course, can undermine the confidence of a customer not only in the publicized standard, but also in the capabilities of the supplier as well.

By complying with one or more of the applicable family of ISO standards. Suppliers are able to obtain the confidence of their customers, without the necessity of following many different quality control processes required by different customers, The International Organization for Standardization (ISO) based in Geneva, Switzerland which has published international standards for quality management known as "ISO 9000" is the world leader for developing standards. Many companies in North America, particularly those which are interested in the global market place have adopted these standards. Additionally, the American National Standards Institute has adopted the ISO 9000 as national standard Q9000. The U.S. Department of Defense, one of the largest single consumers of goods and services developed procurement policies based on the ISO 9000. Similarly, organizations in Canada, Europe, and the Asian countries, such as Japan, China, Taiwan, Korea, and Hong Kong, for example, comply with these standards. The ISO 9004-2 standards of the ISO family of standards applies particularly to service organizations.

In order for a company to prove compliance with one or more of the ISO standards, it must be the subject of continuing audits. ISO 9000, for example, has a self auditing requirement. as well as a system for certification. Such certification is typically performed by a registered third party organization, recognized by an ISO accredited governing body. Specific requirements of the applicable ISO and ANSI standards are set forth in a publication ANSI/ASQC Q9001-1994 in an article entitled "Quality Systems-Model For Quality Assurance In Design, Development, Production, Installation And Servicing" copyrighted in 1994 by ASQC of Milwaukee, Wis., which publication is incorporated by reference.

According to ISO standards, the foundation of a quality system is its documentation, i.e., the manuals, procedures, work instructions, quality plans and quality records. The documents correspond to executive management, middle management, and work management, and the processes by which products or services are produced.

A quality manual defines the goals and objectives, the organizational structure, and the integration of the ISO 9000 and Q9001 requirements. The procedures are reference documents that explain the flow of the company's processes. The work instructions detail the elementary tasks and operations of each activity within the company. Quality plans define the quality requirements for the various products and activities. Quality records are documents that preserve pertinent information of activities carried out or results obtained.

The ISO standards require that all processes materially affecting the quality of the product or service must be documented. For example, in accordance with section 4.5 of the referenced publication, it is important to establish the company's internal guidelines detailing the rules for documentation, i.e., the drafting, management approval, verification, modification, and distribution of the documents. All documents must be numbered and presented in a preliminary version. Also, their contents must be approved before utilization and distribution. Invalid and obsolete documents must be promptly removed from all points of issue to prevent inadvertent use. There must also be a master list of documents, wherein the status and revision history must be readily available. Finally, there must be an audit trail of all documents. The appropriate personnel, of course, must then do what is written. Additionally, training must be provided each time a new document is approved. Documents must be configured with precision for the personnel that use them. Documents must be accessible to all affected personnel, at all necessary points of usage.

According to Section 4.17 a quality coordinator is required to conduct internal audits to verify and improve the implementation of the documents. According to Section 4.1.3 of the referenced publication, executive management is required to conduct regular reviews to ensure that the quality system is running smoothly. entation of the documents. Also, as required by Section 4.14, corrective or preventative action must be taken for meeting quality objectives. Once a quality system is running, the company can call a certification body for an external audit.

After the company applies for an external audit, the certification process includes a documentation review and a conformity audit. For the documentation review, the registrar verifies that the quality documentation complies with all the requirements of the standard. Following the documentation review, the company must take into account non-conformities and put in place corrective actions, so that the documentation complies with the requirements of the certification body.

From the foregoing, it is readily apparent that organizations encounter many problems in attempting to comply with the requirements of ISO 9000, the solutions to which are costly, time consuming, and requires extensive training of the personnel implementing such standards. For example, prior to the present invention, paper based electronic systems were used that not only required hard copy for performing audit trails, but also required different attestations and certifications by the personnel involved. Often additional personnel were required to administer the quqlity documentation. Also, it was difficult to make all relevant documentation available at all required work stations, as well as collecting and disposing of documentation that had become obsolete. There was also difficulty in circulating draft documents and revisions for review and approval prior to issue. It was also difficult to maintain manually a readily available up to date document master list as required by the certification body. Inordinate effort was heretofore required in quantifying the capabilities and proficiencies of sets of skills gained by employees, except through on the job training. Lastly, it is difficult to ensure timely completion, responsibility and accountabilities for action items, as well as identify the authority or the meetings which generated them.

In light of the foregoing there is a need for a method and system which permits the personnel of an organization to comply with the requirements of ISO 9000, and which overcomes one or more of the shortcomings and deficiencies of the related art.

SUMMARY OF THE INVENTION

Accordingly, the present invention is directed to a computer implemented system and method and a computer readable medium configured to substantially obviate one or more of the problems in complying with the requirements of ISO 9000 and corresponding standard requirements.

Additional features and advantages of the invention will be set forth in the description which follows, and in part will be apparent from the description, or may be learned by practice of the invention. The objectives and other advantages of the invention will be realized and attained by the apparatus and process particularly pointed out in written description and claims hereof as well as the appended drawings.

To achieve these and other advantages and in accordance with the purpose of the invention as embodied and broadly described, the invention is directed to a computer readable medium having a program for establishing and maintaining documented procedures to control all documents and data to demonstrate conformance to specified requirements and the effective operation of a quality system including procedures for planning and implementing internal quality audits including a plurality of stored forms to create documents related to different activities by entering data in arranged fields of the forms. The computer readable medium includes program instructions configured: to create a first document by entering data in a plurality of fields of a corresponding one of the plurality of forms, to store the created first document, to record the status of the first document, to display the first document to permit an operator to edit data in a first portion of the plurality of fields of the first document to create a current document, to maintain data contained in a second portion of the plurality of fields of the first document in corresponding fields of the created current document to complete the current document, to store the completed current document, to link the stored first document to the stored current document as a child of the current document, update the status of the first and current documents, to indicate the storage of the first document upon a subsequent display of the current document to maintain an audit trail that includes a previous view of the current document.

In another aspect, the invention is directed to a computer implemented method for establishing and maintaining documented procedures to control all documents, data, and records to demonstrate conformance to specified requirements and the effective operation of the quality system including procedures for planning and implementing internal quality audits, including storing a plurality of forms, displaying one of the plurality of stored forms, entering data in arranged fields on one of the stored forms to create a first document, displaying one of the plurality of stored forms, entering data in a plurality of fields of the displayed form to create a first document, storing the first document and listing the status of the first document in computer memory, displaying the first document, entering data in a first portion of the fields of the first document and maintaining data populating a second portion of the fields to create a current document, storing the current document, linking the first document to the current document as a child of the current document, updating the status of the first and current documents, and indicating the storage of the first document upon subsequent display of the current document to maintain an audit trail that includes a previous view of the current document.

The foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiment of the invention and together with the description serve to explain the principles of the invention.

BRIEF DESCRIPTION OF THE DRAWINGS

FIG. 12 is a screen layout of the document of FIG. 11 showing field names and field label names and incorporating the present invention;

FIG. 13 is a screen layout of the form of FIG. 12 as shown in the edit mode and incorporating the present invention;

FIGS. 15A and 15B are screen layouts showing field names and field label names for the chart of FIG. 14A incorporating the present invention;

FIGS. 15C and 15D are screen layouts showing field names and field label names of the chart of FIG. 14B incorporating the present invention;

FIG. 16D is a chart listing the fields and documents controlled by the field "docbody" in accordance with the present invention;

FIG. 18A is a screen layout showing field names and field label names for the form of FIG. 17 incorporating the present invention;

FIG. 18B, 18C, and 18D are screen layouts of a "Training Log" form, a "Training Management Control Record", and an "Employee Development Plan" form incorporating the present invention;

FIG. 20 is a screen layout showing field names and field label names for the form of FIG. 19 incorporating the present invention;

FIG. 22 is a screen layout showing field names and field label names for the form of FIG. 21 incorporating the present invention;

FIG. 26 is a screen layout showing field names and field label names for the form of FIG. 25 incorporating the present invention;

FIG. 27 is a screen layout as shown in the edit mode of the "Meeting genda" form incorporating the present invention;

FIG. 30 is a screen layout showing field names and field label names for the form of FIG. 29 incorporating the present invention;

FIG. 31 is a screen layout for the form "Action Item" in the edit mode incorporating the present invention;

FIG. 33 is a screen layout showing field names and field label names for the "Complaint" form of FIG. 32 incorporating the present invention;

FIG. 34 is a screen layout of the "Complaint" form in the edit mode incorporating the present invention;

FIG. 36 is a screen layout showing field labels and field names of the "Meeting Minutes" form of FIG. 35 incorporating the present invention;

FIG. 37 is a screen layout of the form of FIG. 35 in the edit mode incorporating the present invention;

FIG. 39 is a screen layout showing the field labels and field names for the "Monthly Reports" form incorporating the present invention;

FIG. 40 is a screen layout of the form of FIG. 39 in the edit mode incorporating the present invention;

FIG. 45 is a screen layout showing the field names, field label names and button names of the project planning document incorporating the present invention;

FIG. 47 is a screen layout of the "Project Issue" form;

FIG. 49 is a screen layout showing field names, field label names, and button names for "Project Task", "Project Planning Document" and "Strategy and Analysis" forms incorporating the present invention;

FIG. 50 is the screen layout for the forms of FIG. 49 in the edit mode incorporating the present invention;

FIG. 58 is a screen layout showing the field names, field label names, and button names of the "Process Improvement Request" form incorporating the present invention;

FIG. 59 is a screen layout of the "Process Improvement Request" form in the edit mode incorporating the present invention;

FIG. 60 is a screen layout showing the field names, field label names, and button names of the "Request Response" form incorporating the present invention;

FIG. 65 is a screen layout showing the field names, field label names, and button names for "Audit Planning and Control Document" form incorporating the present invention;

FIG. 67 is a screen layout showing field names and field label names of the "Internal Auditor Eligibility" form incorporating the present invention;

FIG. 68 is a screen layout of the form of FIG. 67 in the edit mode incorporating the present invention;

DESCRIPTION OF PREFERRED EMBODIMENT

In implementing the present invention, any well known platform may be used that provides the necessary commands and building blocks to permit the user to develop forms and manipulate data. In the preferred implementation of the invention, a well known software platform was used, entitled Lotus Notes, which is a registered trademark of Lotus Development Corporation. However, any platform may be used which has code permitting the creation of the system, apparatus, and method of the present invention.

Each of said plurality of database structures includes a plurality of forms and views, each said forms include fields and buttons, and each said views being a display of specific fields from selected forms grouped according to selection criteria in response to instructions from any one or more of the plurality of database structures. Each of the buttons include formulas linked to selected forms and views and fields, said formulas being activated by clicking thereon. Selected ones of the fields have formulas associated therewith, which are activated in response to either program instructions saving the associated form or responsive to program instructions executed by entered information in associated said fields. The program instructions further prevent retention of a partially completed document at times when required information is not entered in the document.

The Figures in the Description Of The Drawings which illustrate screen layouts with field names. are pre-formatted forms which are seen by the programmer or any other person interested in learning the manner in which the system is configured. In the description of the present invention, documents are completed forms. Views are categorized lists of documents, and each field constitutes a category of text or graphics. A formula as defined herein is a combination of building blocks and commands in a specific way to perform a particular task. In one preferred implementation, databases are used, which reside in a server to be accessible by designated members of an organization. The present invention also may be in the form of a medium that is computer readable, such as a hard or floppy disk, a CD-ROM, a magnetic tape, or computer memory, for example.

In accordance with the present invention, the records support objective evidence that (1) certain actions actually occurred, (2) expected results were achieved, and (3) the intent and purpose of the controlling document was actually carried out. In the present invention, all controlling documents are produced prior to the activity they are controlling, with the exception of the meeting minutes, which are produced after the meeting. In the preferred implementation, shared databases are sometimes used, which are contained in a server to be accessible by designated members of an organization.

Figure 1:
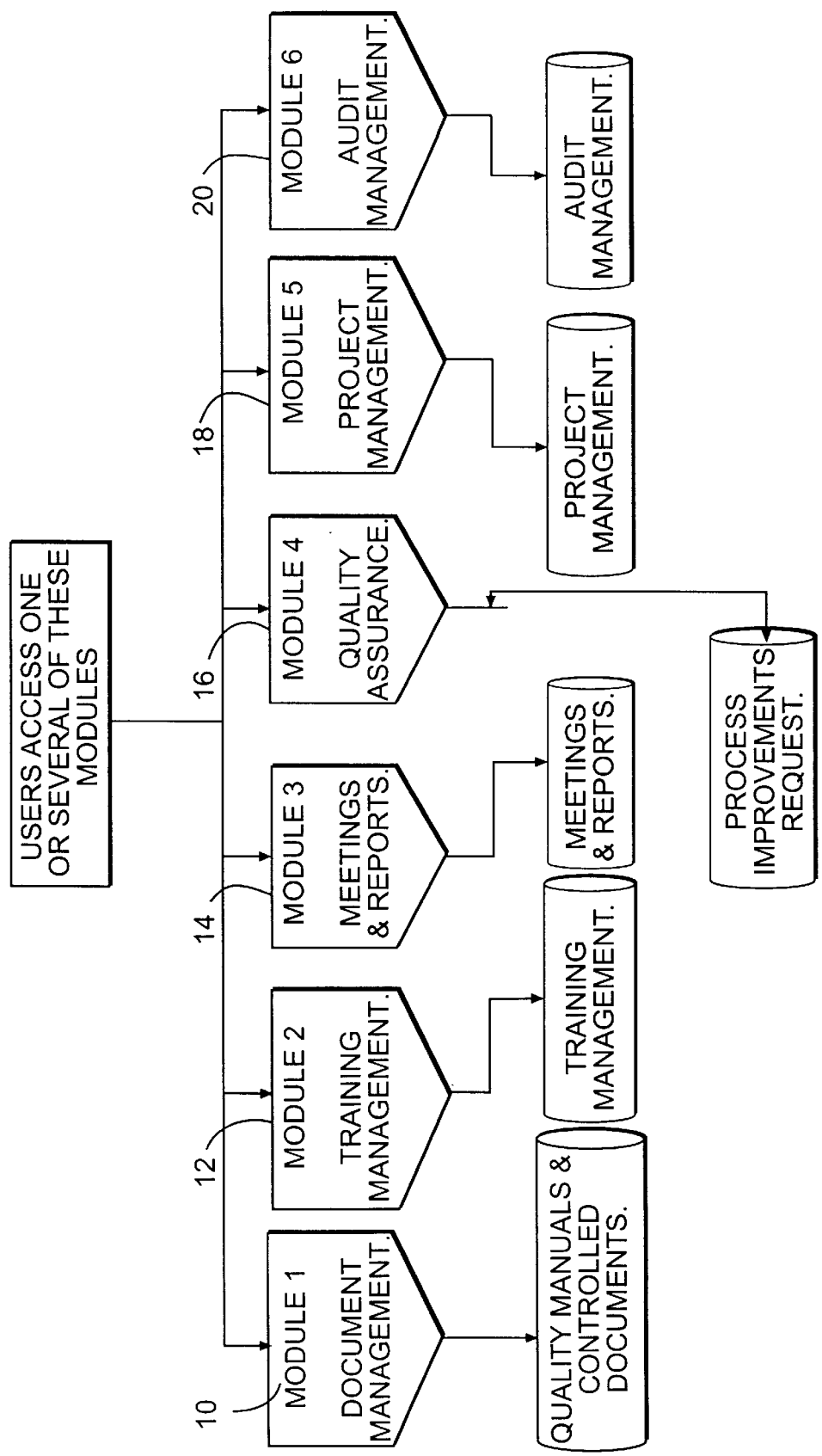
FIG. 1 is a relational block diagram of the modules and databases used in the system and method of the present invention.

As herein embodied and referring to FIG. 1, the system and process of the present invention comprises a plurality of individual modules including a document management module 10, a training management module 12, meetings and reports module 14, quality assurance module 16, project management module 18, and an audit management module. Each one of the modules has one or more databases.

The document management module has a single database, namely quality manual and controlled documents. The training management module and the meetings and report documents constitutes only one database, while the quality assurance module has a process improvements requests database. The project management and audit management modules each have one database.

Figure 2:
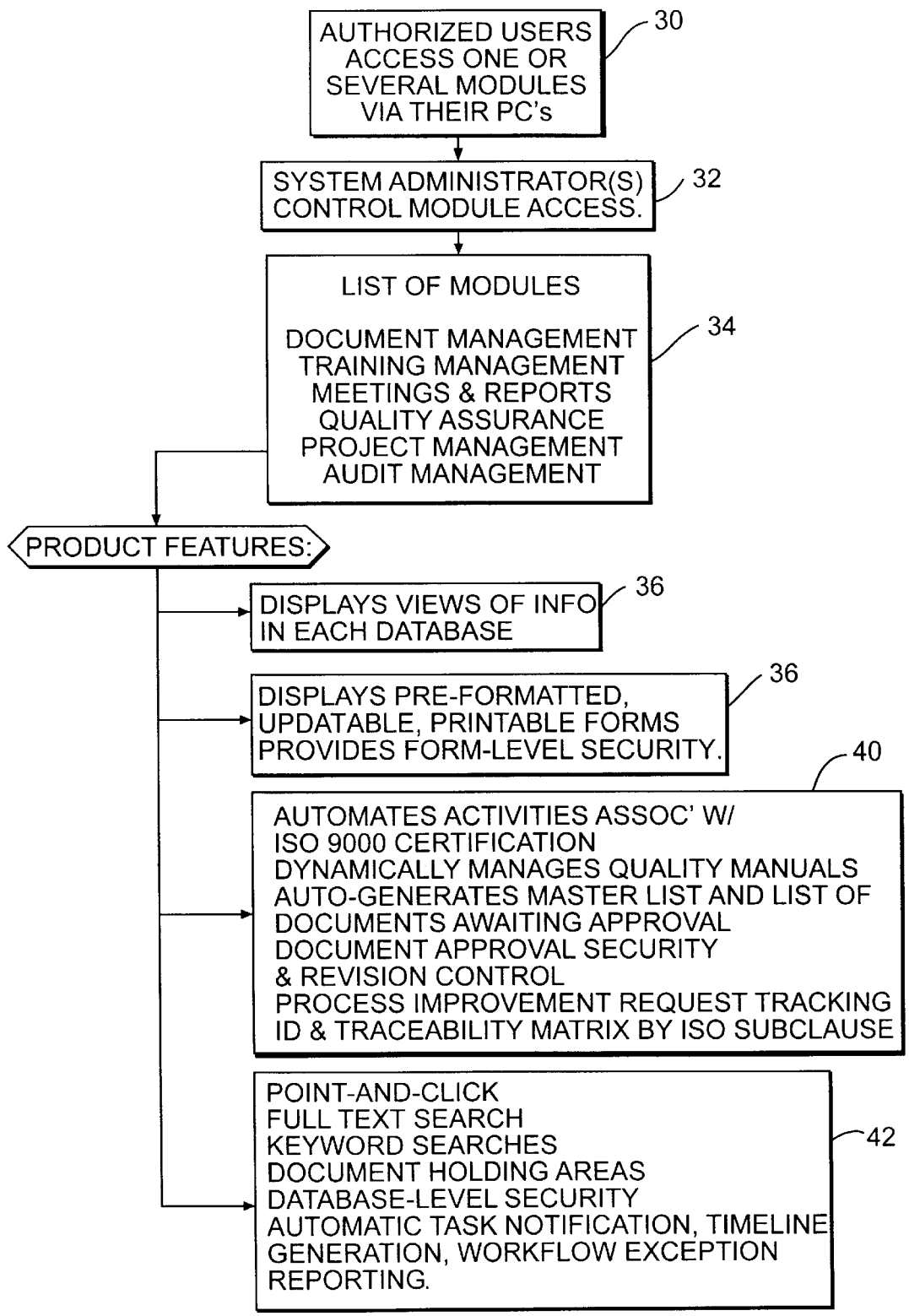
FIG. 2 is a relational block diagram of the functions of the modules of the system and method of the present invention.

Referring to FIG. 2, all authorized users of the quality system, each have a work station where the user can access one of several modules via their personal computers at block 30. System administrators control who can access which particular module as shown at block 32. Block 34 lists the modules shown in FIG. 1. Each of the modules at block 34 contains product features that include views of information in each database at 36, and displays preformatted updatable, printed forms, and security depending on the level of the particular form at 38. Also, the product features includes features unique to the ISO 9000 and ease of use. The features include at 40, automating activities associated with achieving and maintaining ISO certification, dynamically managing quality manuals, auto generating a master list and list of documents awaiting approval, provides document approval, security and revision control, process improvement request tracking, and ID and traceability matrix by ISO subclass. Ease of use features of the individual modules provide for a paper free environment, point and click control, full text search, keyword searches, document holding areas, database level security, and automatic task notification, timeline generation, and work flow exception reporting at block 42. All quality documents in this database are used to build an identification and ISO clauses traceability matrix. Thus, no document in the database can be stored without the "clause" field being filled.

Figure 3:
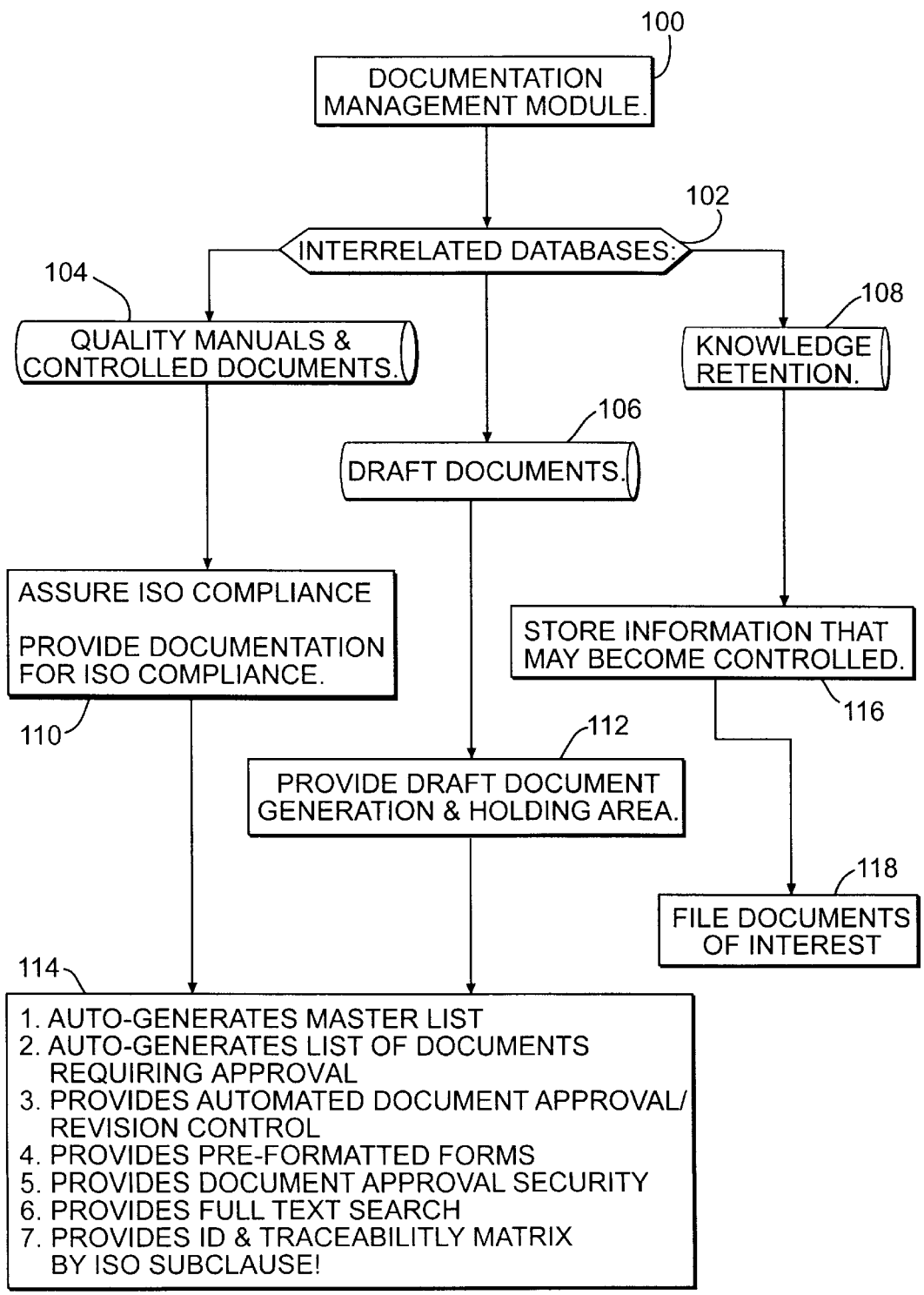
FIG. 3 is a functional block diagram of the document management module constructed in accordance with the present invention.

Referring to FIG. 3, a document management module 100 includes a database at block 102. One of the databases 104 contains quality manuals and controlled documents, another database 106 is for containing draft documents, and a third database 108 is concerned with knowledge retention. The primary database functions of the quality manuals and controlled document database 104 assures ISO compliance with the quality manual requirement and provides documentation for ISO compliance as indicated at 110. The databases 110 and 112 automatically generate a Master List, automatically generate the list of documents requiring approval, provide automatic control of document revision and approval, generates the necessary preformatted forms, provides document approval security, and the ISO traceability matrix by ISO subclass, as shown at block 114.

Figure 4:
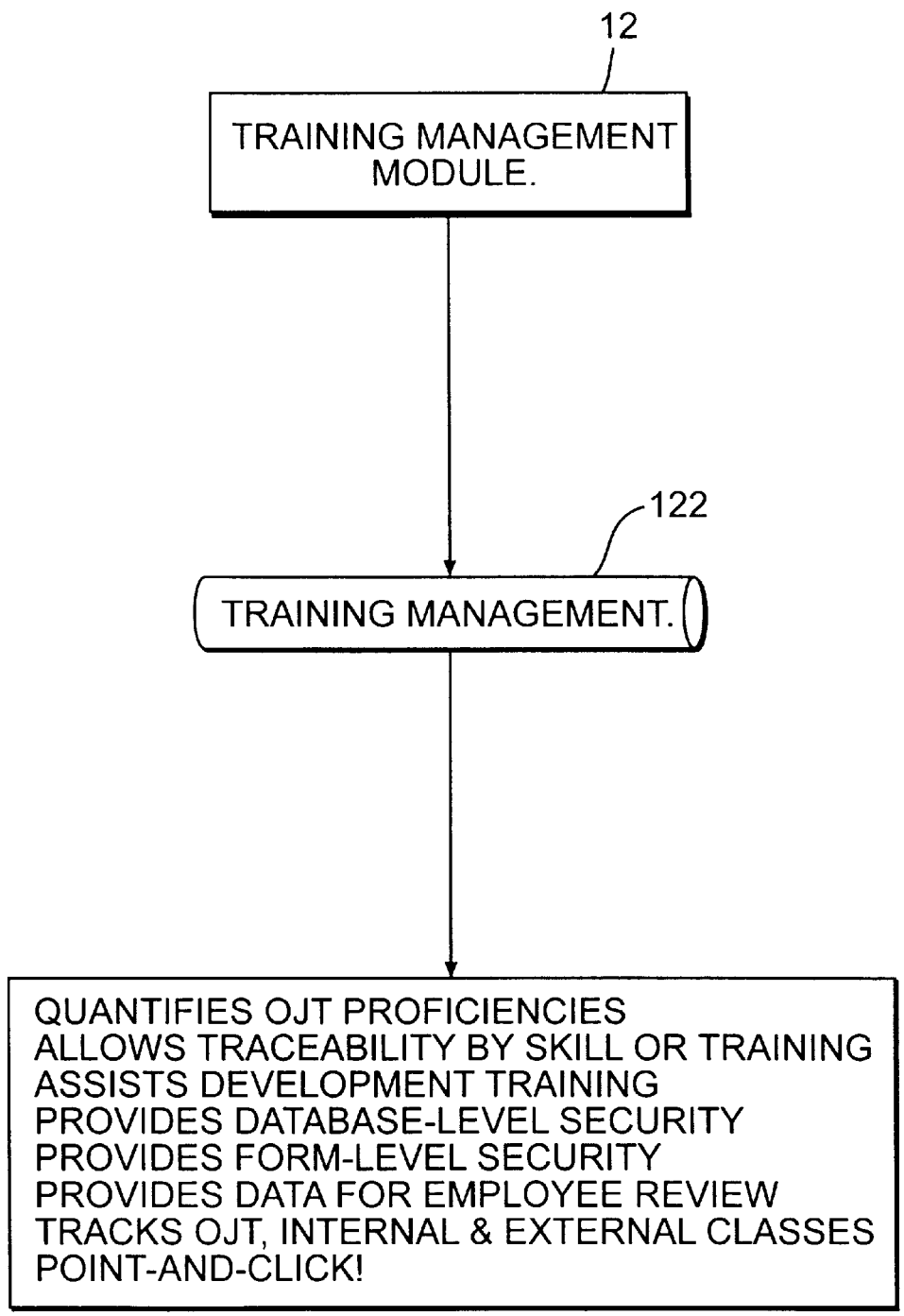
FIG. 4 is a functional block diagram of the training management module in accordance with the present invention.

Referring to FIG. 4, a training management module 120 has a database 122 that quantifies on the job training proficiencies, permits tracing the individual employees by skill or training, assists in training development, provides a level of security corresponding to a database, and security at the form level, provides data for employee review, tracks on the job training internal and external classes, all of which is accomplished by pointing and clicking at the corresponding button, as shown at block 124. It identifies qulified employees for special projects and process in accordance with the requirement of ISO clause 4.9 and provides objective evidence of such qualification. It provides a record of skill sets obtained through on-the-job training between departments.

Figure 5:
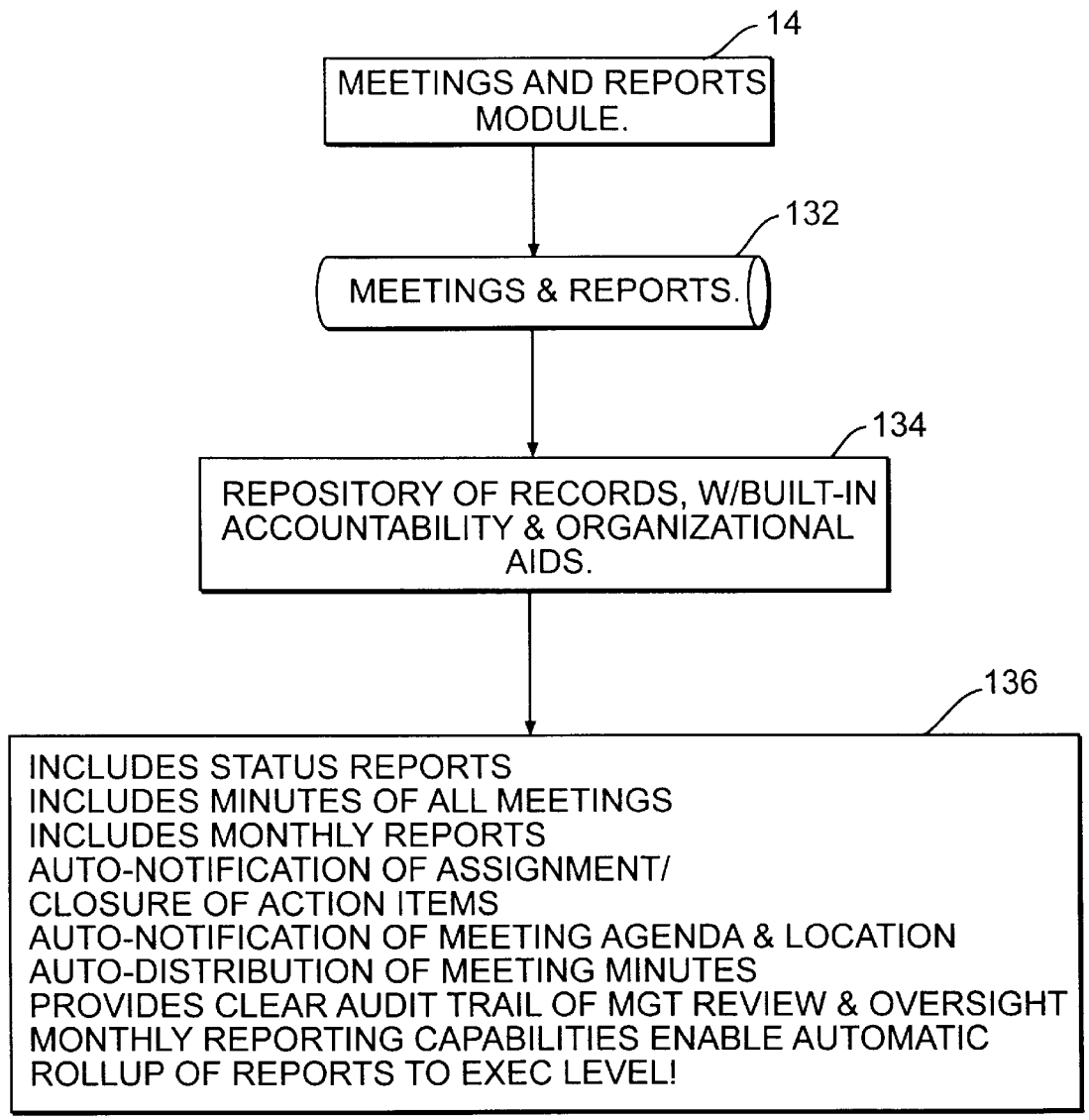
FIG. 5 is a functional block diagram of the meetings and reports module in accordance with the present invention.

Referring to FIG. 5, the meeting and reports module 14 has a meeting and reports database 132 that serves as a repository of business records, with built-in accountability and organizational aids at block 134. More specifically the database 132 includes status reports, minutes of all meetings, monthly reports, automatic notification of assignment and closure of action items, automatic notification of meeting locations and agenda, automatic distribution of meetings minutes, provides audit review of management review and oversight, monthly reporting capabilities enables automatic elevation of reports to executive level, all without the use of paper, as shown at 136.

Figure 6:
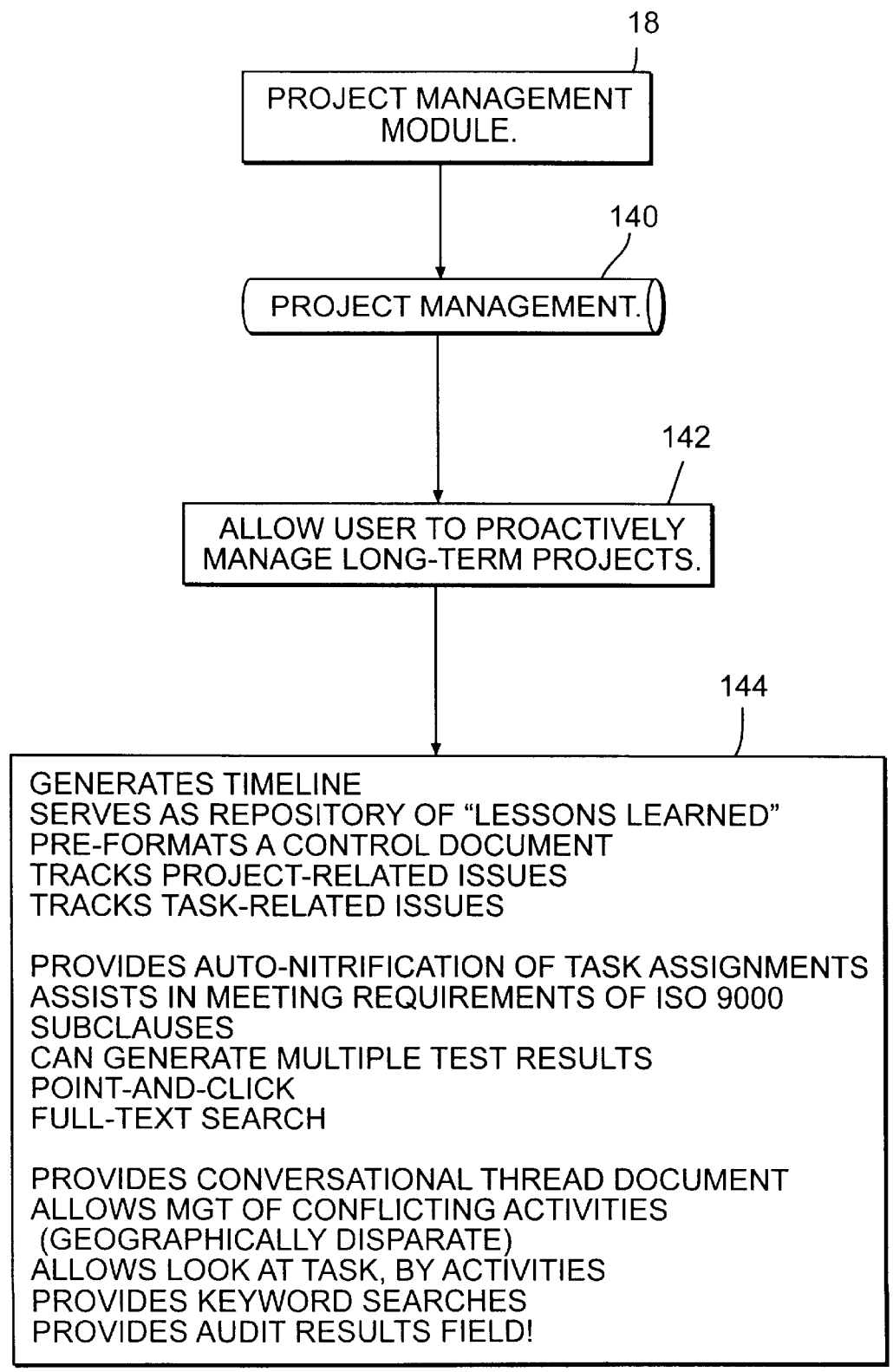
FIG. 6 is a functional block diagram of the project management module in accordance with the present invention.

Referring to FIG. 6, the project management module 18 has a single database 140 that permits the user to proactively manage long term projects as indicated at 142. Such managing includes generating a timeline, serving as a repository of "lessons learned" across multiple projects, pre-formats a control document, tracks project related issues and task related issues, provides automatic notification of task assignments, assists in meeting ISO clauses, generates multiple test plans and associated results, all accomplished by pointing and clicking, provides conversational thread document, permits management of conflicting activities (geographically disparate) permits looking at task, by activity, provides key word search and audit results field all at 144.

Figure 7:
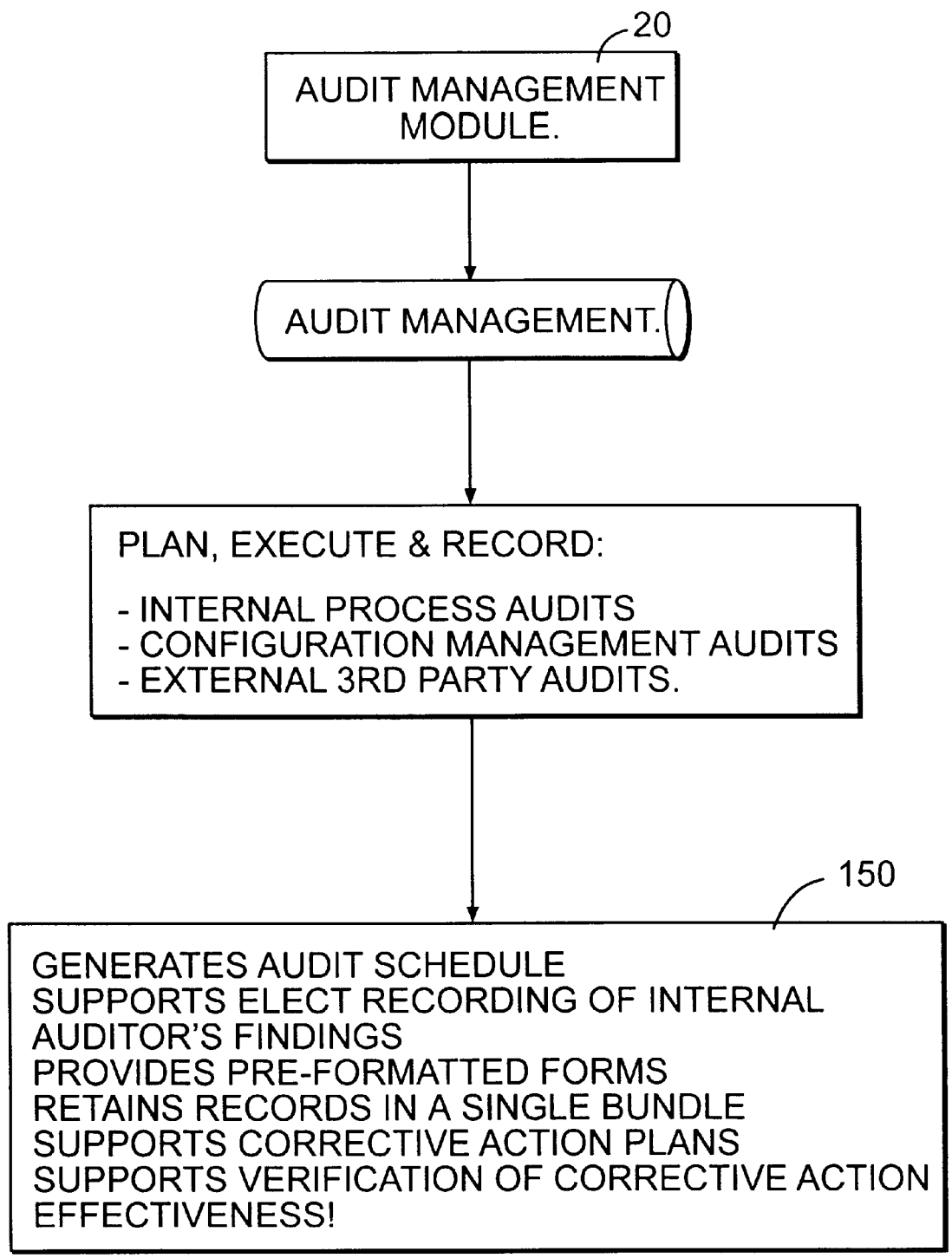
FIG. 7 is a functional block diagram of the audit management module in accordance with the present invention.

Referring to FIG. 7, the audit management module 20 includes a single database that plans, executes, and records internal process audits, configuration management audits, and external 3rd party audits. As shown at block 150, the audit management module generates an audit schedule, supports recording of internal and external auditors findings, prescribes corresponding pre-formatted forms, retains records in a single bundle, supports corrective action plans, and supports verification of corrective action effectiveness.

Document Management Database

This database 104 houses the procedures, mission critical processes, mission critical systems, work instructions, job descriptions, mission statements, quality manuals, and other controlled documents over which an organization must exercise control in order to be certified by ISO 9000. This database is, directly related to the training management system, workflow document management control, or supplier management. This database also has automated features for review and approval of documents, control of the revision of documents, and generation of a master list. The database has full text search capability and has point-and-click functionality built into the review and approvals sections. The quality manual states how a particular organization will comply with each of the standards.

Figure 8:
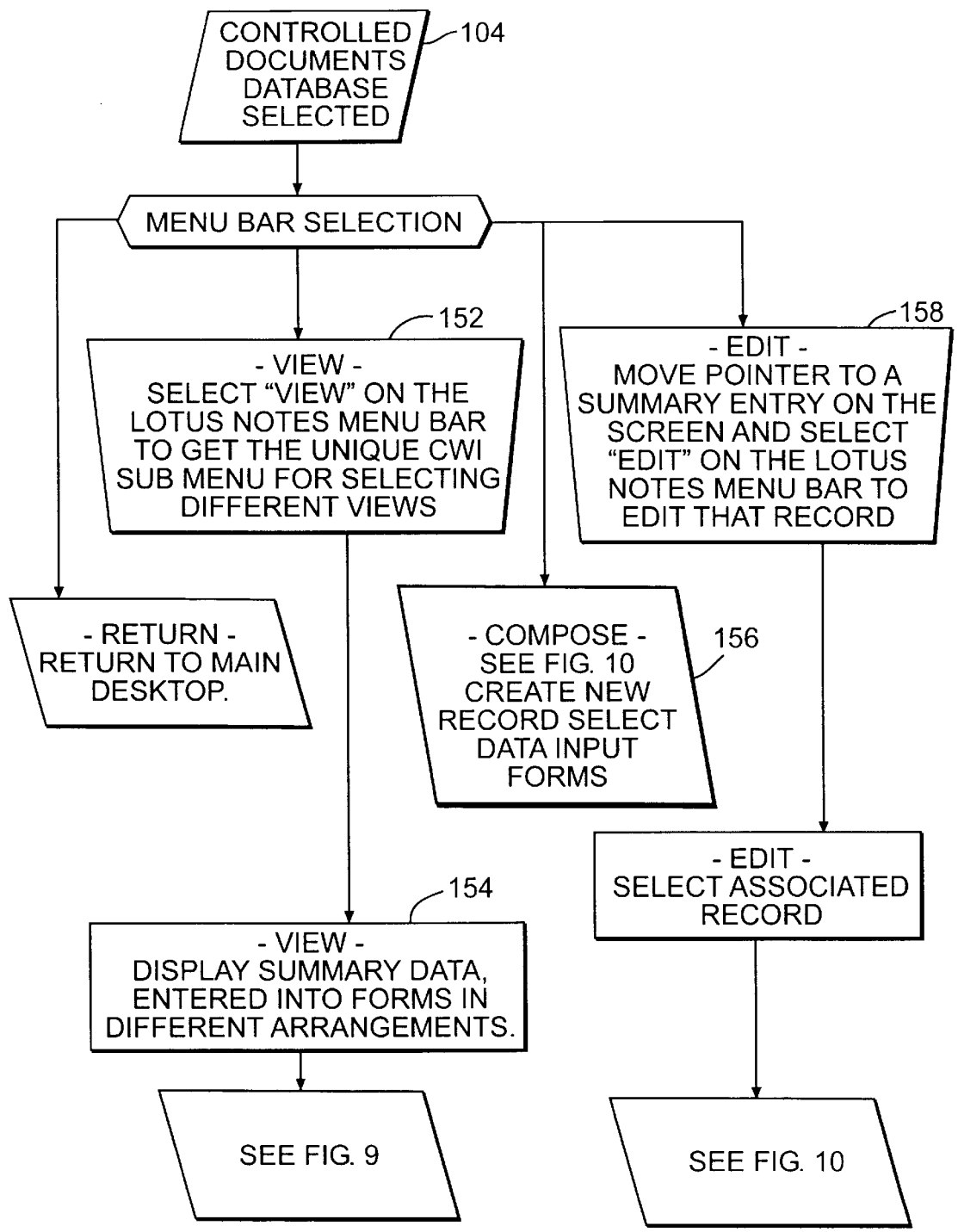
FIG. 8 is a chart of the first level menu selection for the controlled documents database incorporating the present invention.

Referring to FIG. 8, and after selecting the database 104, the operator has four choices which are displayed in a menu bar at block 152. One choice is "Return", reverts to the opening display. Another choice is "View" which displays a sub menu bar for selecting different views at block 154. A third choice is "Compose" at block 156 which produces a sub menu bar for selecting the different types of forms for data input, and the fourth choice is "Edit" at block 158 which selects an edit version of the form currently being displayed at block 156 by moving a pointer to a summary entry on the screen. The different views of the sub menu bar permit the selection of summary data which was entered into the forms of the database using different criteria.

Figure 9:
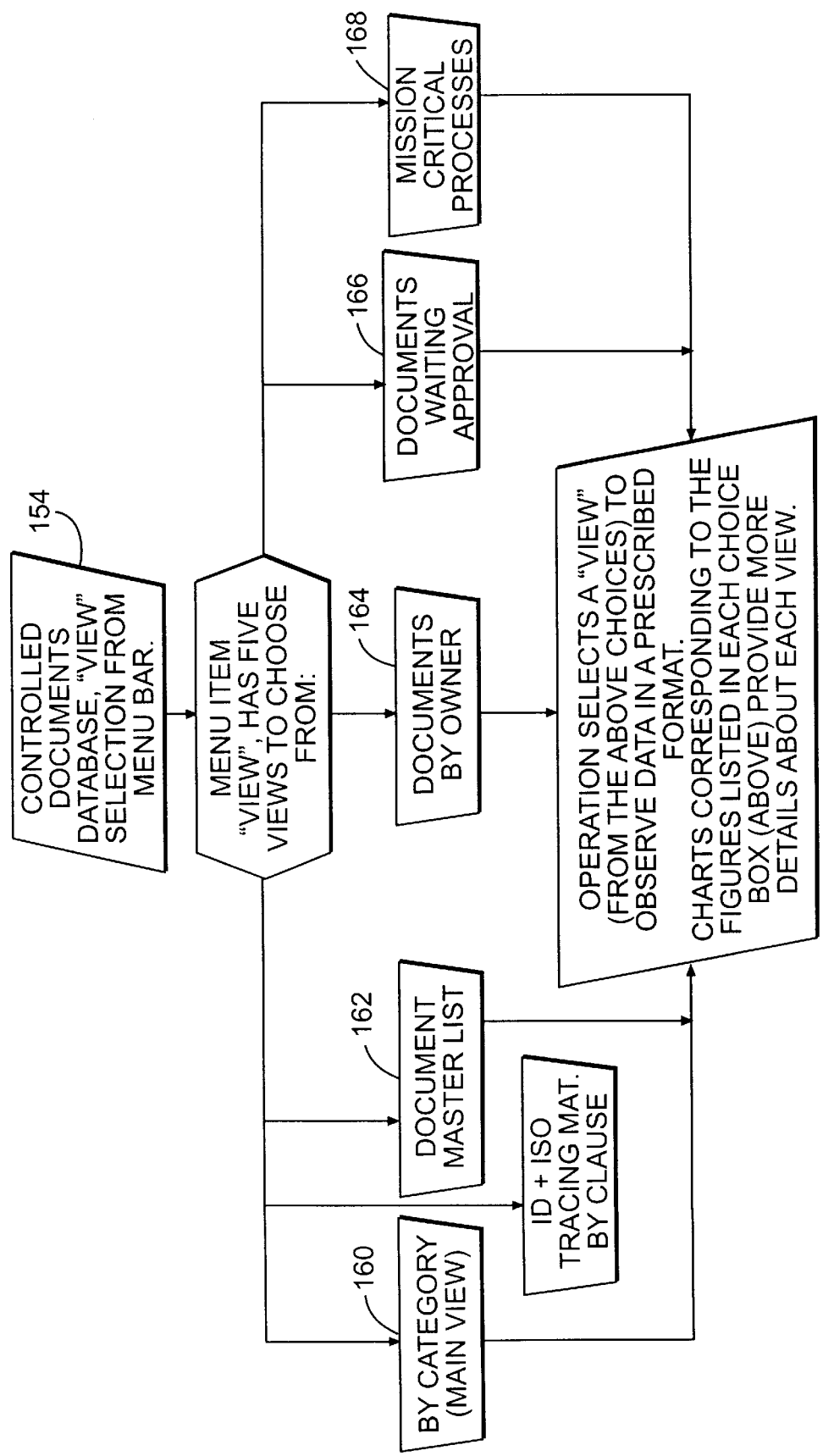
FIG. 9 is a chart of a view selections menu of the controlled documents database incorporating the present invention.

Referring to FIG. 9, the sub menu of "View" of FIG. 8 at block 154 presents six choices for observing data in different formats, namely, by category at block 160, an ID and ISO traceability matrix at 161 document master list at block 162, documents categorized by owner at block 164, documents, waiting approval at block 166, data relating to mission critical process at block 168, and identifies the documents by ISO clauses.

Figure 10:
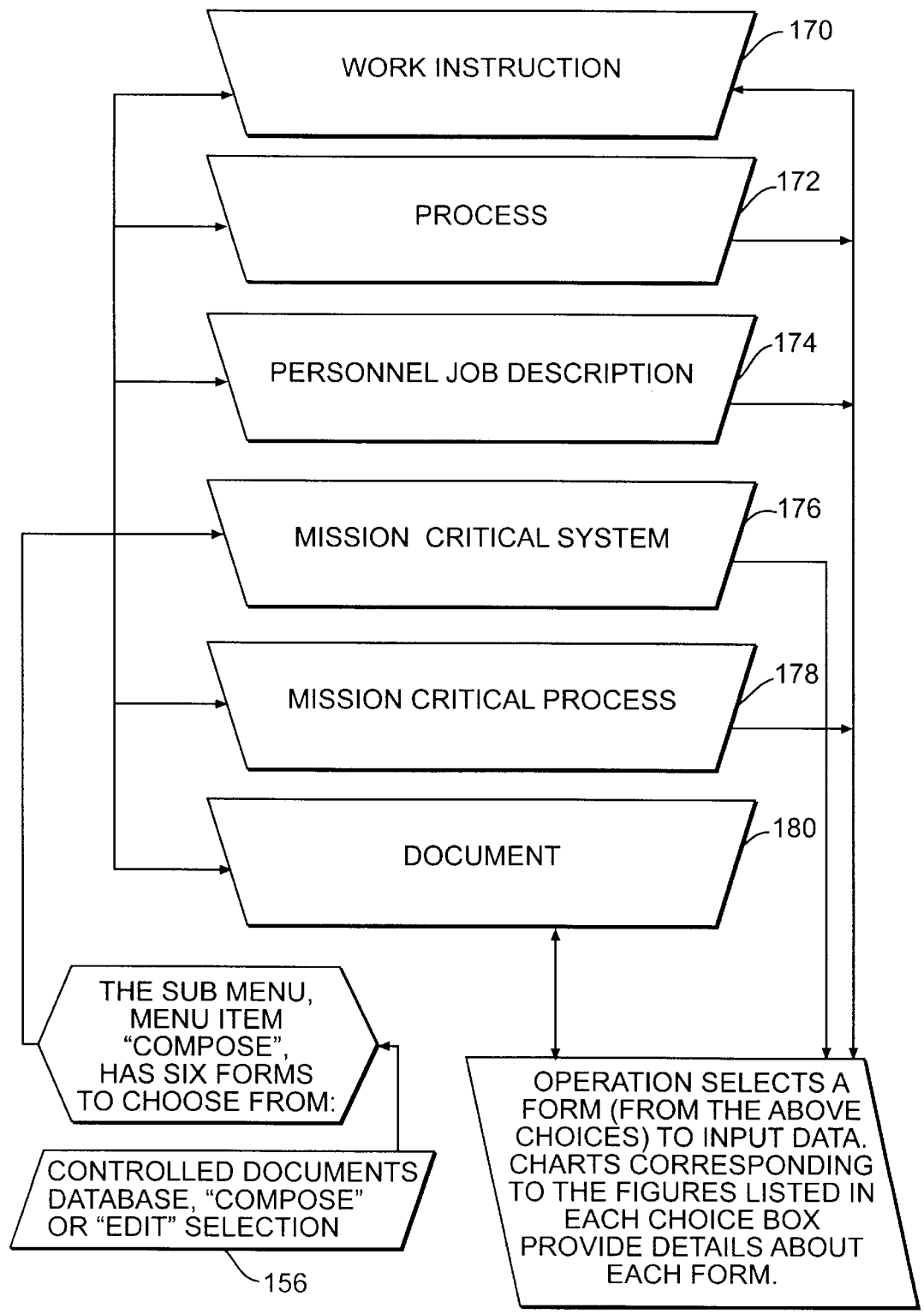
FIG. 10 is a chart of a compose selections menu incorporating the present invention.

As shown in FIG. 10, the selection of compose or edit at block 156 presents the operator with a choice of six different types of forms for the database "controlled documents", which include "Work Instruction" at block 170, "Process" at 172, "Personnel Job Description" at 174, "Mission Critical System" at block 176, "Mission Critical Process" at 178, and "Document" at block 180. All of the forms in this database use the same template and method for security and revision control to guard against unauthorized changes and inadvertent use of obsolete documents.

Figure 11:
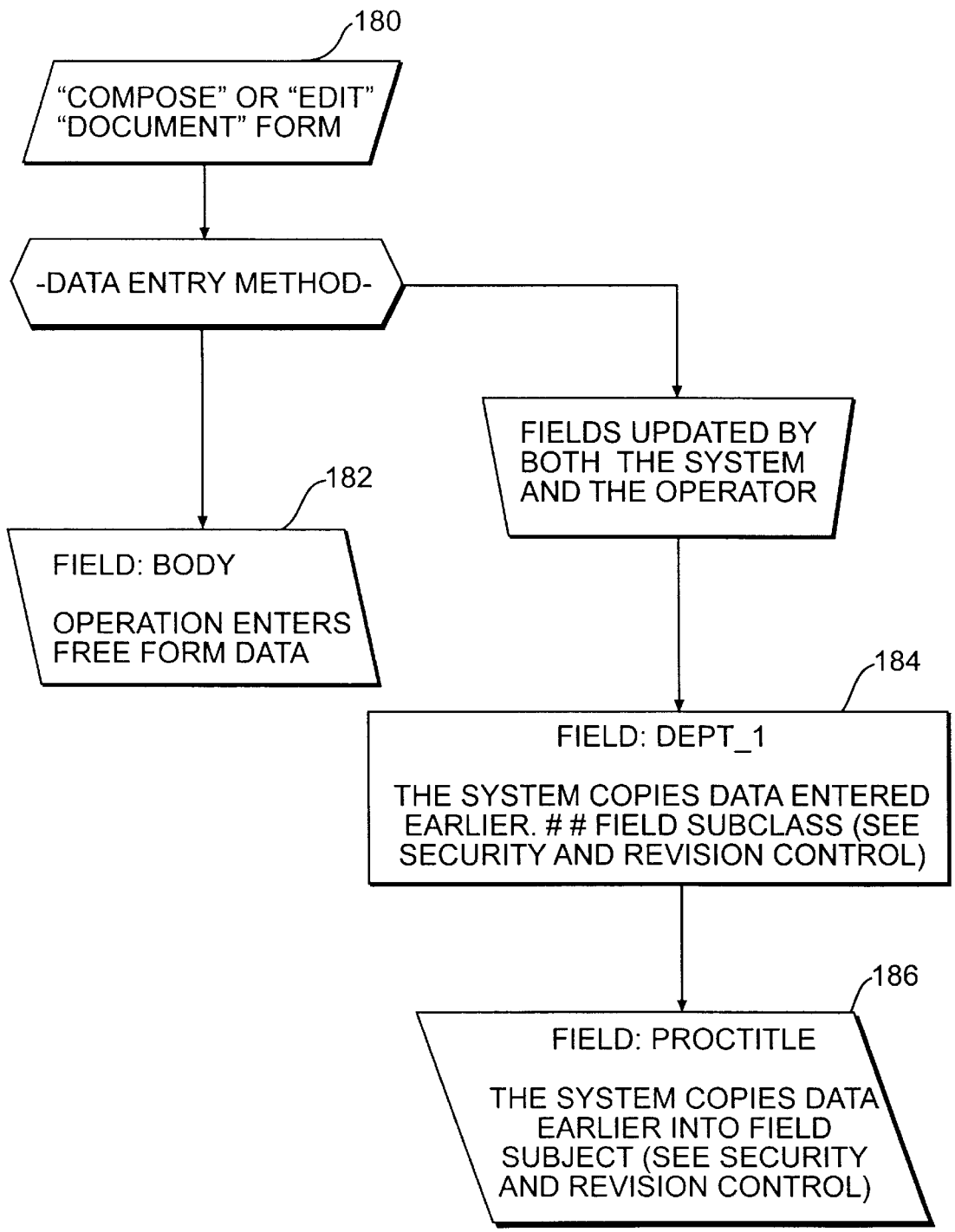
FIG. 11 is a chart of a compose or edit menu item for completing a "Document" form.

The "Document" form selected at 160 will be described in connection with the chart of FIG. 11 and the form of FIG. 12.

The form of FIG. 12 has an upper or header portion for providing the control of security and revision of the created document and a lower portion for accepting input data from either the system or direct from the operator depending on the information to be entered. The upper portion above line 179 of FIG. 11, which is the security and control section, requires that certain information is entered in selected ones of the fields in order to create a document that becomes part of the system. The fields provide for entering the security classification of the completed document, a reference number for the form, the title of the document, the level of revision within the activity, and the title of the document owner or owners within the business activity, all as is apparent from FIG. 12. The particular department to which the form relates is referred to as "subclass." The field "Subject" at 181 requires that the operator has previously entered the title of the document in the field at 183. Data is also required to be entered in the field "Subject" at 181 in order to save the document in the system. If there is no data in field 183, the user cannot save the document and a warning is displayed to the user. Field 185 entitled "Categories" permits the entry of particular key words that have previously been allowed by hardcoding into the source code. These allowable key words after entry, are displayed as part of the data in the selection "View" for this database. The intended use of the "Document" form is for mission statements, Role statements, and for any document where free form structure is required. The determination of when to use a "Document" form versus anther pre-formatted form is at the option of the user. The Security and Revision control similar to that previously described can be and is used with other databases described herein including the audit database hereinafter described.

FIGS. 16A through 16G show the instructions that are used in connection with control by various fields to effect certain aspects of Security and Revision Control previously described.

Figure 16A:
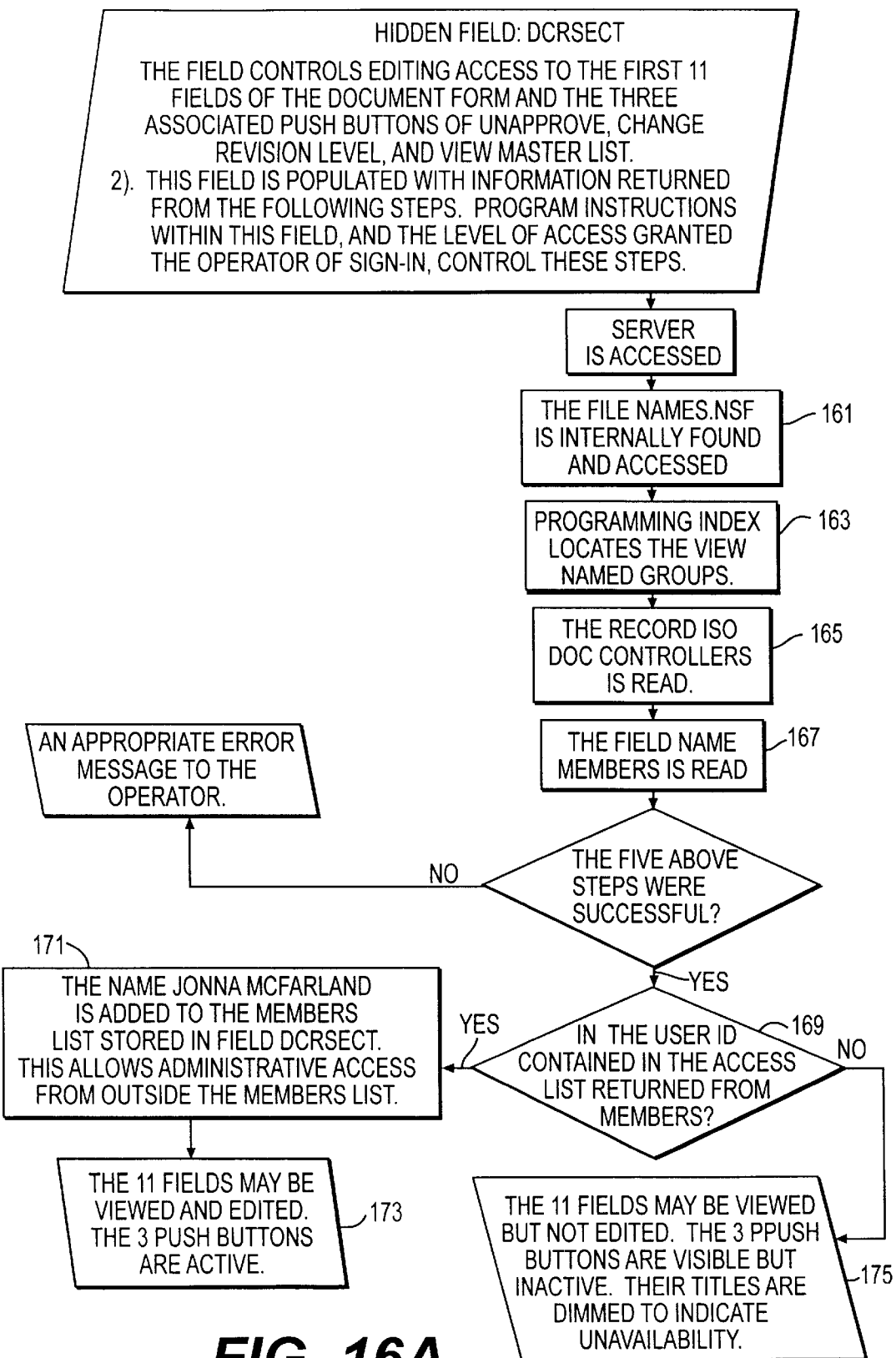
FIG. 16A is a chart illustrating control by the field "dcrsect" in accordance with the present invention.

Referring to FIG. 16A, the hidden field "dcrsect" is populated with data found in the file NAMES.NSF AT 161 and the view named GROUPS at 163. Then, a record ISO DOC CONTROLLERS is read at 165 and the field MEMBERS is read at 167. If the system successfully in retrieving such data, it is compared with the identity of the user who signed in, and if the field MEMBERS indicated the inclusion of the individual signing in at 169, the fields in the Security and Revision Control in the upper portion of the displayed form may be read and edited. Additionally, the buttons on the form may be activated at 173. However, if the ID of the user is not included in the group of MEMBERS the fields in the Security and Revision Control Portion of the form may not be viewed, or edited, and the buttons are dimmed and not operable as indicated at 175.

Figure 16B:
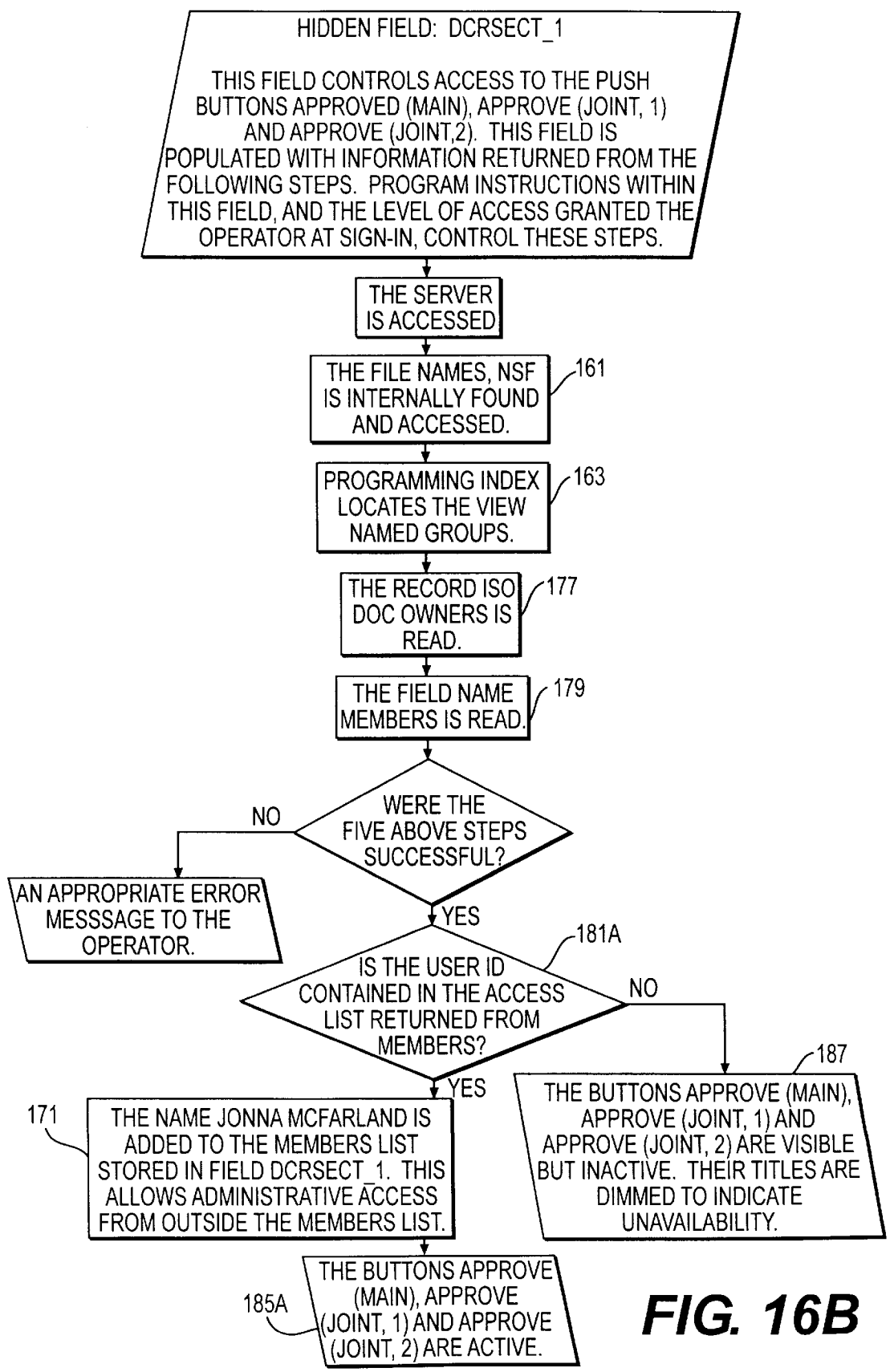
FIG. 16B is a flow chart illustrating control by the field "dcrsect-1" in accordance with the present invention.

Referring to FIG. 16B, the hidden field "dcrsect-1" is populated with data found in the file NAMES.NSF AT 161 and the view named GROUPS at 163 similar to the field "dcrsect." Then, a record ISO DOC OWNERS is read at 177 and the field MEMBERS of the document owners is read at 179. If the system is successful in retrieving such data, it is compared with the identity of the user who signed in, and if the field MEMBERS indicated the inclusion of the individual signing in at 181A, and the buttons "Approve, (Main)", and "Approve (Joint 1), and "Approve (Joint 2) are active at 185A in the Security and Revision Control in the upper portion of the displayed form. However, if the ID of the user is not included in the group of MEMBERS of the document owners, the form may be edited, and the buttons are dimmed and unable to be activated as indicated at 187A.

Figure 16C:
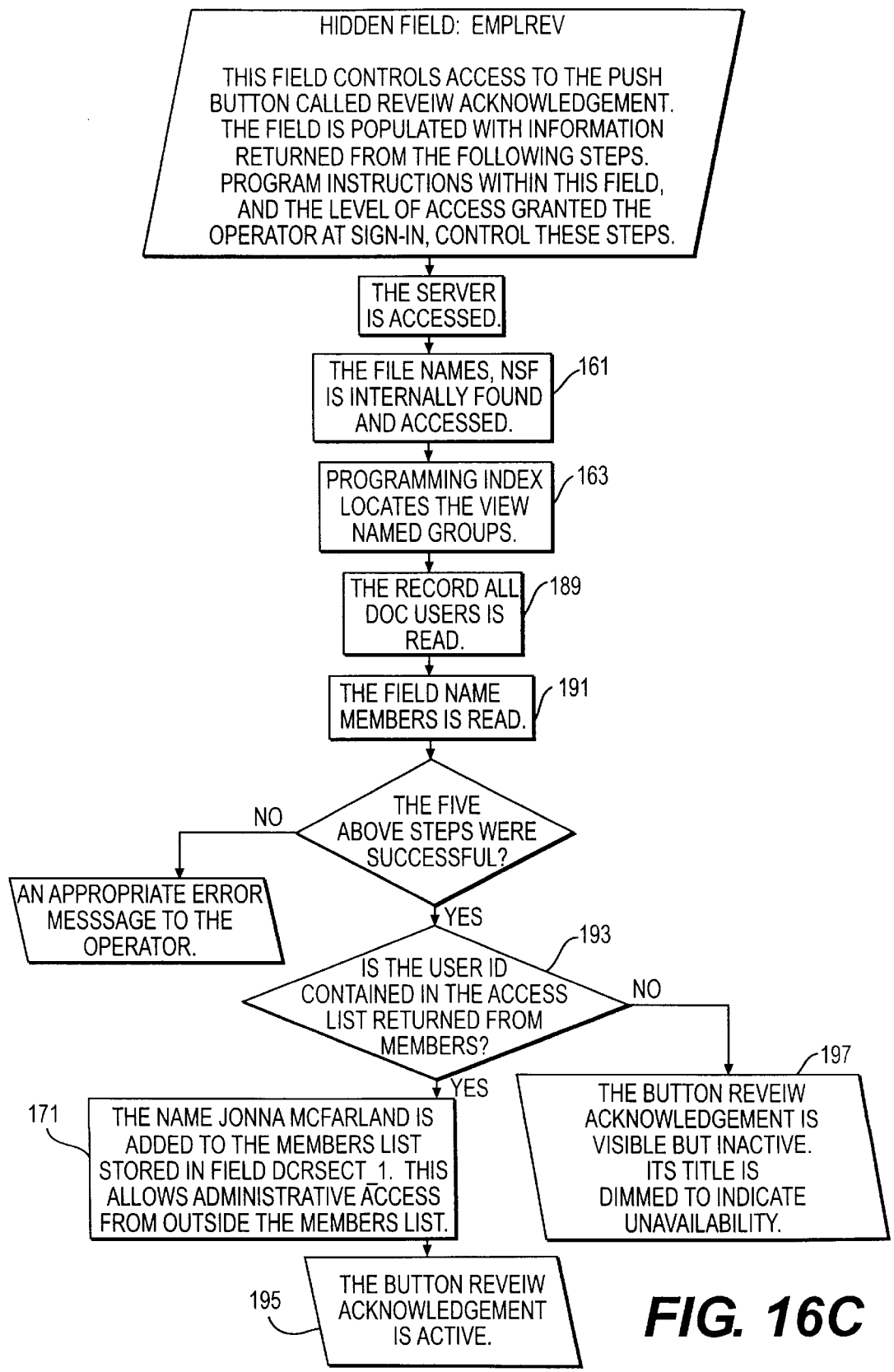
FIG. 16C is a flow chart illustrating control by the field "emplrev" in accordance with the present invention.

Referring to FIG. 16C, the hidden field "emplrev" is populated with data found in the file NAMES.NSF AT 161 and the view named GROUPS at 163 similar to the previously described fields. Then, a record of ALL USERS is read at 177 and the field MEMBERS of the document owners is read at 179. f the system is successful in retrieving such data, it is compared with the identity of the user who signed in, and if the field MEMBERS indicated the inclusion of the individual signing in at 193, the button "Review Acknowledgment" is active at 195 permitting the person who signed in to acknowledge that he or she reviewed the document. However, if the ID of the user is not included in the group of MEMBERS of all authorized users, the buttons is dimmed and unable to be activated as indicated at 197.

Figure 16E:
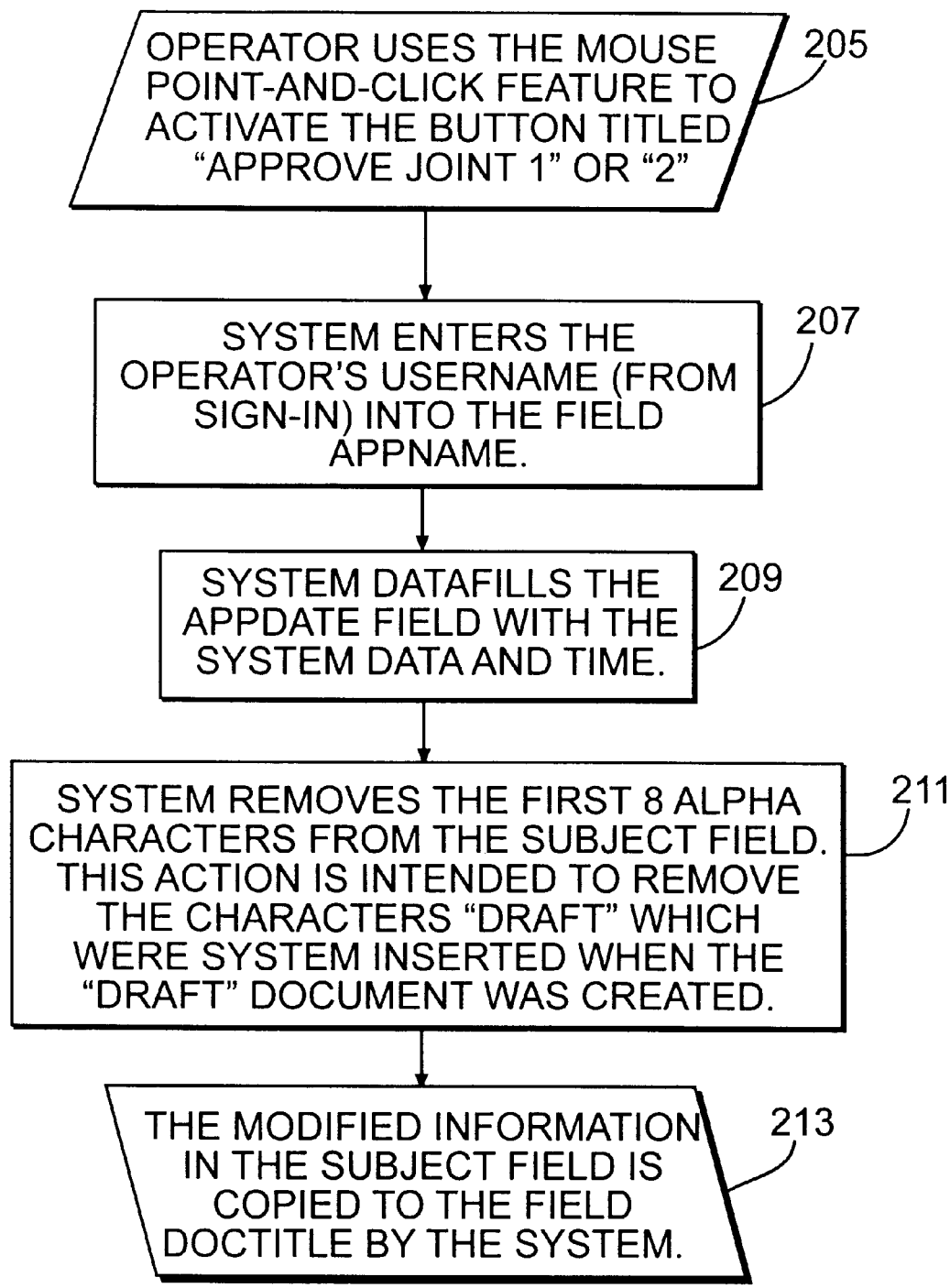
FIG. 16E is a flow chart illustrating control by the field "approve joint 1" and "approve joint 2" in accordance with the present invention.

Referring to FIG. 16D, the hidden field "docbody" is populated with data found in the file NAMES.NSF AT 161, the view named GROUPS at 163, the record of ISO DOC OWNERS at 177, and the field name MEMBERS at 179 similar to the fields described in FIG. 16B. If the system is successful in retrieving such data, it is compared with the identity of the user who signed in, and if the field MEMBERS indicated the inclusion of the individual signing in at 181, the contents of all the fields are available for read, write, and edit access as indicated at 201. However, if the ID of the user is not included in the group of MEMBERS of all ISO document owners and controllers, the contents of the fields are visible, but not able to be edited, as indicated at 203. FIG. 16E is a chart of the various documents in this database and the fields that receive access control from the field DCRSECT field of the DOCUMENT form.

Figure 16F:
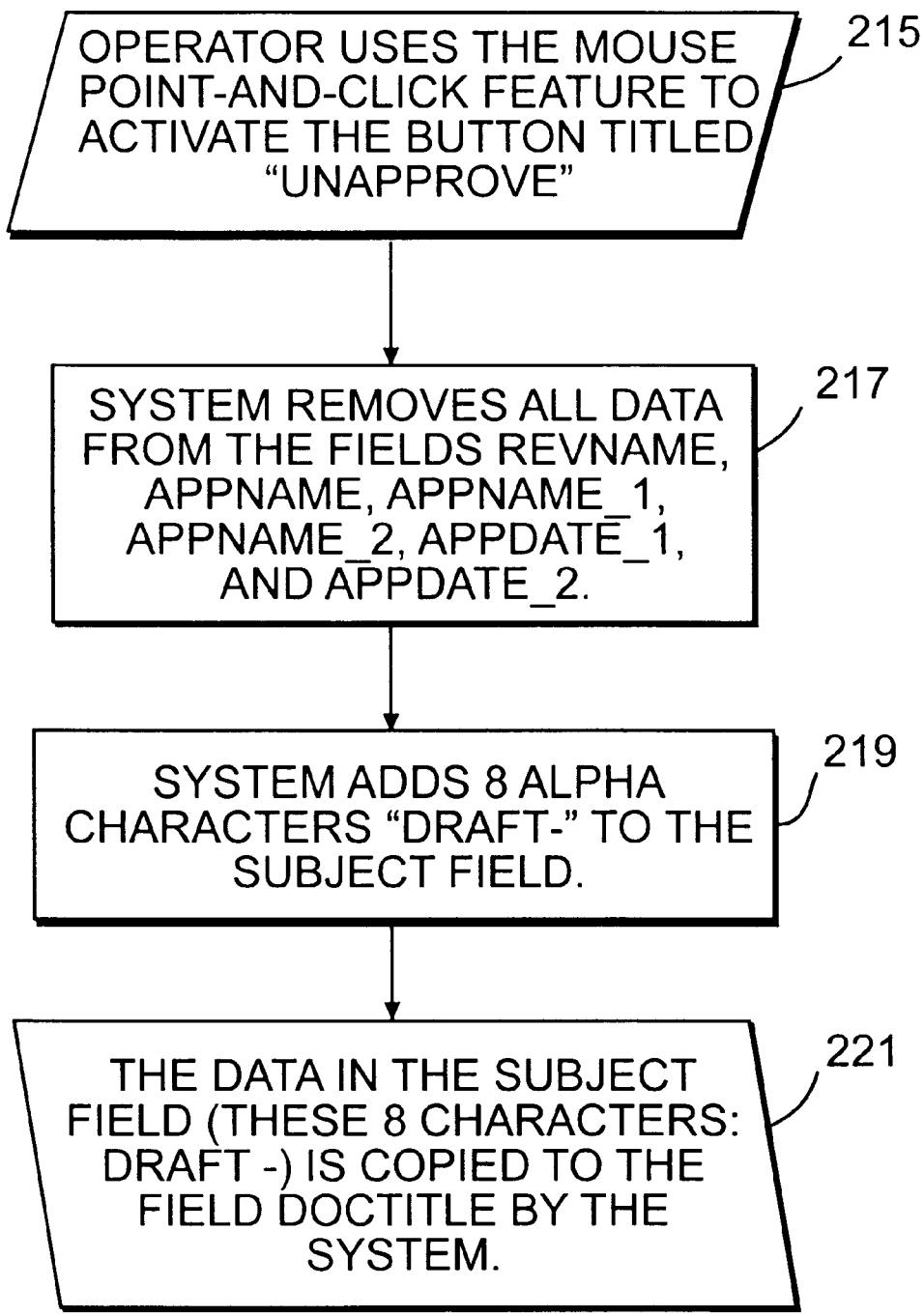
FIG. 16F is a chart listing the fields and documents controlled by the field "docbody" in accordance with the present invention.

Referring to FIG. 16F, when the operator activates the button "Approve Joint 1" at 205, the system enters the operators username from sign-in into the field "appname" at 207 which identifies the individual approving the document; the system then removes the word "DRAFT" from the document at 211, which was inserted when the document was created. Modified information in the "subject" field is copied by the system to the "doctitle" field.

Referring to FIG. 16G, when the button "Unapprove" is activated at 215, the system removes all data from the fields "revname", "appname", "appname-1", "appname-2," and at 217, which nullifies and cancels all approvals of the document prior to activation of the "Unapprove" button. The system then adds the characters "DRAFT" to "subject" field at 219. The data in the "subject" field is copied to the field "doctitle" at 221.

The lower part of the form has a field "DEPT-1" at 184 into which is copied automatically from Security and Revision Control the data from the field "SUBCLASS" which was previously entered by the operator and copies into the field "PROCTITLE" at 186 the data previously entered in the field "SUBJECT". The operator enters free form data in the field "Body" of the form at 182. The word "DRAFT" is appended to any data entered in the "SUBJECT" field.

When an operator wishes to edit the record emanating from the form "Document", a separate form is displayed which includes the history of the record and the identity of the persons who previously approved or disapproved the record. The operator can select "Unapprove", "Change Revision Level", or "View Master List". Should the operator Disapprove of the resulting record, the record reverts to its draft status, is retained in the "Master List" and added to the list "Documents Waiting Approval".

Each editing of the record is saved and the word "Draft" is affixed to the document until the document is finally fully approved. Upon final approval, the document is removed from the "Documents Waiting Approval List." The various modifications made to the Documents provide a permanent Audit trail of this particular document. The same method applies to each and every "Document" included in the "Controlled Documents Database".

Figure 14A:
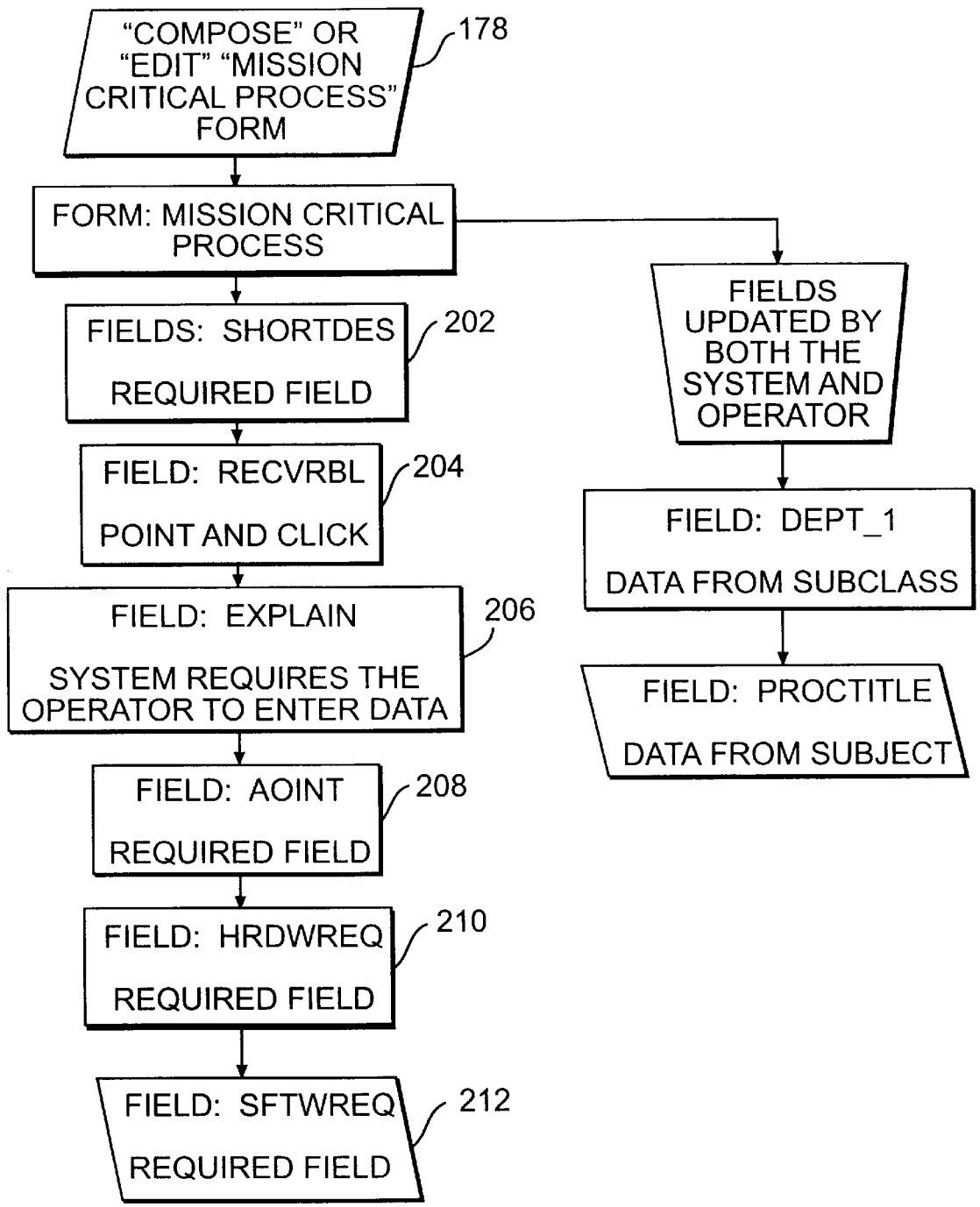
FIG. 14A is a chart for the controlled documents database menu item compose or edit of a "Mission Critical Process" form incorporating the present invention.
Figure 14B:
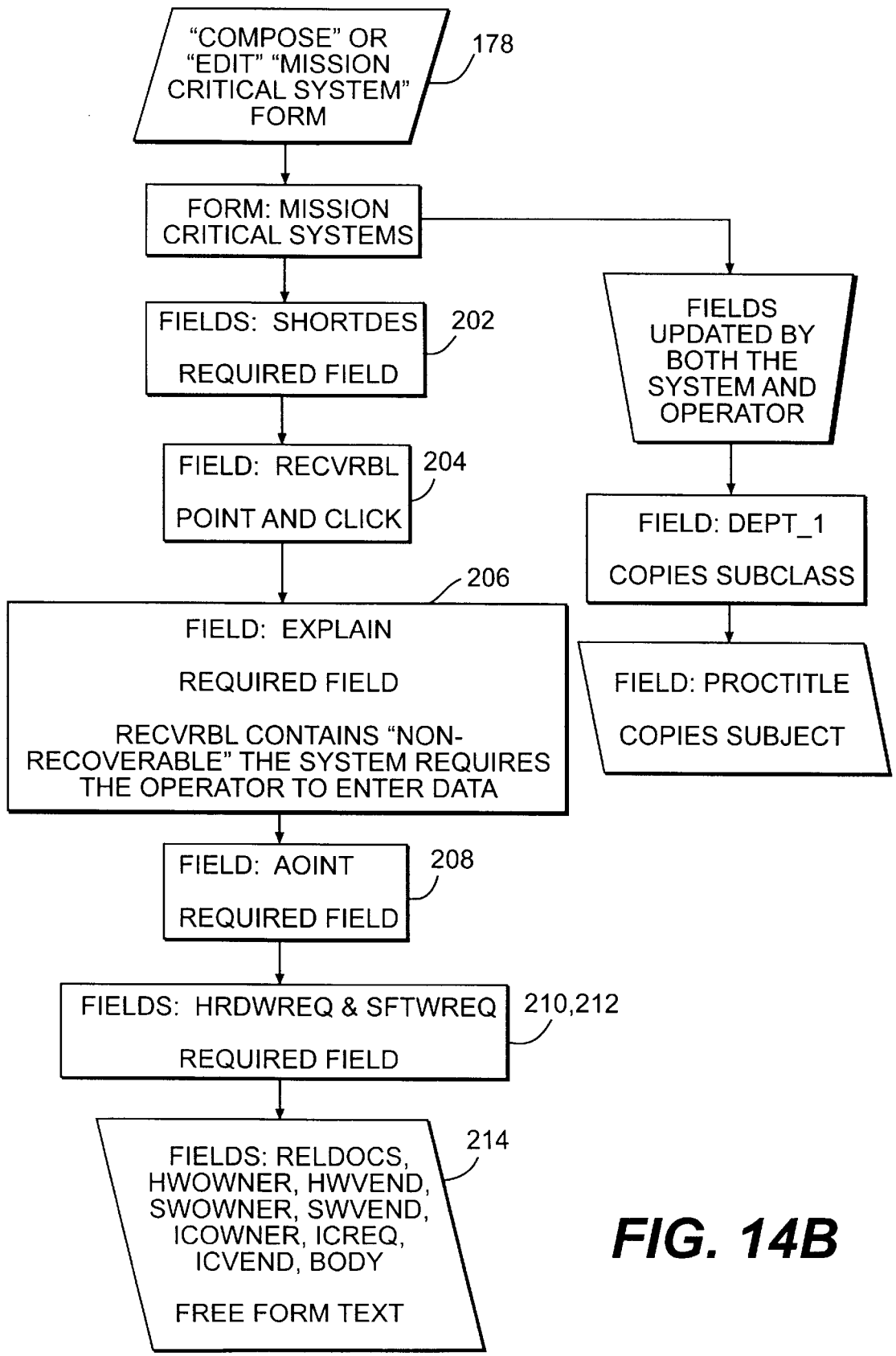
FIG. 14B is a chart for the controlled documents database menu item compose or edit of a "Mission Critical System" form incorporating the present invention.

The forms "Mission Critical Process" (MCP) and "Mission Critical System" (MCS) are described in connection with FIGS. 14A, 14B, 15, and FIGS. 16A–16C When these forms are selected for completion. the security and revision control portion of the document is displayed and operates in the same manner as previously described in connection with "Document". These particular forms are completed to record information relating to computer processes and systems that are critical to the operation of the business activity. In addition to the security and revision control features previously discussed, they include a field "shortdes" at 202, which requires that text be entered describing the system or process with which the document is concerned. The field "recvrbl" at 204 requires the entry of either key word "Recoverable" or "Non-recoverable". If non-recoverable is entered, the field "explain" at 206 must be completed in order to include the reasons therefor. If it does not have an entry, the user is notified, and the document cannot be saved. A field "aoint" at 208 must be completed by entering specific key words related to the expected time the system or process is not recoverable in the event of an inadvertent occurrence, such as 0–4 Hours, 5–24 hours, 1 week, or 1 month. The forms MCS and MCP also include the fields "hrdwreq" and "sftwreq" at 210 and 212, which are required to contain data in order for the document to be saved in the system. These fields are intended to describe the hardware and software requirements of the system or method with which the document is concerned. In the "System" document as shown by FIGS. 14B and 16B, the field "reldoc" at 214 permits the embedding of any documents that may be related to the current document. This is not a required field in order to give the operator flexibility in determining what, if any, documents should be linked. Fields "hwownr, swownr, hwvend, swvend," each require that data be entered in order to save the document. Thus, the operator must enter the owning department of the hardware at 216, the owner of the software at 218, the vendor of the hardware at 220, and the vendor of the software at 222. The same requirement exists for integrated circuits that are used in the system. The owner of the IC circuits is entered at field at 216, the identity of the circuits at 226, and the vendor of the circuits at 228.

In response to the selection of the edit mode as previously discussed. Similar to the created document, the edit mode also includes the notation "DRAFT" to indicate the original document had not yet received final approval. An editing of the fields would automatically include it with the list of documents waiting approval. Thus, making it practically impossible to conduct a business activity in accordance with an obsolete or unapproved document. Even if a hard copy were made, the text that is embedded into each controlled document, namely: "Printed Copies Are Uncontrolled Documents." and, "In the event that printed copies are made, it is the user's responsibility to ensure that they are using the most current issue of the document," serves the function of satisfying the portion of ISO 9000 requiring a revision control process for printed material. When a document of any kind is edited, the un-edited version becomes the "child" document and the newly edited and stored documents becomes the top-level or master document.

Figure 17:
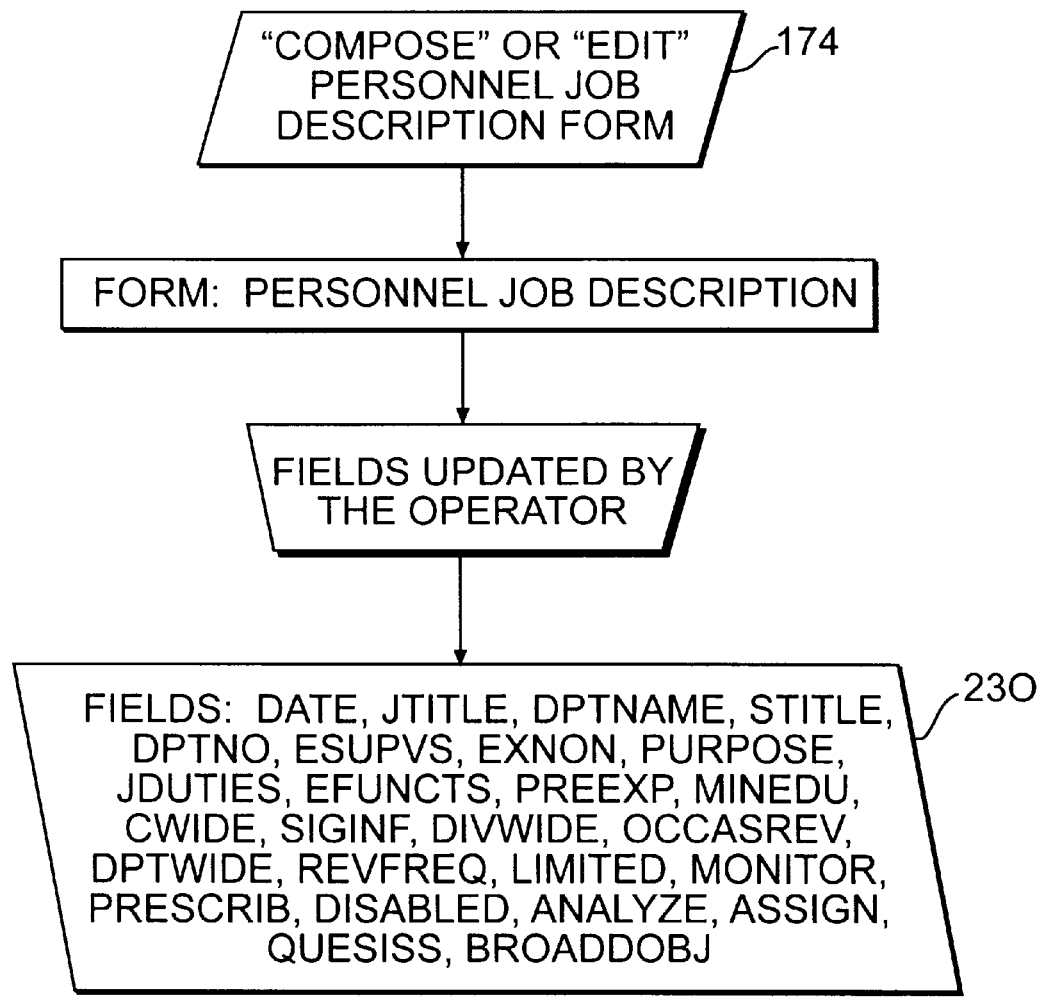
FIG. 17 is a chart for the controlled documents database menu item compose or edit of a "Personnel Job Description" form incorporating the present invention.

Referring to FIG. 17, it is assumed that the operator selected the compose or edit form for "Personnel Job Description" at block 174 of FIG. 10. In response, the form of FIG. 18 is displayed which at the upper portion includes the same fields relating to Security and Revision Control as the previously described forms in this database. The fields for this form are identified at block 230 of FIG. 17 and arranged on the form as shown following the Security and Revision Control Section. This form has several fields, all of which permit free form text. The effective date of the job description is entered in field "date" at block 234. The title of the job is entered in field "title" at block 236. The title of the supervisor is entered in filed "stitle" at 236. The title of the persons which the employee supervises is entered in field "esupv" at 240. The name of the department, the department number, and whether or not the job is exempt or non-exempt is entered in the fields "dptname", "deptno", and "exnon" at blocks 242, 244, and 246 respectively. The purpose of the job is entered in field "Purpose" at 247, with the duties and essential functions entered in fields "jduties" and "efuncts" at 248 and 250. The minimum amount of previous experience and minimum education level required to perform the job is entered into fields "preexp" at 252, in field "minedu" at 254. The scope of the duties may be selected as either "cwide" company wide at 256, significantly or infrequently reviewed at field "siginf" at 257. Whether or not the job is division wide where the employee is reviewed only occasionally is entered in field "divwide" at 258, department wide where the employee is reviewed frequently is entered in field "dptwide at 260, or limited where the employee is closely monitored in field "limited" at 262.

A portion of the form to be completed by those who have supervisory responsibility is indicated by fields "presrib" at 264 where the procedures and methods to be followed are prescribed, "somedec" at 266 where standard procedures are prescribed, but alternatives are available and some decisions made, or "analyze" at 268 where facts must be analyzed which determine actios within broad policy limits. The level of supervision which best describes the supervisors duties is entered in field "assign" at 270 when assignments are regularly checked by the supervisor, or in the field "quesis" at 272 when work is performed under standard procedures, but questionable issues referred to the supervisor, or in field "broadobi" at 274 where work is performed under broad objectives with unusual issues being referred to the supervisor. All subsequent records of the same employee are linked to the original document.

Figure 19:
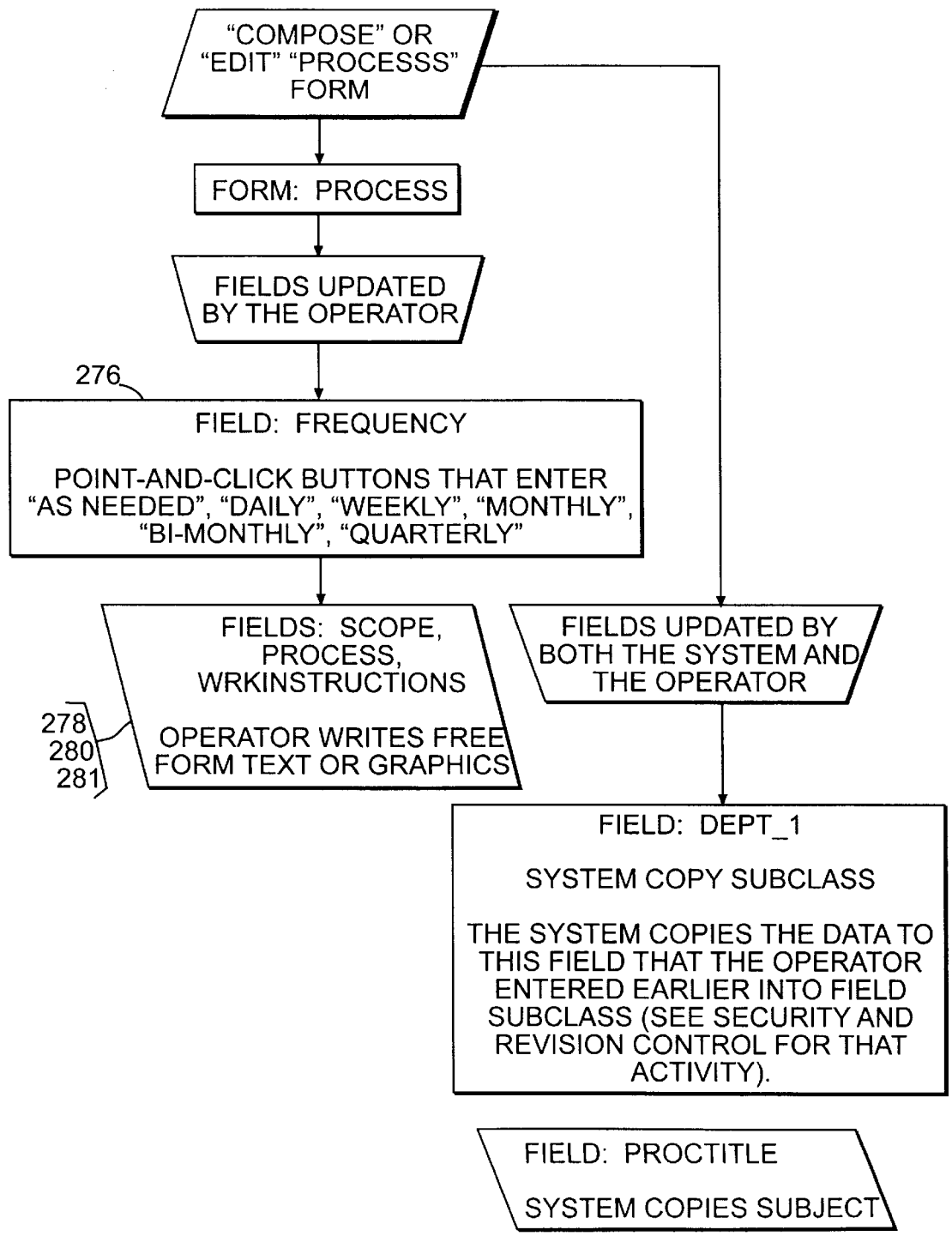
FIG. 19 is a chart for the controlled documents database menu item compose or edit of a "Process" form incorporating the present invention.

The selection of the "process" form at 172 of FIG. 10 causes the form of FIG. 20 to be displayed and completed in accordance with FIG. 19. This form is used to record a method or process of any type of activity not specific to other preformatted forms. The portion directed to Security and Revision control is the same as other forms in the "controlled document" database. In addition to the Security and Revision Control section, the form "Process" includes a field, "process" into which a free form statement is entered describing the process with which the document is concerned, the field "scope" which permits entry of a free form statement regarding the breadth or scope of the procedure concerned, and a field "frequency" where the operator uses the point and click feature to enter whether the process concerned is used "As needed", "Daily", "Weekly", "Monthly", Bi-monthly" or "Quarterly". A free form statement and its link to related work instruction documents are entered free form into the field "wrkinstructions."

Figure 21:
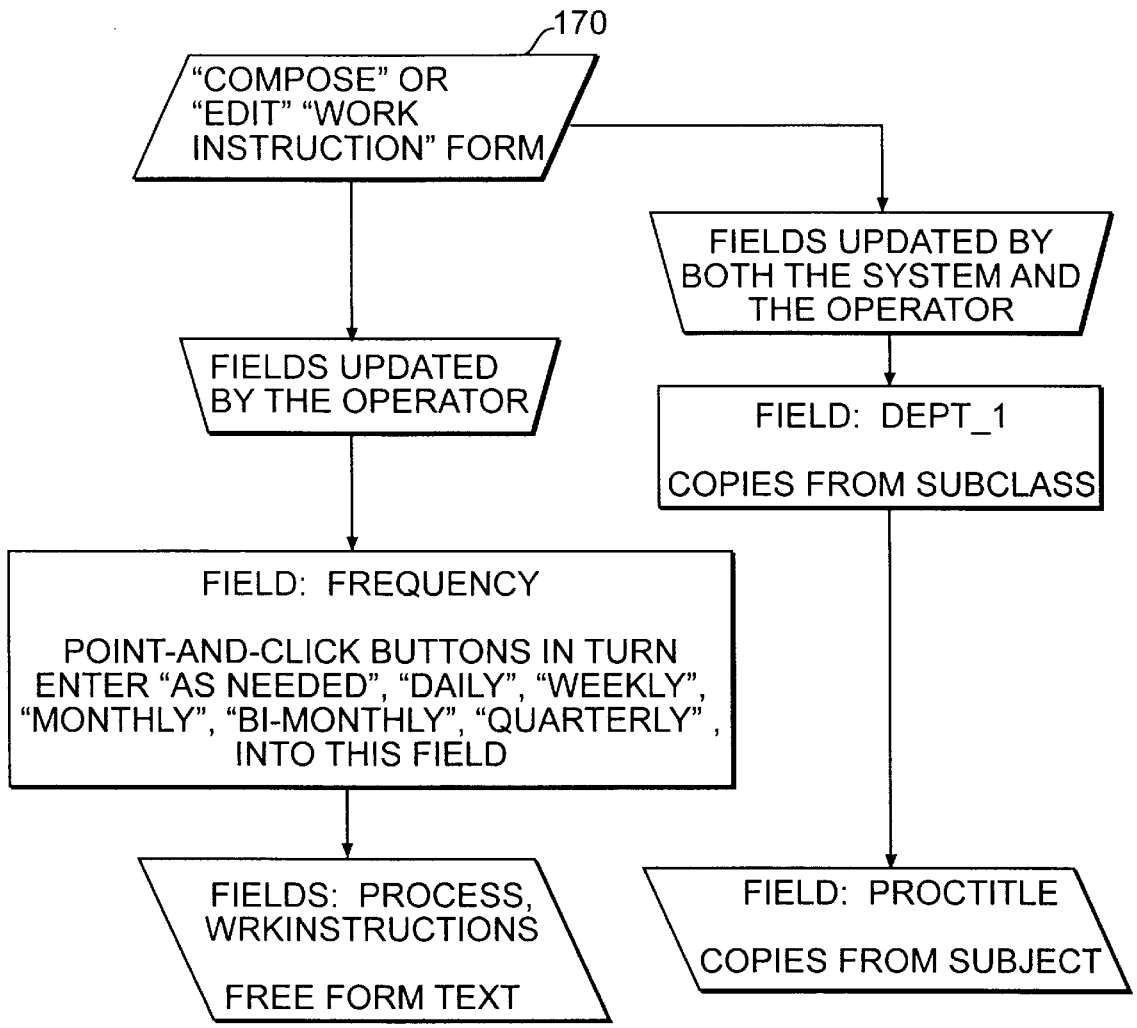
FIG. 21 is a chart for the controlled documents database menu item compose or edit of a "Work Instruction" form incorporating the present invention.
Figure 23:
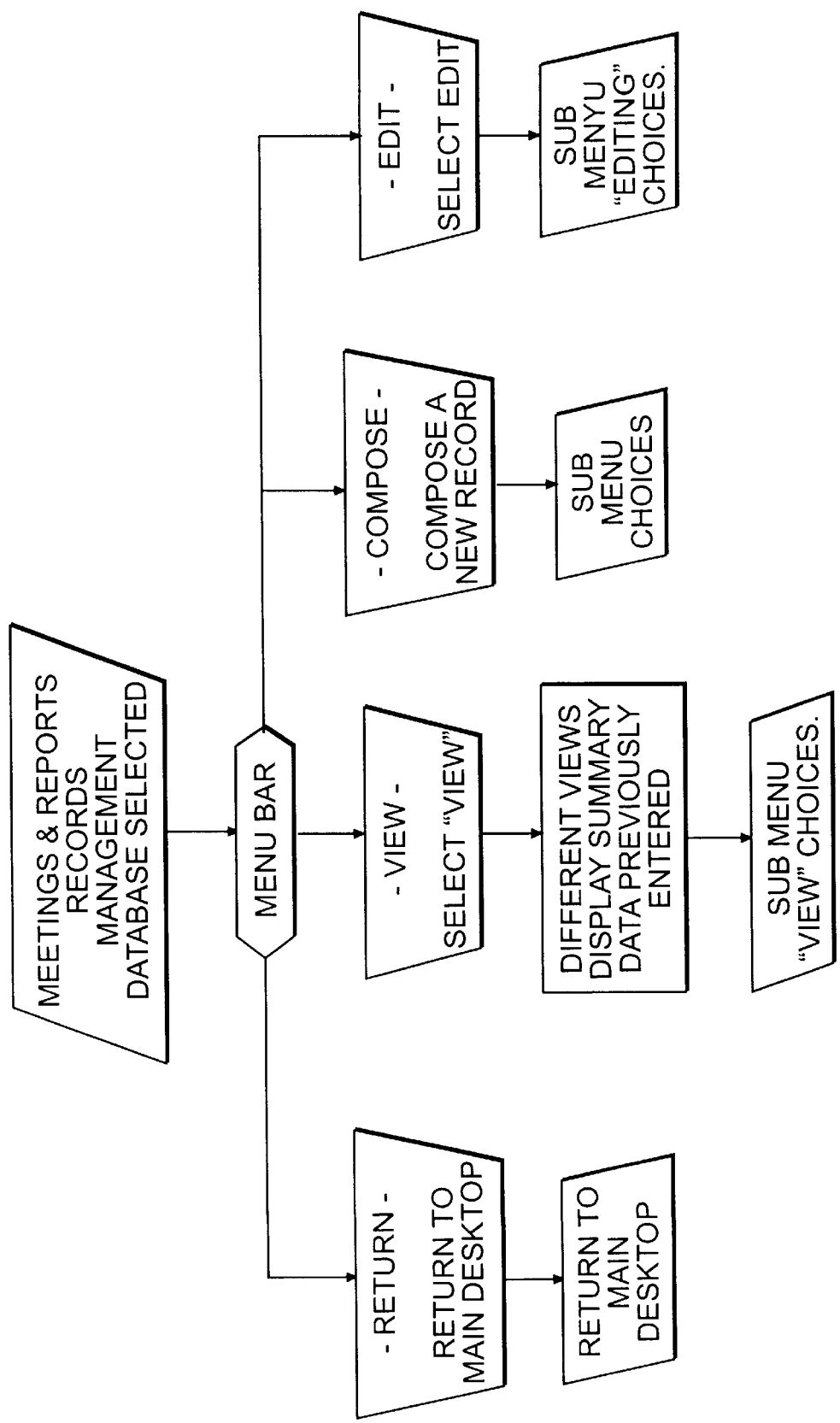
FIG. 23 is a chart of the first level menu selection of the records management database incorporating the present invention.

When the form "Work Instruction" is selected at block 170 of FIG. 10, the function at FIG. 21 occurs in connection with the form of FIG. 22. In addition to the Security and Revision Control portion of the form, a field "frequency" uses the point and click method for selecting one of the time periods for performance of the work covered by the specific instructions similar to the "Process" form. The field "process" defines the procedure for which the particular work instruction is used, and the field "wrkinstructions" is for entering the work description and instructions covered by this form.

The formation of "Views" are electronic filters which report on data entered into the database by way of the forms described herein. The electronic filters work much in the same way as traditional printed reports. The details with respect to the generation of "views" is the capability of the platform. The information displayed by the "views" incorporates the present invention. In accordance with the present invention, two views, a Document Master List and Documents Waiting Approval are used herein in order to satisfy certain requirements of ISO 9000.

MEETING AND REPORT RECORDS MANAGEMENT

A Records Management Database houses electronic records of meetings, action items, complaints, and monthly reports. and status reports Agenda's, Action items, and Meeting Minutes are automatically stored together, providing a complete package of historical information as well as accountability and closures. Automatic notification of task and action item assignment assumes that E-Mail of the platform is also activated and the person assigned the task is able to receive the E-mail. The details in connection with sending and receiving E-mail form no part of the present invention. However, auto-notification of the present invention is a function of the form. Complaint forms are tracked in this database to ensure customer complaints are handled in a timely manner. There are also notification features in the complaint form built in the point-and-click format common throughout the database. The complaint form is designed with customer satisfaction in mind and satisfies ISO 9000 requirements.

The Monthly Report Form is a Text with graphics format allowing the insertion of graphs, grids, tables, and other visual aids to enhance the report content. The sections are named in accordance with ISO 9000 requirements. Action Item Forms have the same autonotification found in the Meeting Action Item. Automatic notification of task and action item assignment is available assuming that appropriate E-Mail is also activated and the person assigned the task has E- Mail facilities. However, the auto-notification of the present invention is a function of the form.

The selection of the "Meeting and Report Records Management database, displays the last view used by the operator and provides the operator with the choice of "View", "Compose", "Edit" or "Return" as in the previously described database.

Figure 24:
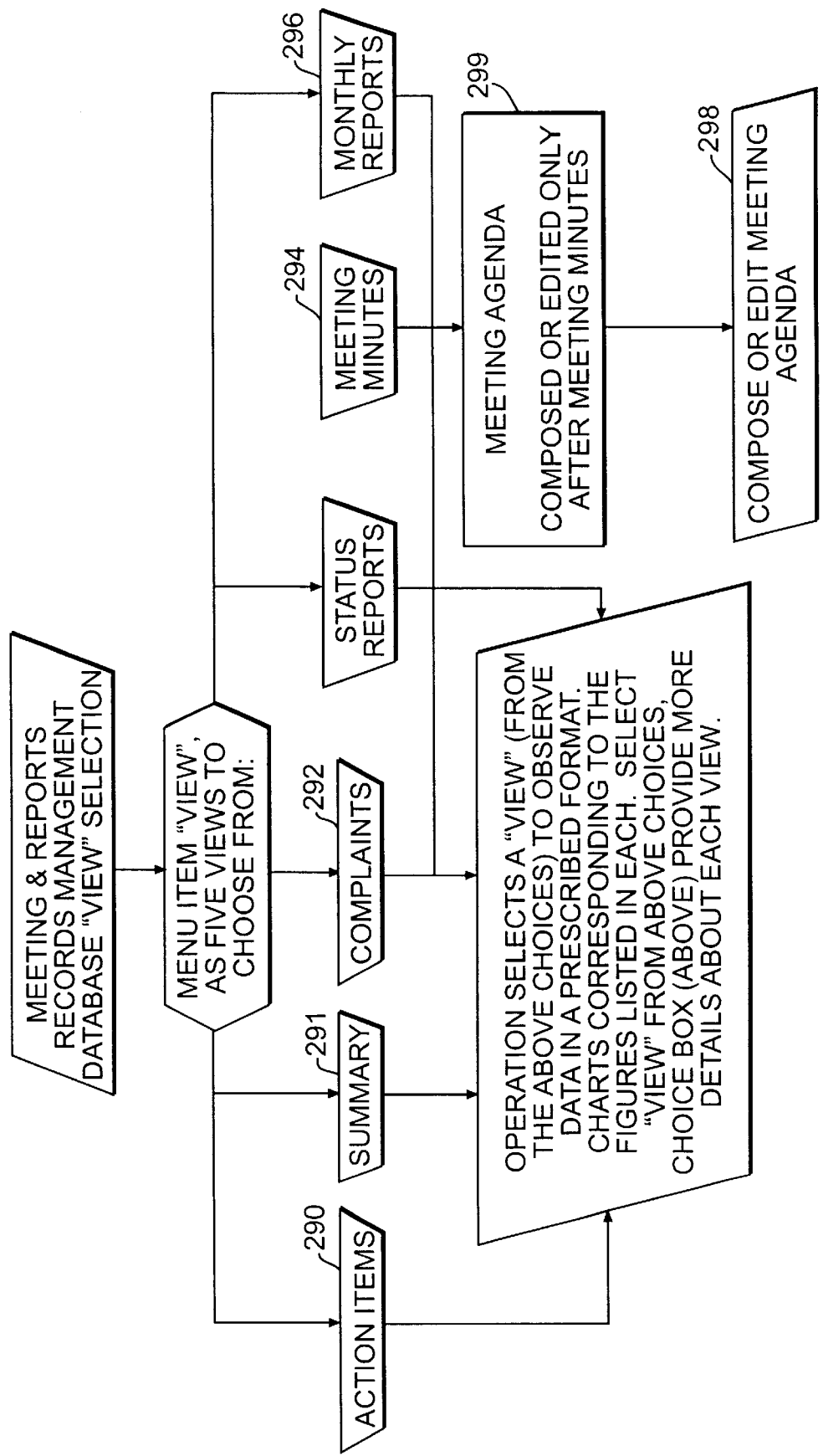
FIG. 24 is a chart of the view selections menu of the records management database incorporating the present invention.
Figure 25:
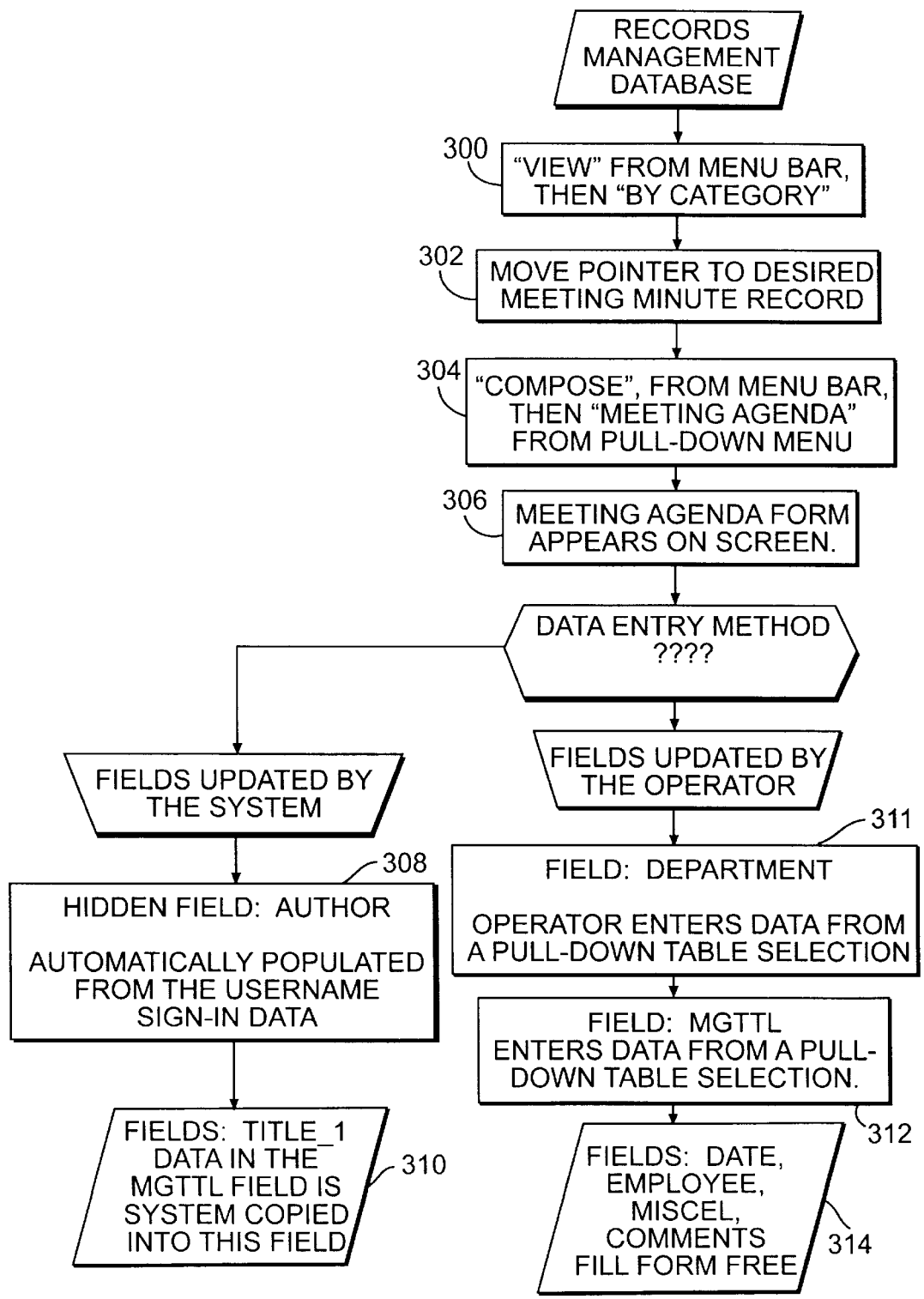
FIG. 25 is a chart of the views of a "Meeting Agenda" form for the meetings and reports database incorporating the present invention.

Referring to FIG. 24, the selection of "View" displays a menu bar giving the operator a choice between "Action Items" at 290, "Summary" at 291, which includes Action Items Complaints Status Report of Meeting Records in one view. "Complaints" at 292, "Status" at 293. "Meeting Minutes" at 294, or "Monthly Reports" at 296 and status reports. The selection of one of the choices provides corresponding data in a by category. The documentation in this system precedes the activity with which it is concerned, except for the completion of the form "Meeting Agenda" which can be created as indicated at 298 only after using a "View" to locate the Minutes of the Meeting for which the Meeting Agenda is to be prepared as indicated at 299. More particularly, and referring to FIG. 25 after selecting "View", and then selecting "By Category", the operator selects "Meeting Minutes at 300", and then moves the pointer to the desired meeting minutes record at block 302. Once this done, the operator then may select "Meeting Agenda" from the "Compose" designation of the menu bar as indicated at 304. The meeting agenda form then appears on the screen as shown at 326 in FIG. 26. The system automatically updates a hidden field "author" at 308 using data from the "username" field upon sign in, and automatically updates a hidden field "title-1" at 310 from the field "Mgttl." The operator enters data from a pull down table to update the field "department" at 311, which may be extended by the operator by typing in a new department name at the bottom of the table. The operator selects the title of the meeting at 312 from a pull down table at field "Mgttl" from which "title-1" is filled in. The operator then writes text in free form at field 'employee" which identifies the person assigned the action item, at field "miscel" which describes the business of the meeting and other comments at 314.

Figure 28:
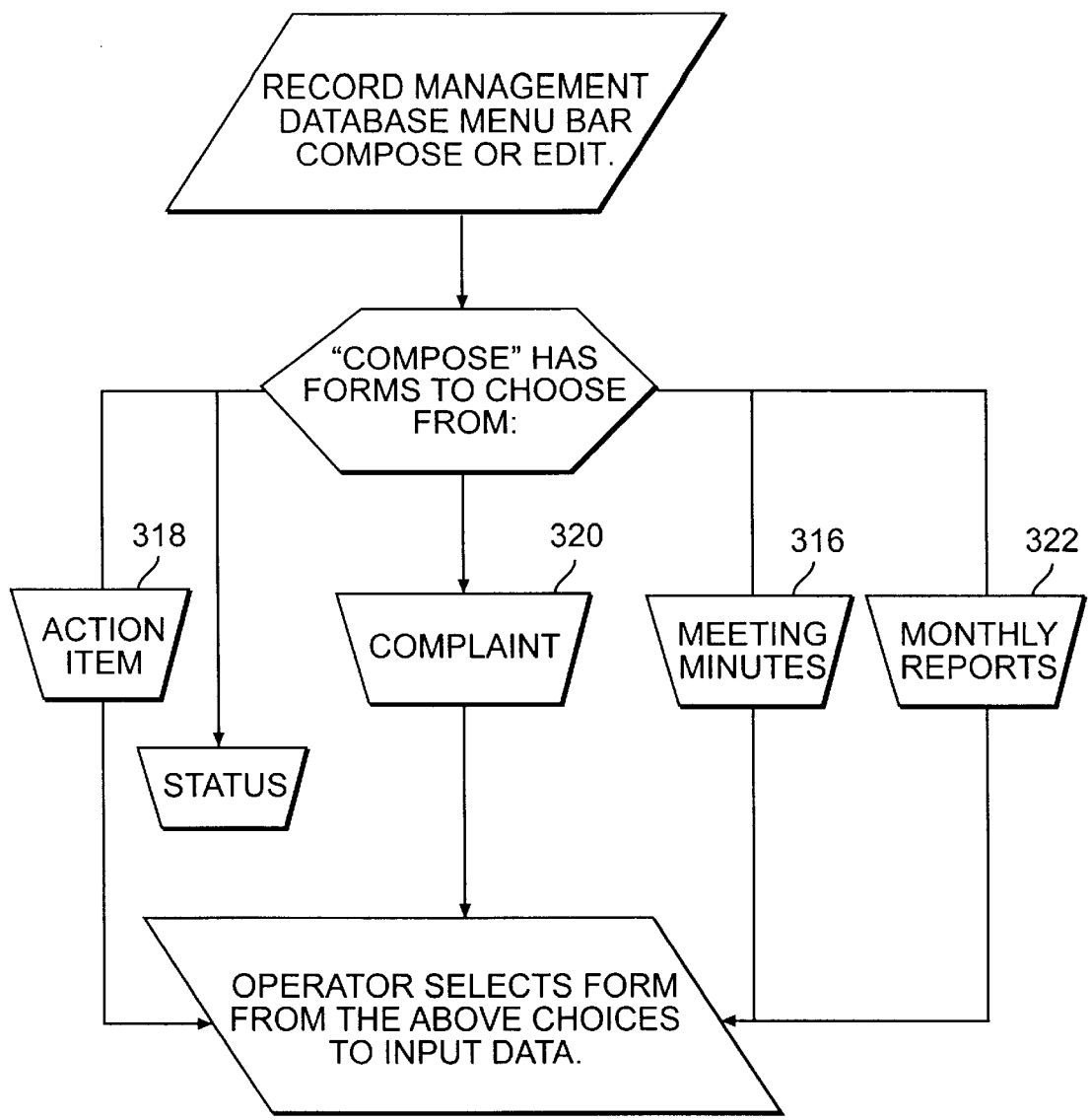
FIG. 28 is a chart for using the compose or edit menu of the records management database incorporating the present invention.

Referring to FIG. 28, in addition to the Meeting Minutes at 316 an "Action Item" form at 318, "Complaint" form at 320, and Monthly Reports" form at 322 may be selected from the menu bar.

Figure 29:
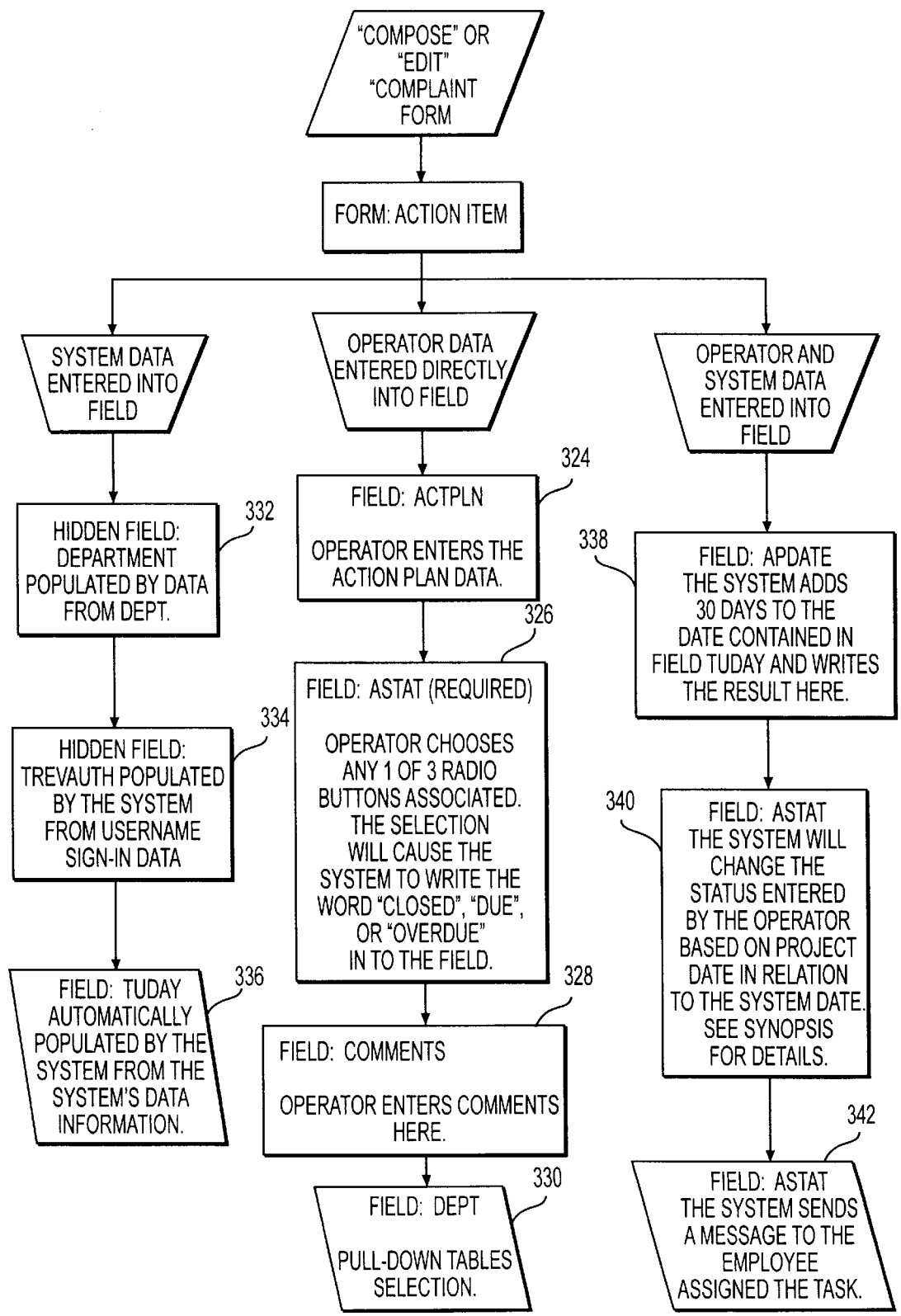
FIG. 29 is a chart of compose or edit menu item for an "Action Item" form incorporating the present invention.

The action item documentation is described in connection with FIGS. 29, 30, and 31. Upon display of the form, the operator enters a description of the action item in field "actem" the action plan in the field "actplan" at 324, and then is required to select one of three buttons, which will cause the system at 326 to write "closed", "due," or "overdue" at field "astat", which provides the status of the action item as of the date the information is entered. The user interface is set for Buttons, forcing the user to select one, and one only, of the allowable key words. This field also has a default value formula which presets the status to "Due" when the due date is greater than or equal to today. If the due date is less than today's date the status is set to "Overdue". The field "actpln" also has an input validation feature. First it checks to ensure that the status value is not null. If it is null an error message is presented to the user. If the status=Due, the system looks at the name in the "Employee" field. It then sends an E-Mail message to that individual and advises where the task can be reviewed. If the status="closed", a message is sent to the author of the action item (originator) informing the person that the one to whom they assigned the action item has completed it and it is ready for review. The operator then may enter appropriate comments in the field "comments" at 328, and identifies the department from a pull down selection in the field "dept" at 330. This table may be extended by the operator.

This form has three hidden fields, "department", "trevauth", and "tuday" which are automatically filled in with the data from the field "dept" at 332, and the "username" sign in data at 334, and the systems date information at 336, respectively. The field "dept" checks to ensure the "Dept" field is not null. If it is a Failure message is sent to the operator forcing an entry. If the field is not null the user is allowed to save the document and exit. In the field "apdate" at 338 the system adds 30 days to the date contained in the field "tuday". The operator has the privilege of changing this displayed date. In the field "astat" at 340, the system changes the information selected by the operator based on the project date in relation to the system date.

Referring to FIGS. 30 and 31 "Assign Action Item" is populated by free form text of the Assignees name. Clicking on button "Create New Action Item" will cause a new "Action Item" form to open for the operator. The operator is allowed to enter all necessary information to create the new action item. Clicking on the button "Edit Action Item" displays the form of FIG. 31, which is similar to FIG. 30 except for the inclusion of the buttons at 344 indicating the status of the item.

Figure 32:
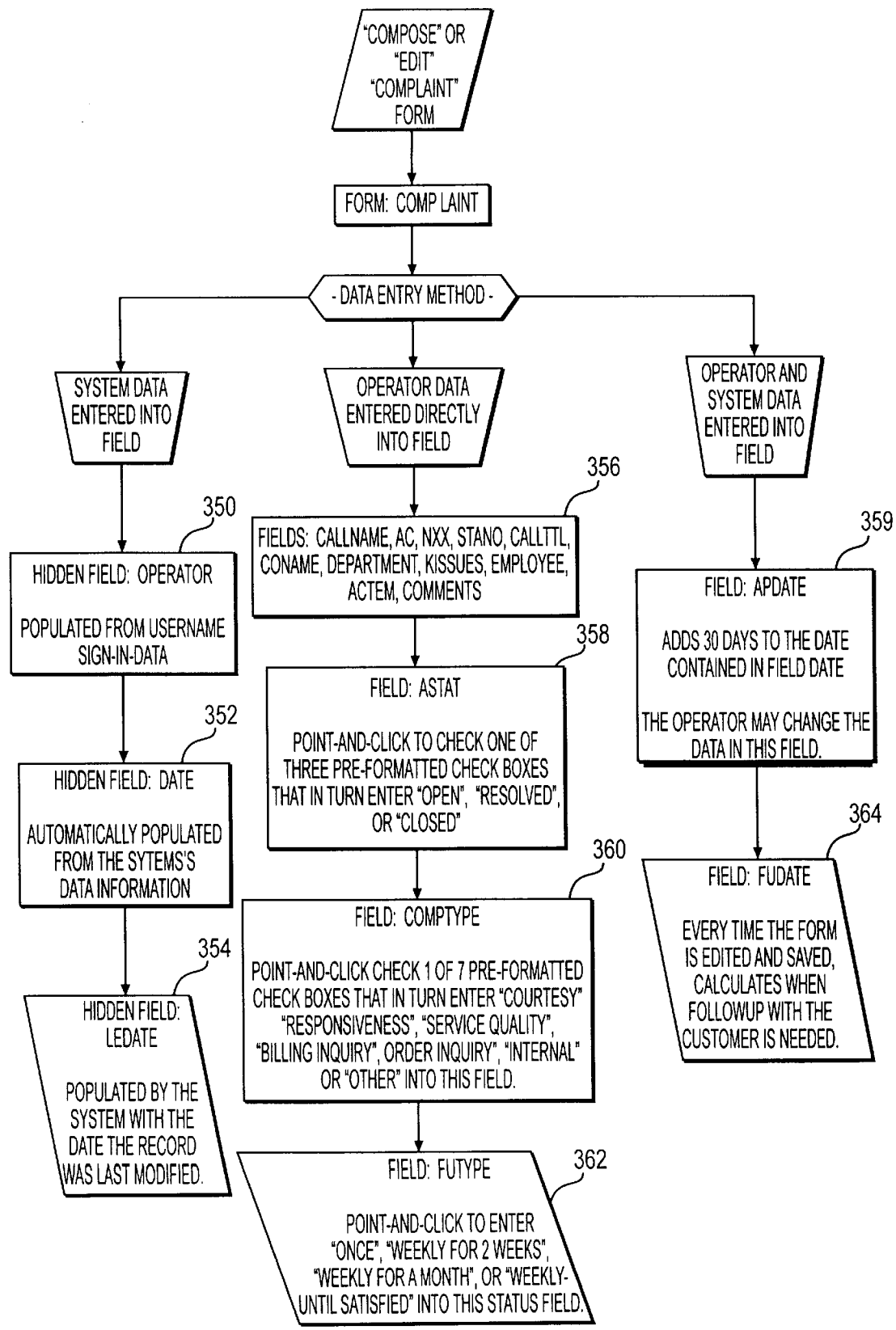
FIG. 32 is a chart of the menu item compose or edit for a "Complaint" form of the records management database incorporating the present invention.

The complaint form, which is selected by the menu bar at 320 of FIG. 28 will be described in connection with FIGS. 32–34. The form has 3 hidden fields into which the system automatically inserts data. When the document is opened, the system looks at the user name and enters it in the field "operator" at 350. The field "date" is populated by the system's date information at 352, and "ledate" at 354 where the system enters a date and time stamp indicating the last time the document was modified. Which is populated at 354 by the date on which the record was last modified.

The operator enters the name of the complaining party, the telephone number of the call back, callers title, if known, the name of the company the caller represents, department receiving complaint, description of the complaint, actions taken to resolve the issues and satisfy customer, and comments of the operator, in the fields "callname", "ac", "nxx", "stano", "callttl", "coname", "Department", "Kissues", "employee", "actem", and "comments".at block 356. In the field "astat", the operator uses the point and click feature to open one of three pre-formatted check boxes that in turn enter "Open", "Resolved", or "Closed" into this status field at 358. In the field "comptype" at block 360, the operator uses the point and click feature to enter the type of complaint by checking one of seven check boxes that in turn display "courtesy", "Responsiveness", Service Quality", Billing Inquiry", "Order Inquiry", "Internal", or "Other" in this field.

The field "apdate" at 359 is an editable field with a default value. If the user does not choose to enter a value in this field, one will be assigned. The date-time value is read and adjusted to be that value plus 30 days.

Clicking on the button, "Notification" causes the system to take a snap-shot of the completed form and paste it into an E-Mail message that may then be addressed by the operator and sent. In the field "futype" at 362, the operator uses the point and click to select "Once", "Weekly for two weeks", "Weekly for a month", or "Weekly until satisfied".

When the complaint form is saved, the field "fudate" at 364 calculates when follow up with the customer is needed. It checks to see if the date in the field "apdate" is less than the date in the field "ledate". If it is, is adds 9 days to the date in "ledate" and enters the new date in the field "fudate". If the date in "apdate" is greater than the date in "ledate" nothing is entered in the field "fudate". If "apdate" is less than "ledate" and the field "astat" is equal to "Closed", then this field is set to null. Other wise nothing happens.

Figure 35:
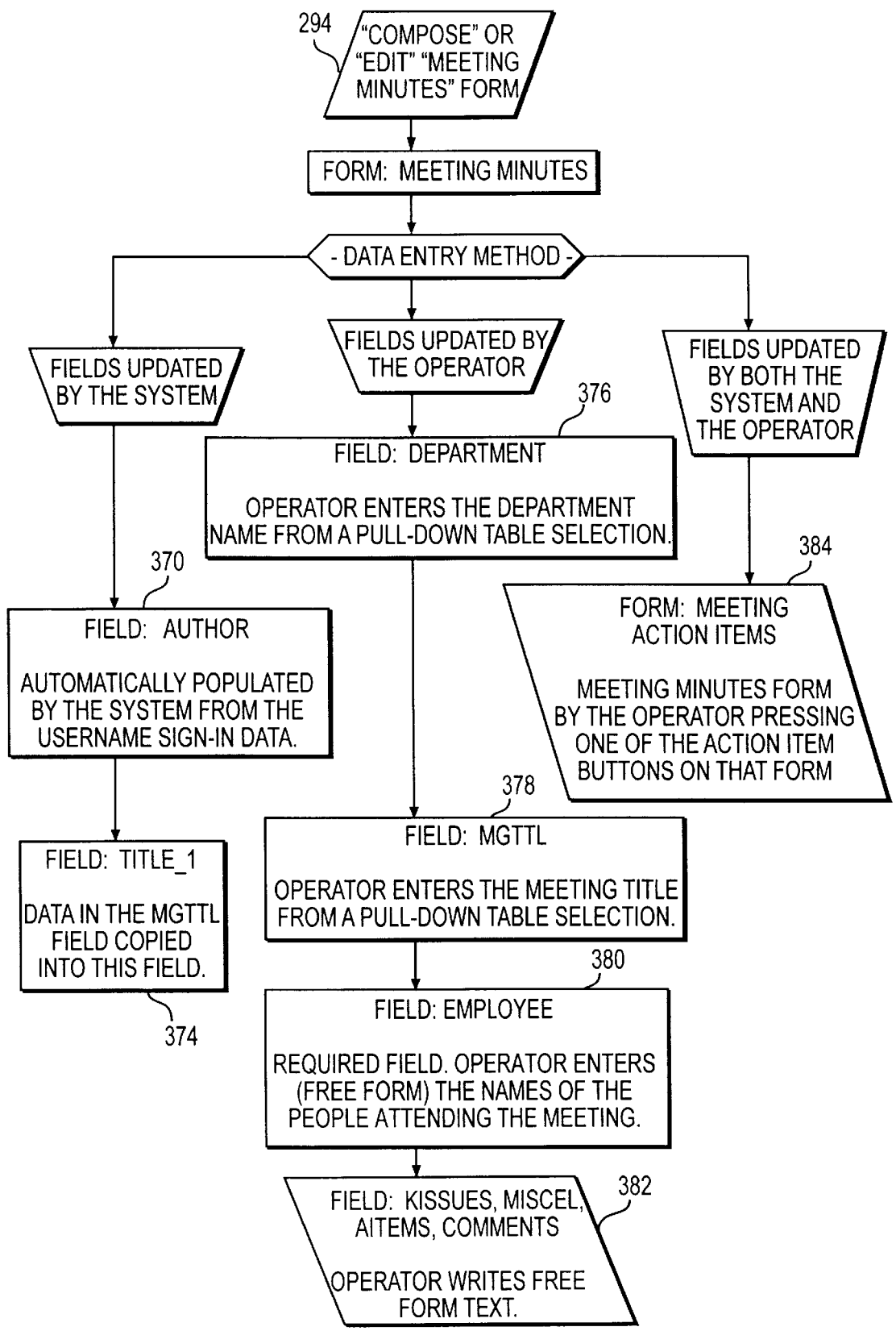
FIG. 35 is a chart of the menu item compose or edit for the "Meeting Minutes" form incorporating the present invention.

As previously mentioned, the agendas action items and meeting minutes are stored together, and will be described in connection with FIGS. 35–37. When the form "Meeting Minutes" is selected at 294 of FIG. 24, the system automatically populates the field "author" from the "username" sign in data at 370 and data from the field "title-1 at 374. The operator selects from a pull down table the appropriate department of the organization from the field "department" at 376 and the title of the meeting from the field "mgttl" at 378. The operator also enters the names of the people attending the meeting in the field "employee" at 380. Filling in this field is required, and is a condition precedent to saving the document. The operator then in free form text enters the key issues of the meeting in the field "kissues", the general business of the meeting in field "miscel", new action items in the field "aitem", and comments in the field "comments", all as indicated at block 382.

The action items as a result of the meeting are entered in a form which is displayed in response to the point and click buttons referred to at 384. The screen layout for edit mode provides for the entry of new action items, the log for which is activated by clicking on buttons 384.

The action item form has a field entitled "modified" which is a hidden and computed, which enters a date and time stamp which indicates the last time the document was modified. The fields "department", "tuday", "employee", "actem" are populated with the same type of information as similar fields in previously described forms. The field "apdate" is an editable field with a default value formula. If the user does not choose to enter a value in this field, one will be assigned for them. The field formula reads the date-time value in the field identified in the formula and adjusts it to be that value plus 30 days. The field "actplan" is a field requiring data similar to the form "Action Item", which is used when such action is not the result of a meeting. It accepts free form text and is dedicated to a description of the action plan by the operator.

The field "astat" also has a default value formula which presets the status to "Due" when the due date is greater than or equal to today. If the due date is less than today's date the status is set to "Overdue". This field also has an input validation formula. First it checks to ensure that the status value is not null. If it is null an error message is presented to the user. If the status=Due, the system looks at the name in the "Employee" field. It then sends E-Mail message to that individual and tells them where to go to review the task. If the status="closed" a message is sent to the author of the action item (originator) informing them that the person to whom they assigned the action item has completed it and it is ready for review.

The allowable key words formula of the field "Dept" looks at the View spelled out in the formula (By Category\\Action Items) in the current database to allow the user a choice of existing key words. If the keyword required by the user does not exist, the "Allow Values Not In List" flag has been set to "YES" allowing the user to add a new keyword. This formula checks during the saving of the document to ensure that there is an entry in the field "Dept". If not an error message is presented to the operator. If an entry is present the operator is allowed to save and exit the document.

Clicking on the button "edit action item" causes the current document to be edited. Clicking on the button "save changes" causes the current document and any changes to be saved.

Clicking on "Assign Action Item" button permits operator to enter the name of an individual in free text. Clicking on the button "Create New Action Item" causes a new "Action Item Form" in which data may be entered, to be presented to the operator, as previously mentioned.

Figure 38:
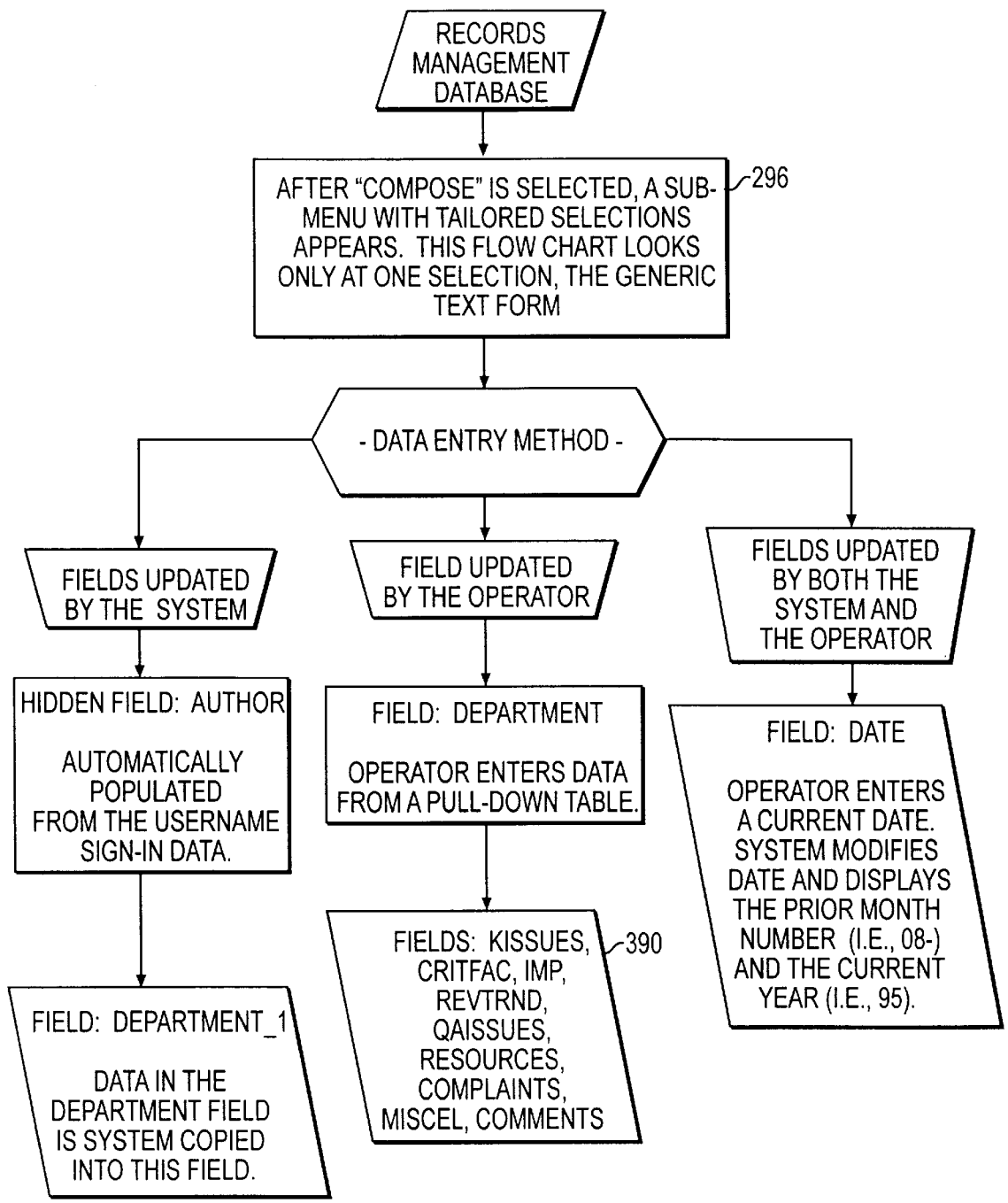
FIG. 38 is a chart of the "Monthly Reports" for the records management database incorporating the present invention.

When the operator selects the form "Monthly Reports" at block 296 of FIG. 24, the form at FIG. 39 is displayed and will be discussed in connection with the flow chart of FIG. 38, and the edit form of FIG. 40. As shown in FIG. 38, this form has the fields "author" and "department-1" which are automatically populated by data from corresponding fields. The data entered in the "department-1" is copied from the field "department" entered by the operator. Similarly the field "date" is populated by both the operator and the system. When the operator enters the current date, the system automatically displays the prior month and current year.

As in all of the forms herein, the Allowable key words formula looks at the View spelled out in the formula (By Category\\Monthly Reports) in the current database to allow the user a choice of existing key words in the first column. If the keyword required by the user does not exist, the "Allow Values Not In List" flag has been set to "YES" allowing the user to acid a new keyword.

The form of FIG. 39 has several field, all of which are populated by free form text as shown in FIG. 38 at block 390.

Referring to FIG. 39, which shows the arrangements of the fields, field "Kissues" is for the key issues, critical success factors are described in field "critifac", and process improvements are entered in field "imp". Reverse trends are to be inserted in the field "revtrnd", process management issues are entered in "qissues" and resources and personnel are inserted in field "resources". Customer concerns and inquiries, both internal and external, are included in the field "complaints".

The form for editing the monthly report is shown in FIG. 40 and in addition to the identifying fields includes the free form text fields of block 390 of FIG. 38.

Project Management

The Project Management database is created to facilitate the management of projects which consist of many inter-related tasks and cross-functional teams. This database has features which ease the administrative burden of managing this type of long-term project. It has auto-notification found in the Records Management Database action items, automatic timeline generation, workload management, conflict management, and both project level and task level issue tracking features. Project time lines are automatically generated as project tasks are created and assigned start and finish dates. In order to manage the timeline, the tasks themselves must be managed. A Project Planning Document provides a mechanism by which an organization can satisfy the ISO 9000 requirements for quality planning and productively manage a long-term project at the same time. This document allows the definition of a project title, Project owner, review authority, steering committee, team leader, team members, and Project due date. There are buttons on this document which allow tracking of Project related issues, creation of project tasks, and free text fields for defining project related teams and authorities.

"Project Task" is a form in the database called by using the mouse to click on a button in the Project Planning Document. It is not included in the "Compose" menu and may only be accessed via the Project Planning Document. This form allows for task start and finish dates, task assignment, tasks definition, tasks related issue tracking, auto-notification of task assignment, status and completion, as well as Project timeline management and new task generation. "Project Tasks" are "response" documents or descendants of the Project Planning Document.

A "Problem" form is called from the "Project Tasks" form by using the mouse to click on one of the buttons presented to the operator. It is not included in the "Compose" menu and may only be accessed via the "Project Tasks" form. "Problem" documents are "response" documents or descendants of the "Project Tasks" document from which they were created.

Figure 41:
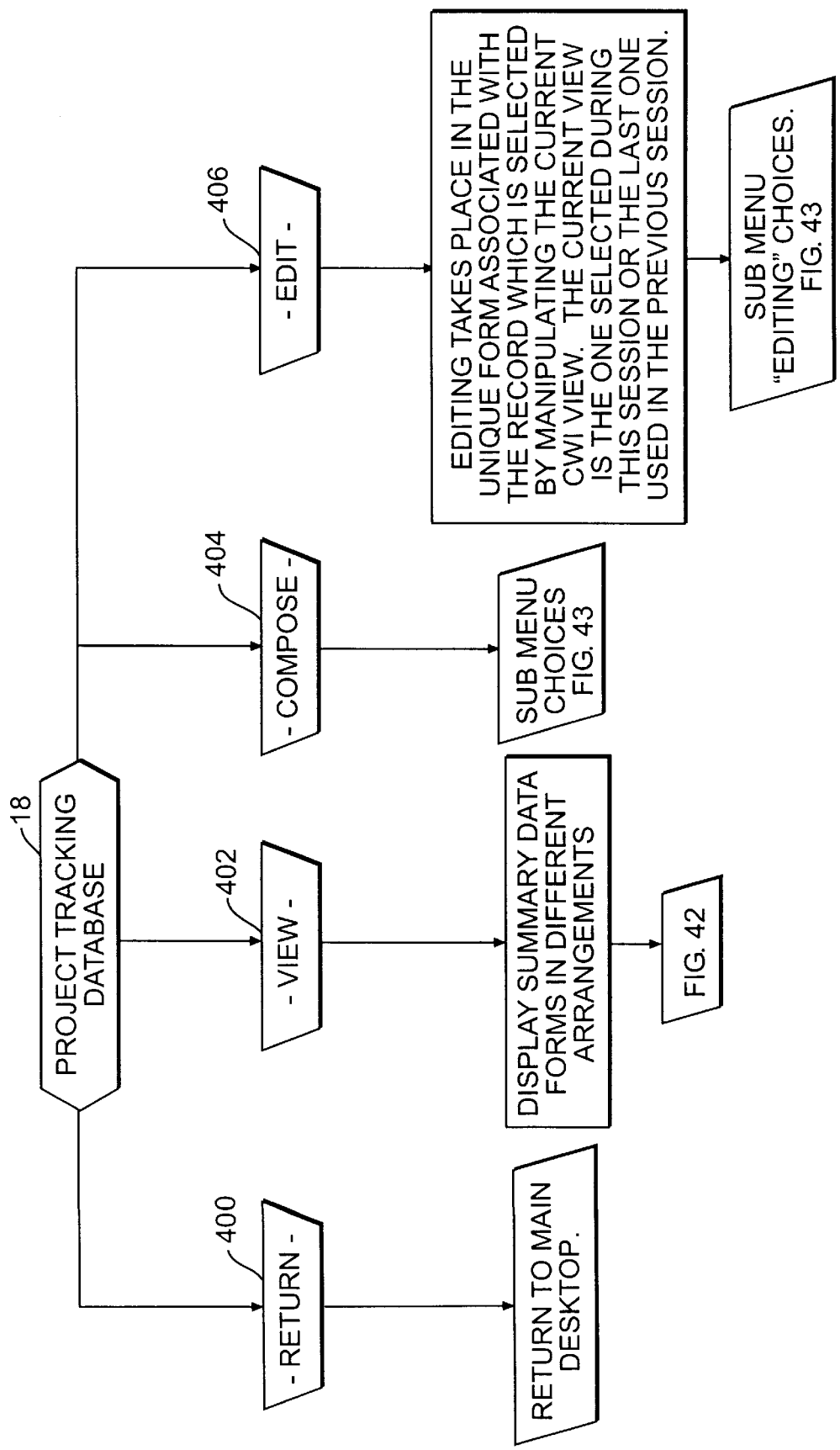
FIG. 41 is a chart of the first level menu selection for the project tracking database incorporating the present invention.
Figure 42:
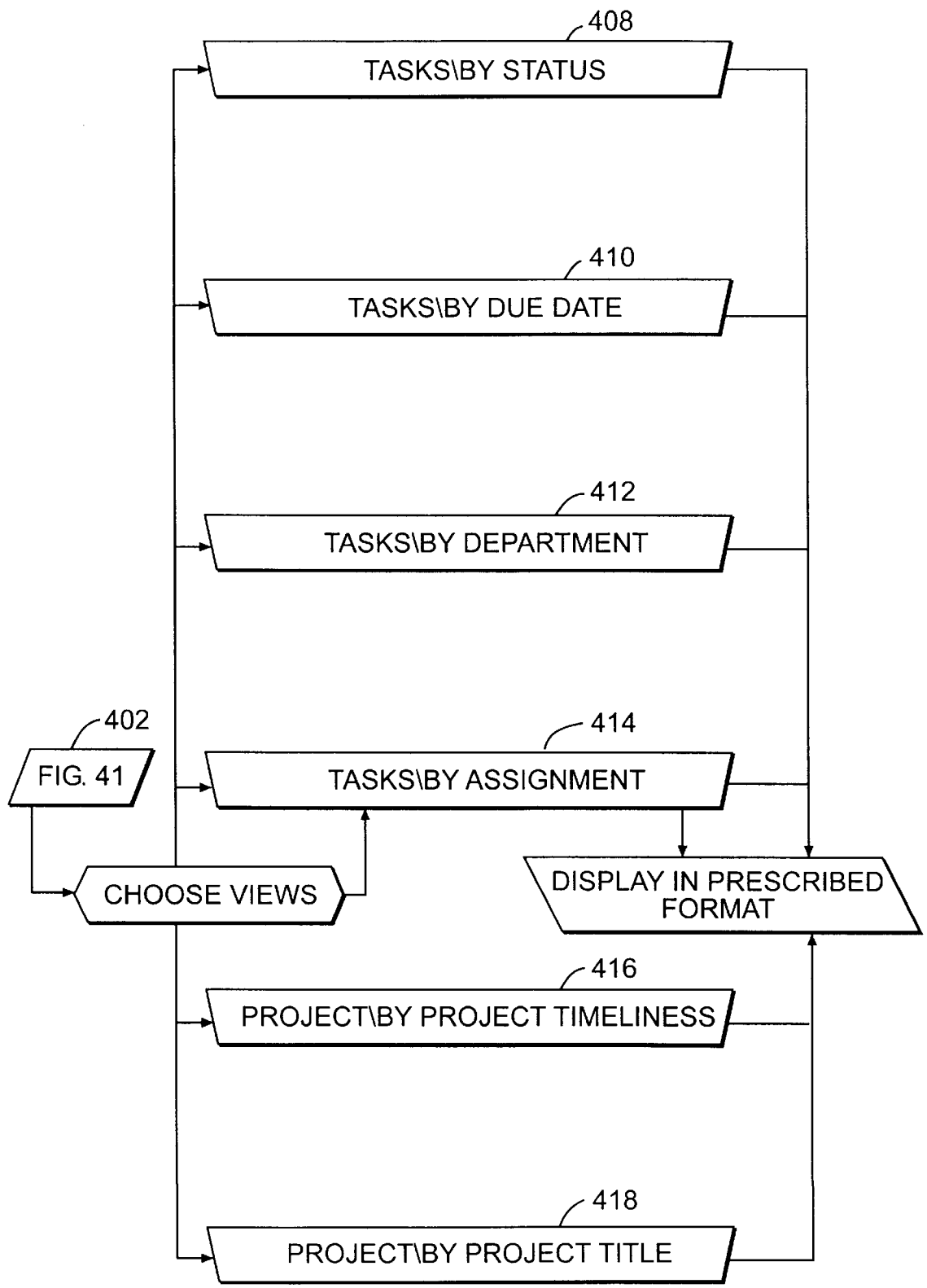
FIG. 42 is a chart of the project tracking database view menu incorporating the present invention.
Figure 43:
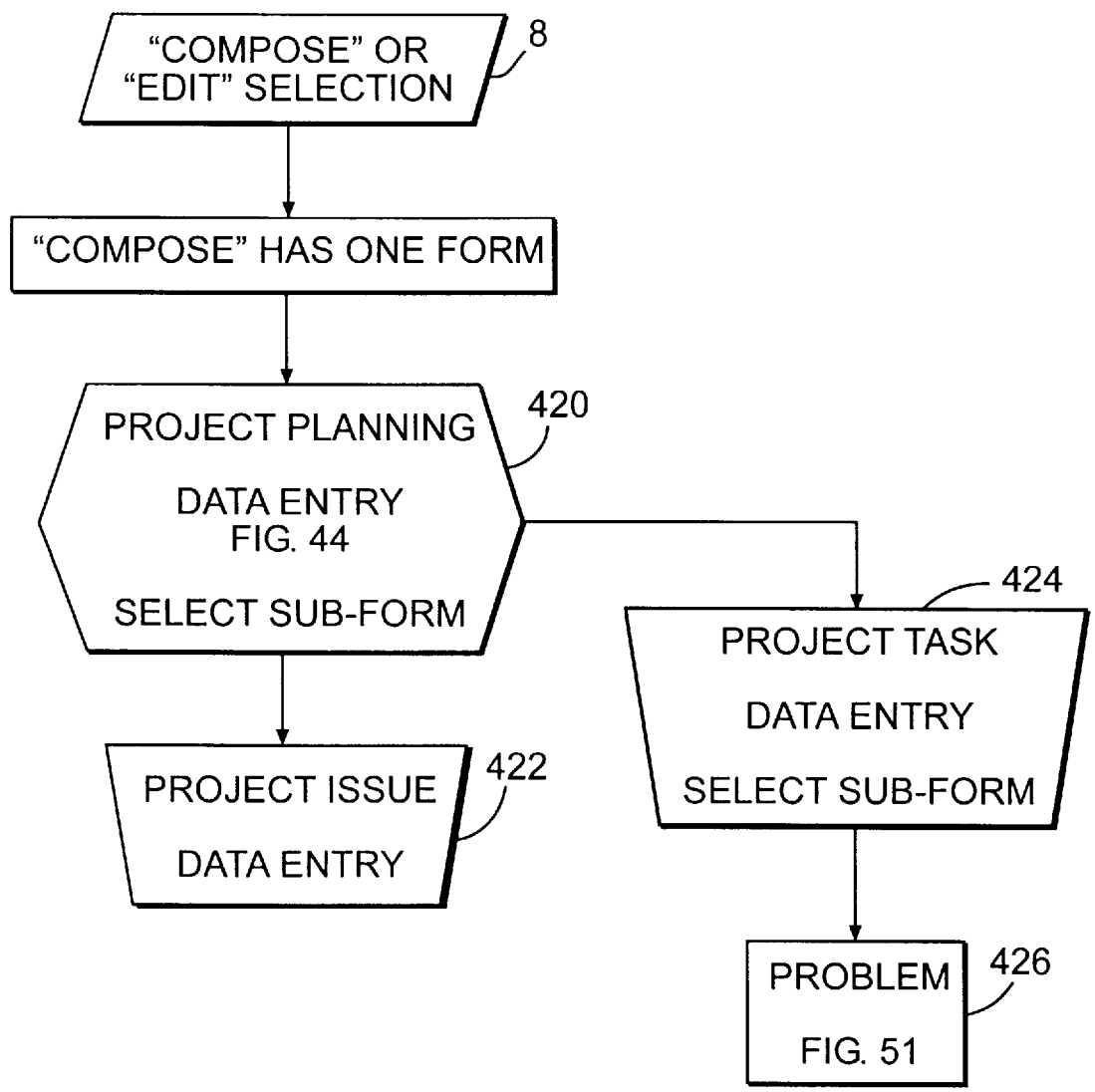
FIG. 43 is a chart for using the project tracking database compose or edit forms menu incorporating the present invention.

"Project Issue" forms are called from the project Planning Document by using the mouse to click on one of the buttons presented to the operator. This form is not included in the "Compose" menu and may only be accessed via the "Project Planning" Document. "Project Issue" documents are "response" documents or descendants of the project Planning Document from which they were created. Referring to FIG. 41, the project tracking database is selected from the main menu bar which includes a conventional "Return" selection at 400, a "View" selection at 402, a "Compose" selection at 404 and an "Edit" selection at 406. The different views are shown in FIG. 42. The operator choices upon selecting compose or edit are shown in FIG. 43.

Referring to FIG. 42, upon selection of "View" at 402, the operator has six choices, a listing of tasks by status at 408, a list of tasks by due date at 410, a list of tasks by assignment at 412, a list of tasks by department at 414, a list of projects by project timeliness at 416, or a list of tasks by project title at 418. Referring to FIG. 43, when selecting project tracking database, the operator has only one form to choose from, the project planning form at 420. Within the project planning form are buttons for selecting either a project issue form at 422, a project task form at 424, or a problem form at 426.

Figure 44:
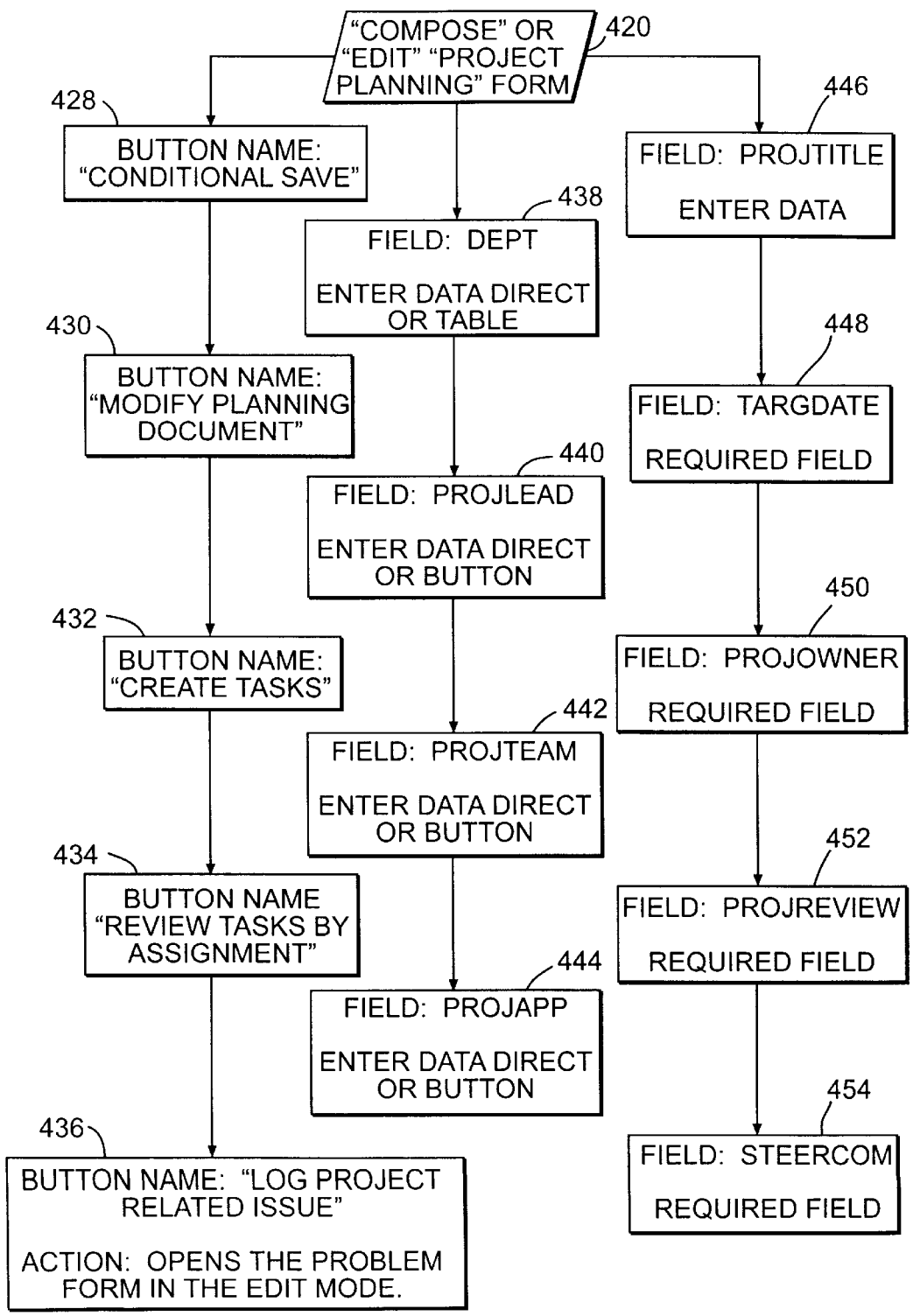
FIG. 44 is a chart for a "Project Planning" form of the compose or menu items of the project tracking database incorporating the present invention.
Figure 46:
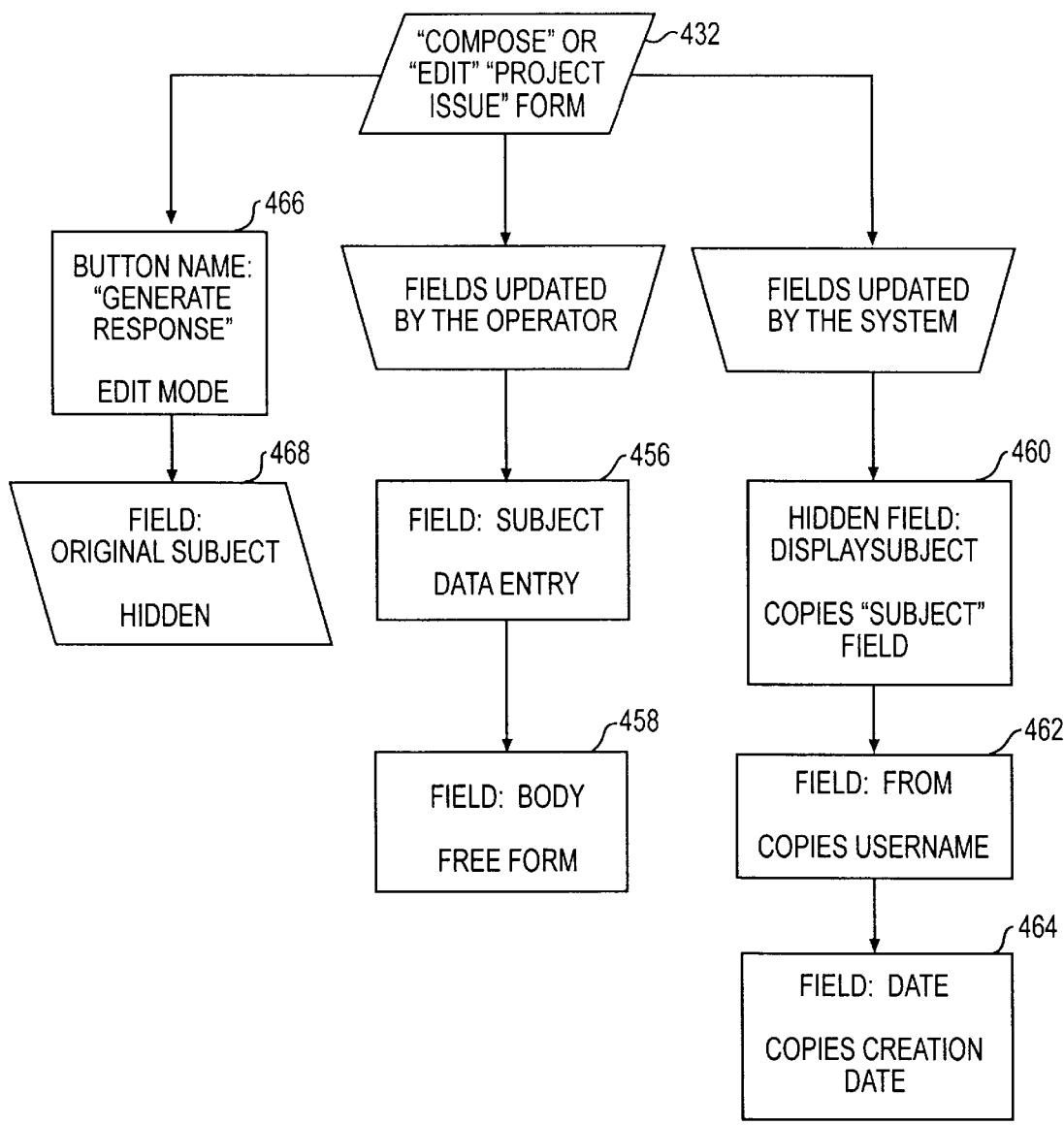
FIG. 46 is a diagram of a known "Project Issue" form of the project tracking database as a result of pressing a "Log Project Related Issue" button on the "Project Planning" form of the project tracking database which is used in the system of the present invention.

Referring to FIGS. 44, 45, and 46, the planning form has several buttons. One is a "save" button at 428, which when operated, saves the form after all required fields are completed. A "modify planning" button at 430 allows the operator to edit the project planning form. A "create tasks" button at 432 opens the project issue form by putting it on the screen in the edit mode.

A "Review tasks by assignment" button at 434 opens the corresponding view. A "Log Project Related Issue" button at 436 opens the "Problem" form and puts it on the screen in edit mode. The "problem" form and the "project issue form are linked to and descendants of the project planning form.

In the field "Dept" at 438 the operator may enter the data identifying the department directly, or use an extendable pull down table selection. In a field "projlead" at 440 and a field "projteam at 442, an operator may enter the name of the project leader and names of the project team, respectively. In the field "projapp" at 444 an operator enters the names of the persons who must approve the project. The operator enters the title of the project in free form in the field "projtitle" at 446.

The project planning form has several required fields where entry of data is required as a condition precedent to saving the form. Field "targdate" at 448 requires entry of a valid date for completing the project. Field "projowner" at 450 requires entry of the name of the project owner, either through direct entry or from the list of names. Field "projreview" at 452 and field "steercom" at 454 require entry of the names of the review authority and steering committee, respectively, either directly or from the aforesaid list of names.

Referring to FIGS. 46 and 47, the detailed arrangement of which forms no part of the present invention, the "Project Issue" form is displayed as a result of pressing the "Log Project Related Issue" button on the planning form. When displayed, the operator enters free form text describing the subject matter of a related issue directly into the field "subject" at block 456 and data directly concerning the current issue in the field "body at 458. A hidden field "display subject" is automatically populated by data entered in the field "Subject". The system frames the with a leading and trailing carriage return at 460. The field "from" and "Date" is automatically populated from the username sign in data and the date the new documented was created at 462 and 464, respectively. A button" "Generate Response" at 466 on the form when clicked creates another "project issue" form and puts it on the screen in the edit mode. This also is a response form and becomes a child of the "Project Planning" document. A field "original subject" at 468 is hidden for value storage.

Figure 48:
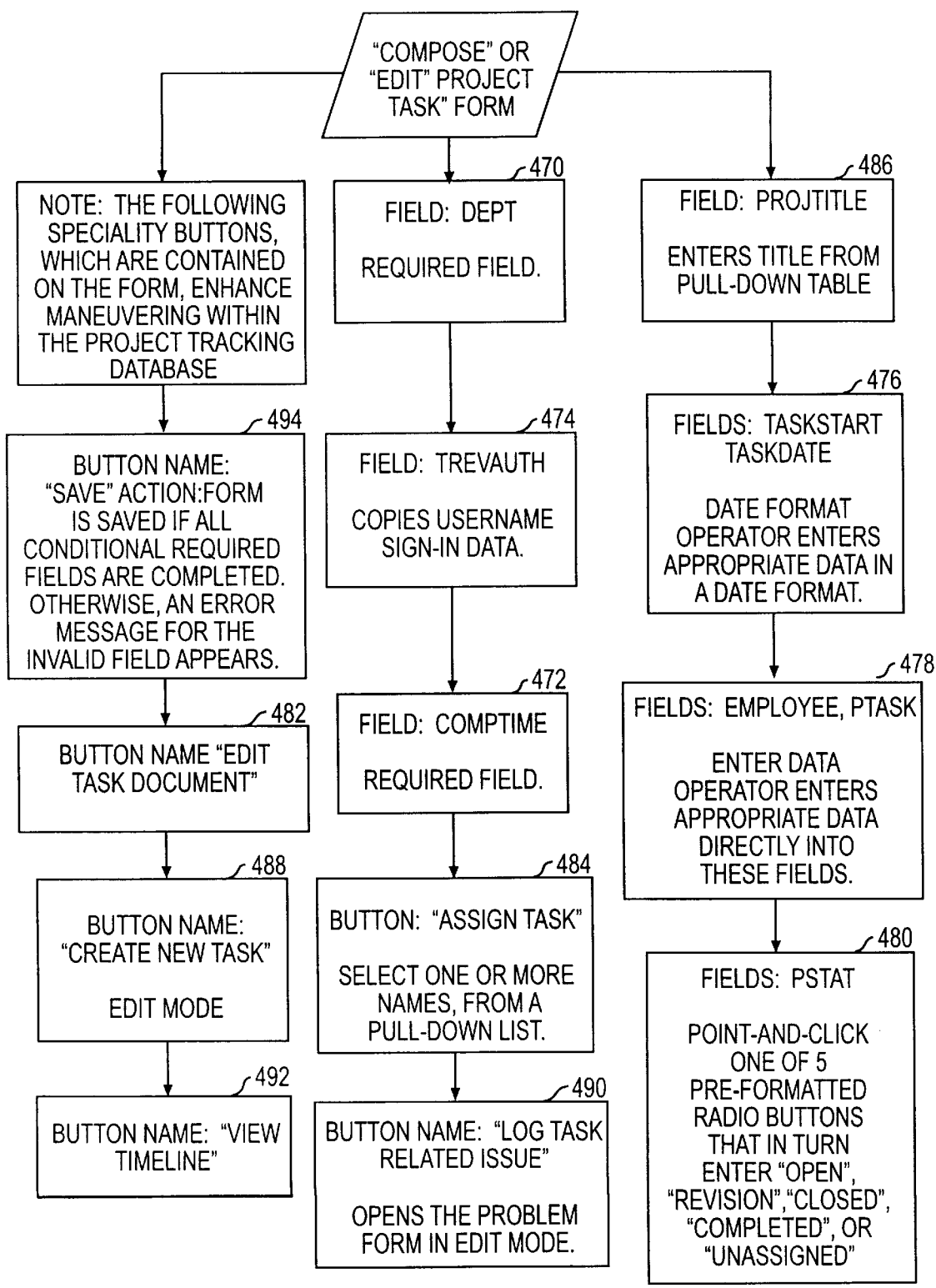
FIG. 48 is a chart of the form "Project Issue" as a result of pressing the "Project Task" button of the "Project Planning" form incorporating the present invention.

Referring to FIGS. 48, 49, and 50, a form "Project Task is displayed by operating the button "Create Tasks" of the "Project Planning" form. The form has required fields, which are populated by pull down selections, such as "dept" at 470 and "comptime" at 472. Additionally, field "trevauth" at 474 is automatically populated upon display of the form, by the "username" data at sign-in. There are other fields where the operator enters appropriate data directly, such as "taskstart" and "taskdate" at 476, where it is entered in appropriate date format; and "employee"" and "ptask" at 478 where it is entered in free form or from the previously mentioned name list. In the field "pstat" at 480, the operator uses the point and click feature to operate one of the pre-formatted buttons that in turn enter "open", "revision", "closed", "completed, or "unassigned", into the field. The form also includes several buttons where the operator is permitted to make selections. A button "Edit Task Document" at 482 permits the operator to edit the "Project Task Document" form, the button "Assign Task" at 484 permits the operator to select one or more names from a pull down list, to assign a task, and in the field "projtitle" at 486 the operator selects the title from a pull down table. A button "Create New Task" at 488 opens a new "project tracking" form, which form is a descendent of the "Project Task" document. A button at 490 "Log Task Related Issue" opens the "Problem" form and puts it on the screen in edit form. A button at 492 "View Timeline" opens a fully expanded "Project Timelines" view; and a button "Save" at 494 causes the document to be stored if all the required fields are populated.

Figure 51:
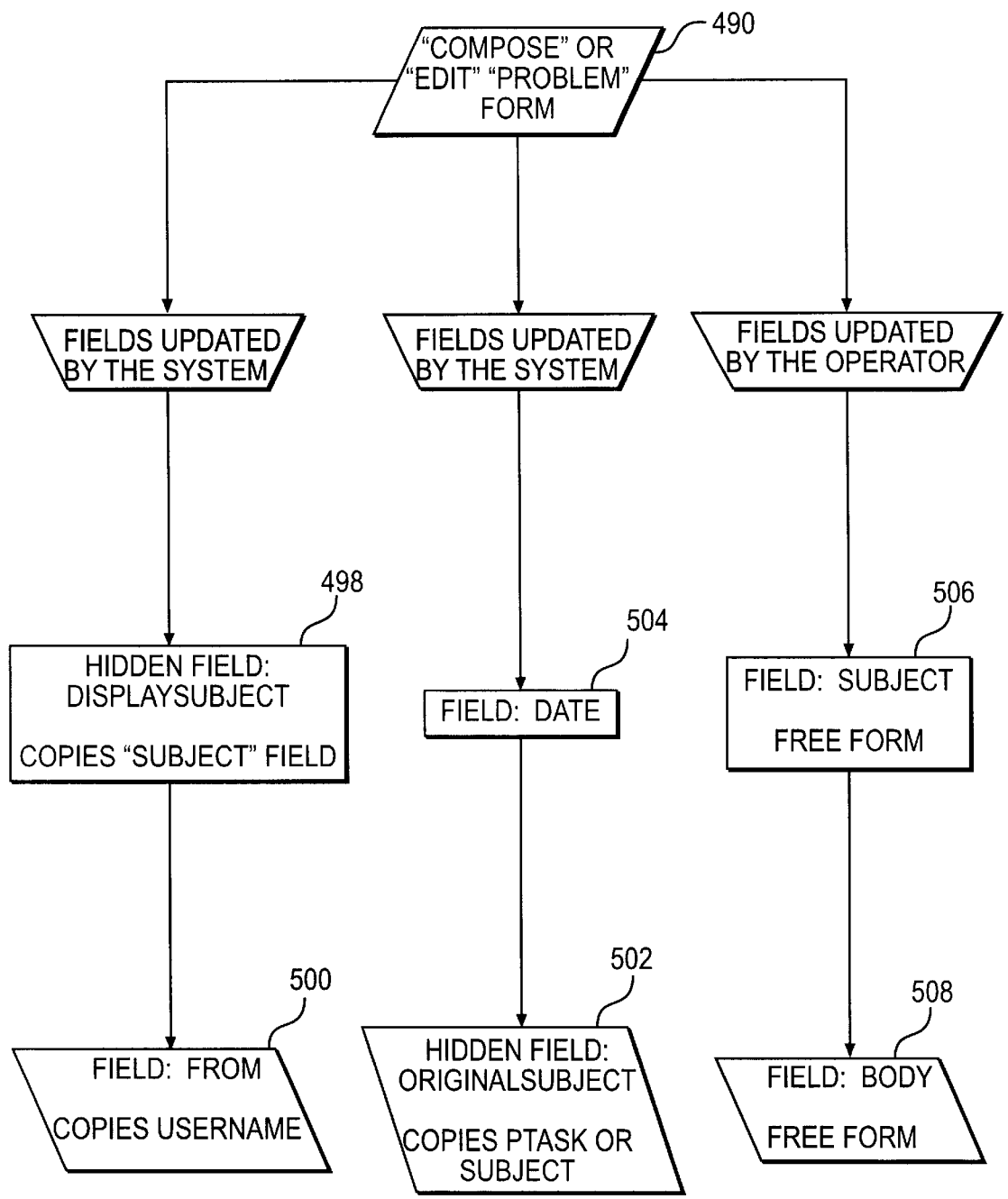
FIG. 51 is a chart of a known "Problem" form of the project tracking database as a result of pressing "Log Task Related Issue" button on the "Project Task" form used with the system of the present invention.
Figure 52:
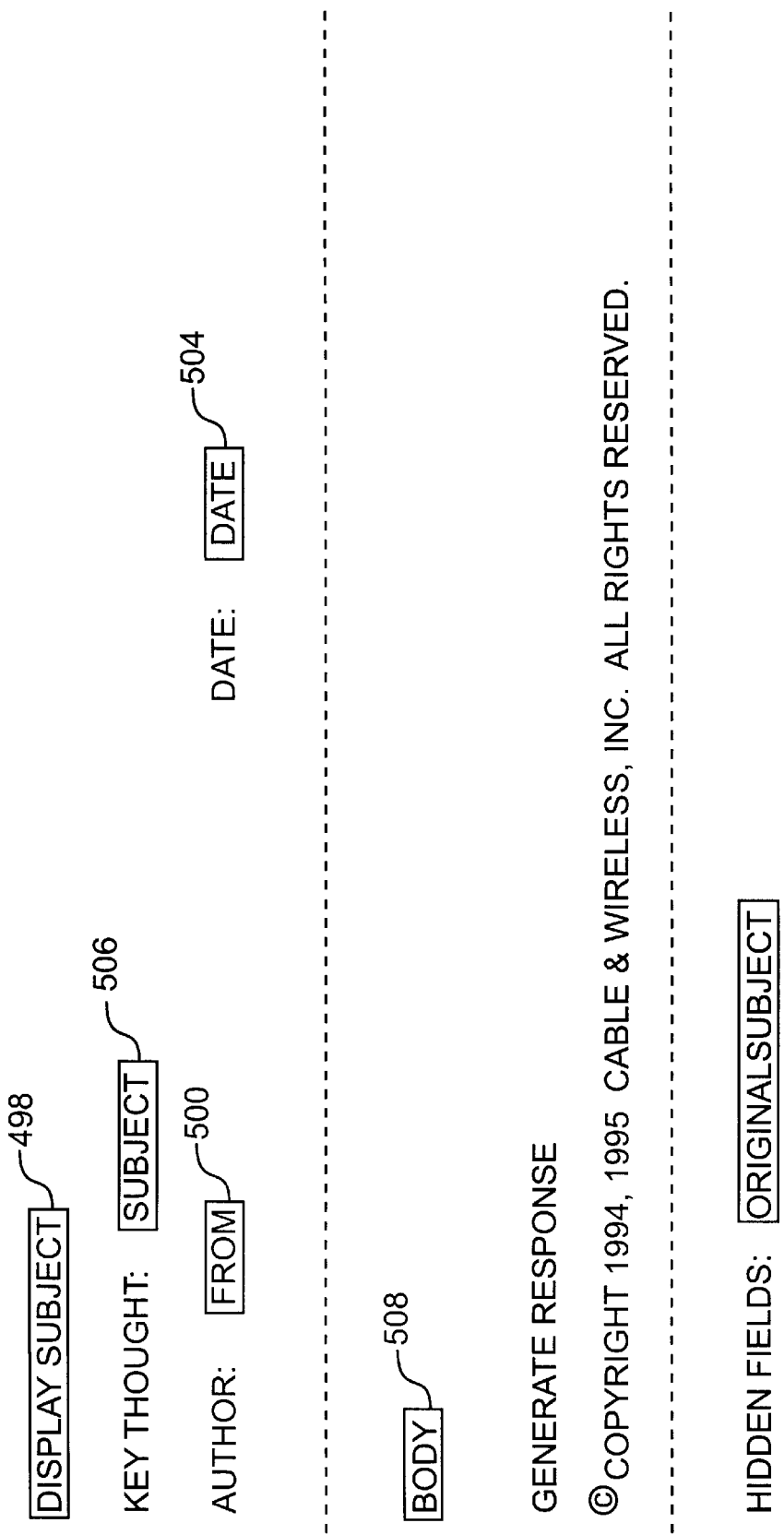
FIG. 52 is a screen layout for the "Problem" form of FIG. 51.

Referring to FIGS. 51 and 52, the detailed arrangement of which forms no part of the present invention, the "Problem" form has several fields that are automatically updated by the system upon display of the form. The field "displaysubject" at 498 is; a hidden field that is automatically populated by data the operator entered in the "subject" field; and the field "from" is populated by the "username" sign in data at 500. At 502, a hidden field "original subject" is automatically populated by data from the "ptask" or "subject" field depending on the situation; and at 504 the field "date" is automatically populated from the date this new document was created. The operator enters free form text in the field "subject" at 506 and in the field "body at 508. If the "Subject" field is left blank, nothing is displayed. If there is an entry in the "Subject" field, it is formatted by a carriage return, the information in the "Subject" field, and then another carriage return.

The instructions associated with the field "Kissues" checks first to see if the field "Kissues" is available. If so, it uses the information in that field. If not, it checks to see if the field "actem" is available in the selected form, if so it uses the information in that field. If none of the specified fields are available in the form selected it uses the default information found in "employee".

The instructions for the field "astat" checks first to see if the field "rptdate" is available. if so, it uses the information in that field. If not, it checks to see if the field "mtgdt" is available in the selected form, if so it uses the information in that field. If "mtgdt" is not available, it checks for "apdate". If that field is present on the selected form, it uses the information in that field. If "apdate" is not available it checks for the field "Critfac" and if found uses that information. If none of the specified fields are available in the form selected it uses the default information found in "DATE".

The formula for the field "kissues" checks first to see if the field is available. If so, it uses the information in that, field. If not, it checks to see if the field "actem" is available in the selected form, if so it uses the information in that field. If none of the specified fields are available in the form selected it uses the default information found in "employee". The view "mgttl" selects all documents created on a form with the word "Meeting" in its title for presentation to the user.

The instruction for the field "docdescendants" checks to ensure that in the DocDescendants (children) the field "actem" is not null. If it is null nothing happens. If there is a DocChild, and the field "actem" has an entry, the information form the fields "employee", "actem", and "apdate" are formatted and presented to the operator one line below and indented form the main document.

PROCESS IMPROVEMENT REQUEST

The Process Improvement Request database is designed to facilitate process improvement throughout an organization. It is a repository of both ideas and the discussion revolving around them. This database also provides useful information to management teams about recurring issues and suggestions from any organization using this database. Each Process Improvement Request allows for automatic, electronic notification of an individual of the operator's choice. Responses are collected and grouped with the controlling document to which they pertain. From within the controlling document ( )Process Improvement Request form) management can securely assign an employee to research the request. The forms in the Process Improvement Request include the Process Improvement Request and the Request. Response". The views in the database include the open process improvement requests, all process improvement requests, and requests by assignment.

Figure 53:
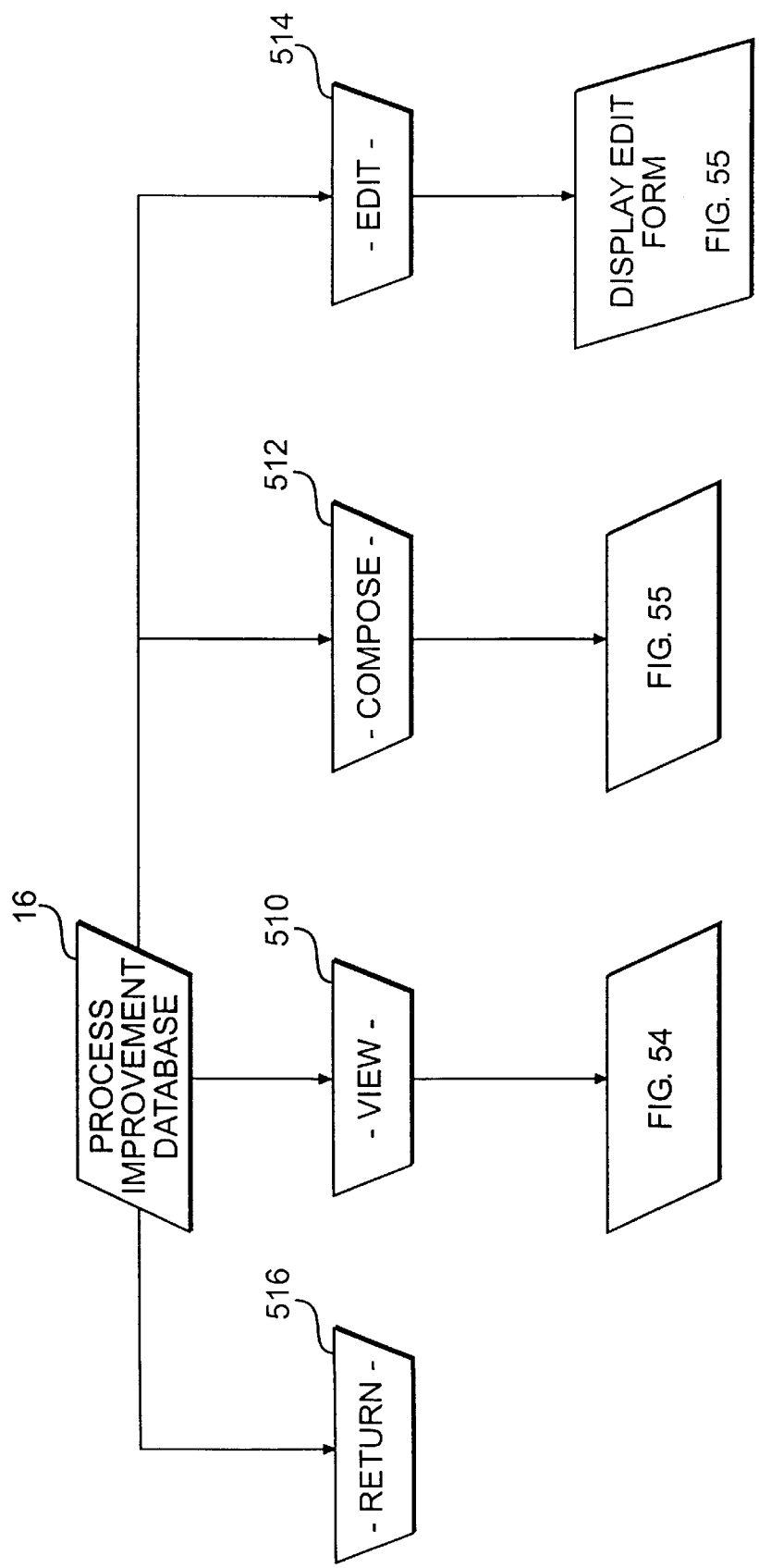
FIG. 53 is a chart of the first level menu selection for using the process improvement database incorporating the present invention.

Referring to FIG. 53, upon selection of the database "Process improvement Request" from the module 16 of FIG. 1, similar to the other data bases, the operator can select from the menu bar either "View" at 510 to obtain different arrangements of summary data, "Compose" at 512 which produces a sub menu for selecting among data input forms, "Edit" at 514, which produces a form for editing the document created from the "Compose" selection, or "Return" at 516 to go back to main menu.

Figure 54:
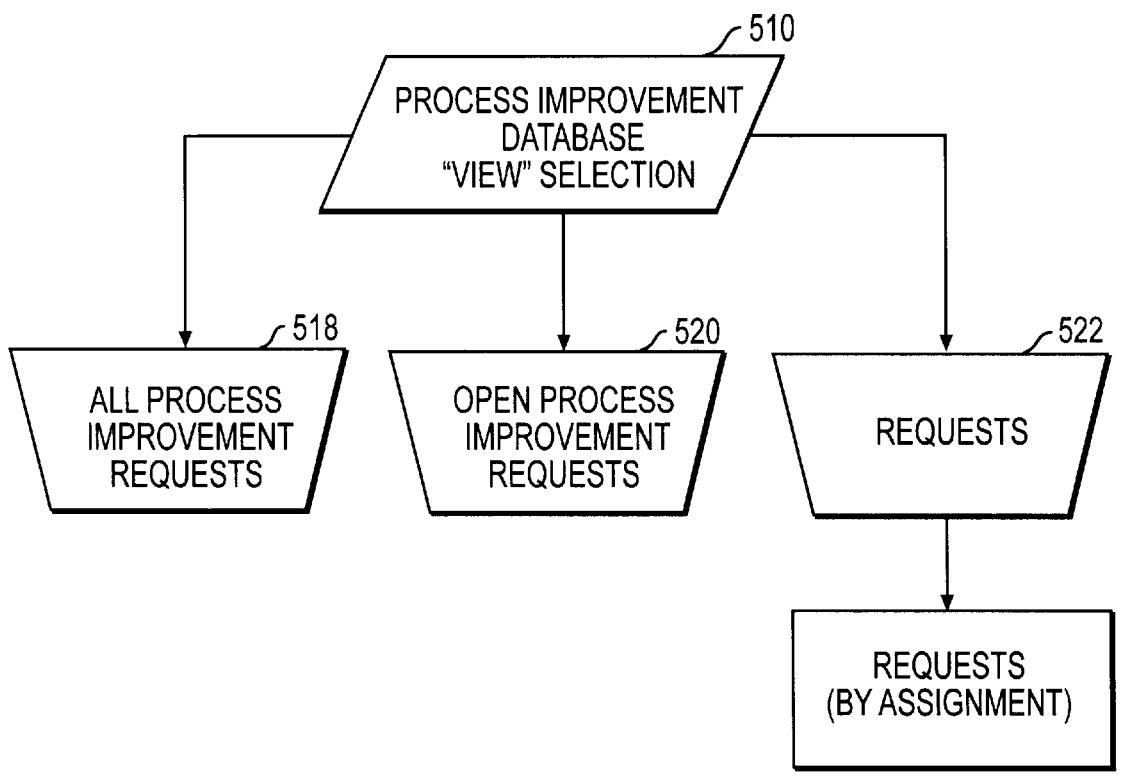
FIG. 54 is a chart for using the view menu of the process improvement database incorporating the present invention.
Figure 55:
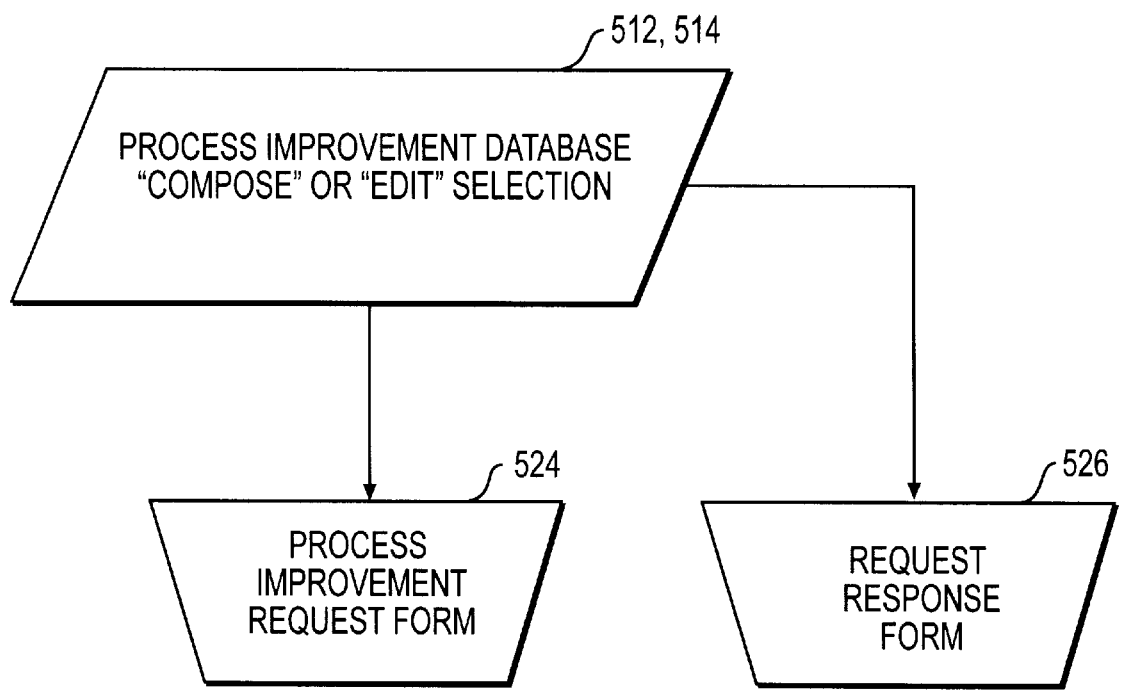
FIG. 55 is a chart for using the compose or edit menu of the process improvement database incorporating the present invention.

Referring to FIG. 54, upon selection of "Views", the operator is given the choice of viewing all process improvement requests at 518, only the open process improvement requests at 520, and the requests, by assignment at 522. In this database, as shown by FIG. 55, the "Compose" or "Edit" selection has but one process improvement request form at 524. A request response form at 526 is selected from the process improvement request form.

Figure 56:
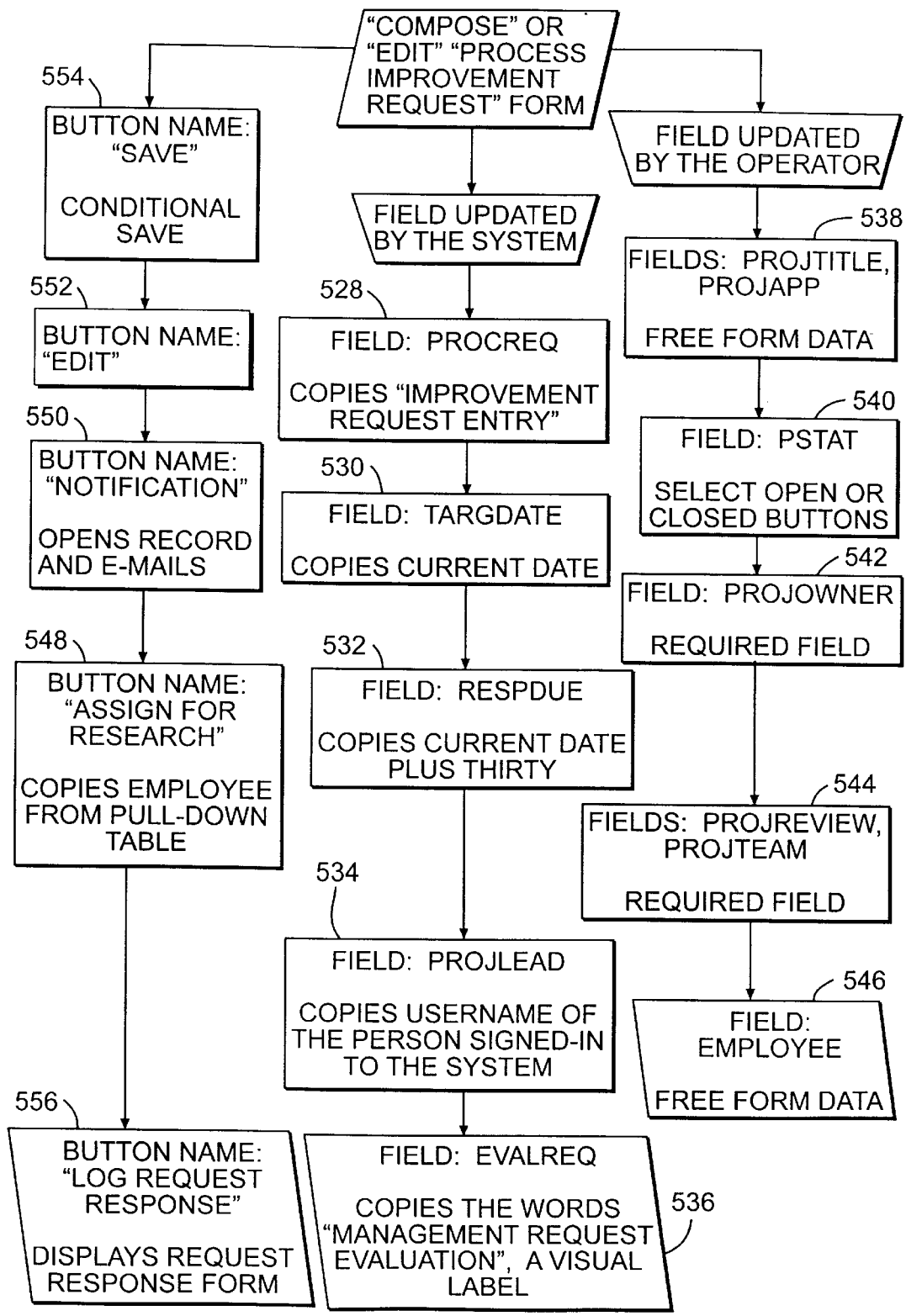
FIG. 56 is a chart for using "Process Improvement Request" form of the process improvement database incorporating the present invention.

Referring to FIGS. 56 and 58, upon selection of the form at 524, the system automatically populates various fields of the form. A field "proreq" at 528 is populated by the term "Improvement Request Entry" which provides a label for the form. The current date is inserted in the field "targdate" at 530. The field "respdue" at 532 is populated with a date thirty days from the current date. Both of these dates may be changed by the operator. The name of the person signing in to the system from "username" is inserted in the field "projlead" at 534; and the system populates the field "evalreq" at 536 with the words "Management Request Evaluation" which is the visual label for the corresponding portion of the form.

The operator enters free form data directly into the fields "projtitle" and "projapp" at 538 with the name of the title of the project concerned and the approval authority. The operation of one of two buttons causes field "pstat" to write the word "Open" or "Closed" at 540. Field "projowner" at 542 is a required field populated by the name of a department that the operator selects from a pull down table. The fields "projreview" and "projteam" at 544 are required fields into which the operator enters free form text directly. The operator may enter free form data directly into the field "employee" at 546 or may populate the field by using a button labeled "Assign for Research" at 548.

The form also includes several additional buttons to enhance maneuvering within the database. A button named "Notification at 550 opens the completed document a puts it in an E-mail message that may be addressed by the operator and sent. A button named "Edit Improvement Request" at 552 places the form in the edit mode to allow the operator to make changes. A button named "Save" at 554 when operated stores the completed document provided that all the required fields are filled in, otherwise an error message for the invalid field appears. A button named "Log Request Response" at 556 places the "Request Response" form on the screen in the edit mode.

Figure 57:
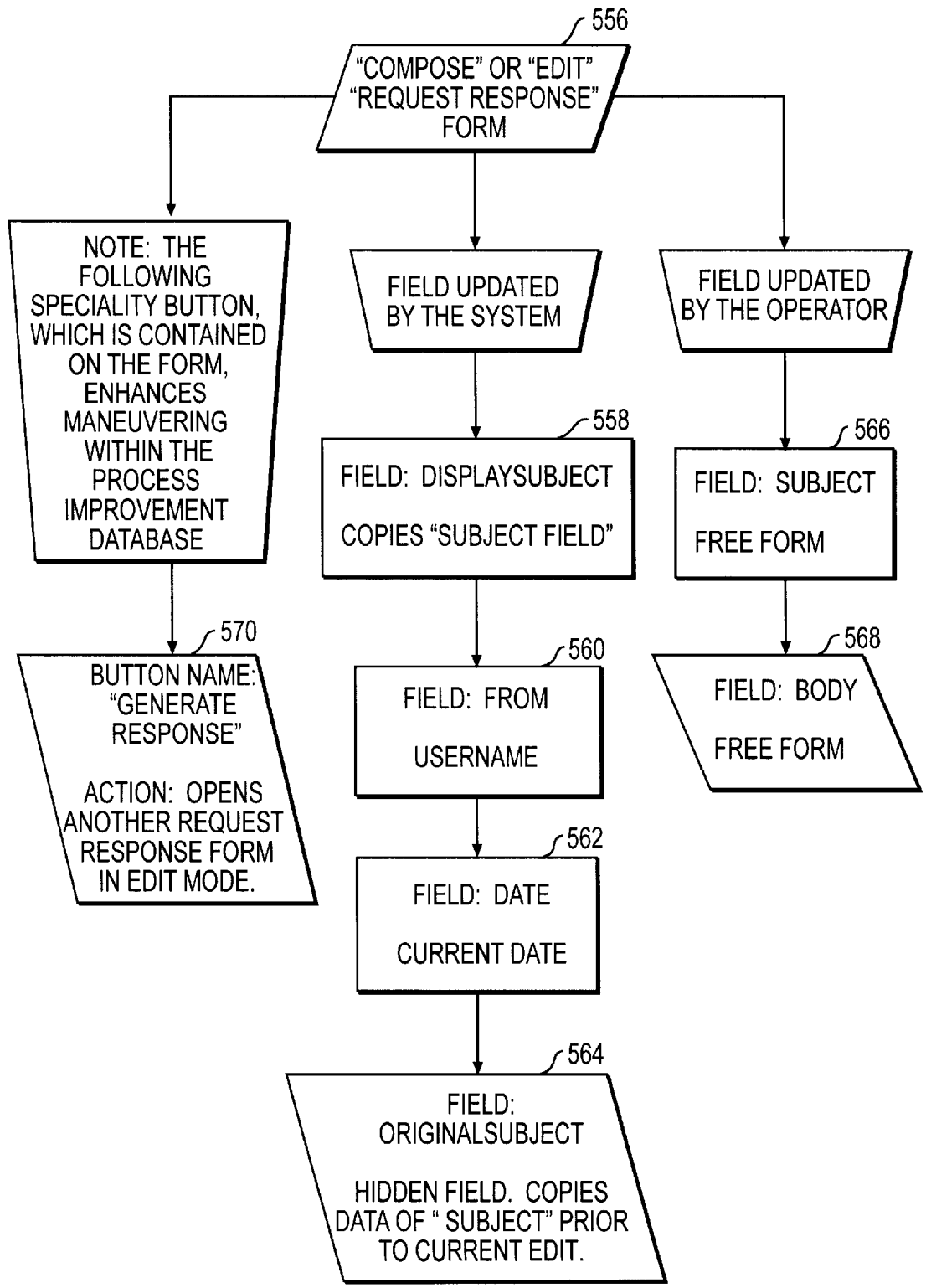
FIG. 57 is a chart for using compose or edit of a known Improvement Request Response" form used in the system of the invention.

Referring to FIG. 57 and FIG. 60, when the "Request Response" button is clicked with a mouse, the system automatically updates a field "displaysubject at 558 by populating it with the words contained in the "subject" field which provides a visual label for the form. The system populates the field "from" at 560 with the name of the person signing into the system, and populates a field "date" at 562 with the current date. The form has a hidden field "original subject" at 564 which populates the field with data contained in the field "subject" in a document prior to the current edit. The operator enters free form data in the field "subject" at 566, free form data in the field "body" at 568. A button named "Generate Response" at 570, when operated opens another "Request Response" form on the screen in the edit mode.

Auditing Management

The Process Auditing Management Database houses all internal process audit information. It is organized to automatically provide an audit schedule via the preparation of an audit planning document. Through this document it is possible to retain all documentation related to a specific audit organized and collated in a format easy to retrieve and understand.

The audit planning database offers the ability to design and store checklists for various audits, manage internal audit findings, log observations, and automatically manage the internal audit schedule. It provides an automated method for departmental and organizational management to be recognized and be accountable for observations and findings uncovered in the assessing process and to be accountable for the development, implementation, and monitoring of both corrective and preventative action plans. There are methods for managing the internal auditors, indicating functional area to ensure independence from functional responsibility. There are several forms which use the Revision and Security Control functionality referenced in Security & Revision Control.

The "Audit" form is the planning and control document for this database. It is available from the "Compose" dropdown menu of the platform. All other forms with the exception of the "Internal Auditor Eligibility" form, are accessed from within this one. This form is where scheduling of internal or external auditors, audit dates, scope of audit, departmental management identification, noncompliance counts, observation counts, audit type, documents to collect for review, checklists to generate, and corrective actions to validate are planned and documented.

Checklists are generated from within the "Audit" form by clicking on a button in the button zone. Each checklist generated is listed slightly indented and below the Audit Form record in the main database view. There is no limit to the number of checklists which may be generated for any given audit. Checklists are "responses" or document descendants of the form from within which they were generated.

"Observation Reports" are generated from within the "Audit" form by clicking on a button in the button zone. "Observation" reports are made available to facilitate the improvement of internal processes in compliance with the Corrective/Preventative action clauses of IS 9000. Observation reports would not be filled out in connection with an observed noncompliance. Observation reports are "responses" or document descendants of the form from within which they were generated. Each Observation Report generated is listed slightly indented and below the Audit Form record in the main database view.

Noncompliance Reports are generated from within the Audit form by clicking on a button in the button zone at the bottom of the form. NonCompliance Reports are entered whenever there is a n to IS 9000, or any other standard, observed during an internal audit and which is also supported by objective evidence. NonCompliance Reports and Observation reports are "responses" or document descendants of the form from within which they were generated. Each Noncompliance Report generated is listed slightly indented and below the Audit Form record in the main database view.

Corrective Action Plans are generated from within the Non Compliance Reports by clicking on a button in the button zone eat the bottom of the form. Corrective Action Plans are generated whenever there is a noncompliance to IS 9000, or any other standard, observed during an internal or external audit and which is also supported by objective evidence. Corrective Action Plans and Observation reports are "responses" or document descendants of the form from within which they were generated. Each Corrective Action Plans generated is listed slightly indented and below the Audit Form record in the main database view.

Internal Auditor Eligibility forms are available from the "Compose" drop-down menu of the form. This form offers the ability to manage the internal auditor roster by functional area to ensure independence of responsibility for processes being audited. For those organizations which are global in nature, and for which a global accreditation to IS 9000 or some other standard is a requirement, this form also offers the ability to manage internal auditor availability by international geographic location. As internal auditing is most effectively handled as a collateral duty, line management information for internal auditors is also made available through this form to those managing the internal audit process.

Figure 61:
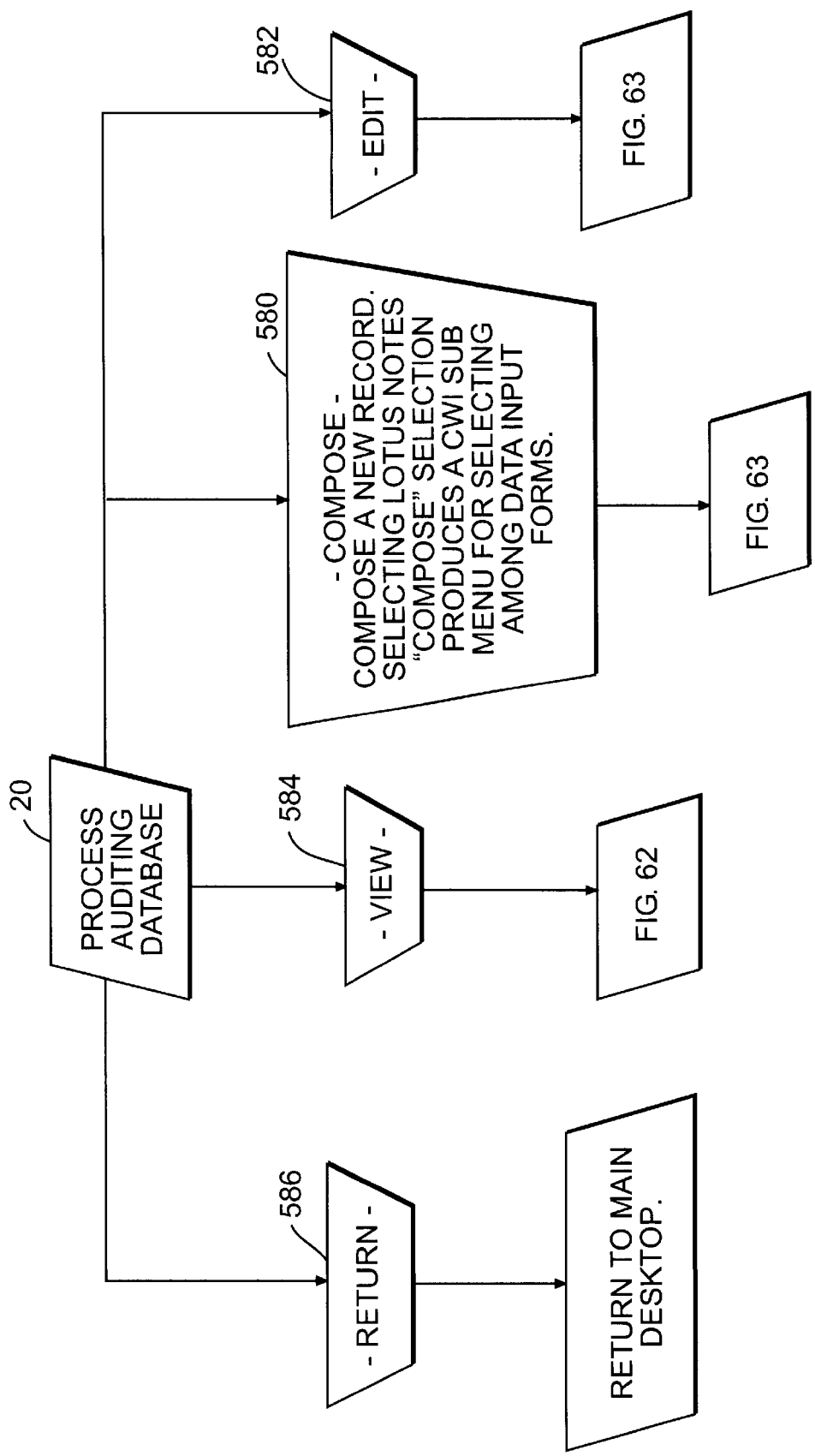
FIG. 61 is a chart of the first level menu selection for using the process audit database incorporating the present invention.

Referring to FIG. 61, When the audit management module is selected at 20, the operator can either select "Compose" at 580 to produce a sub menu for selecting among data input forms, or "Edit" at 582 which displays different forms associated with the record being displayed to edit the record being displayed. The operator may also select "Views" at 584 to select from a submenu different displays which were entered in forms in different arrangements, and of course, a "Return" selection at 586 to go to the main desktop.

Figure 62:
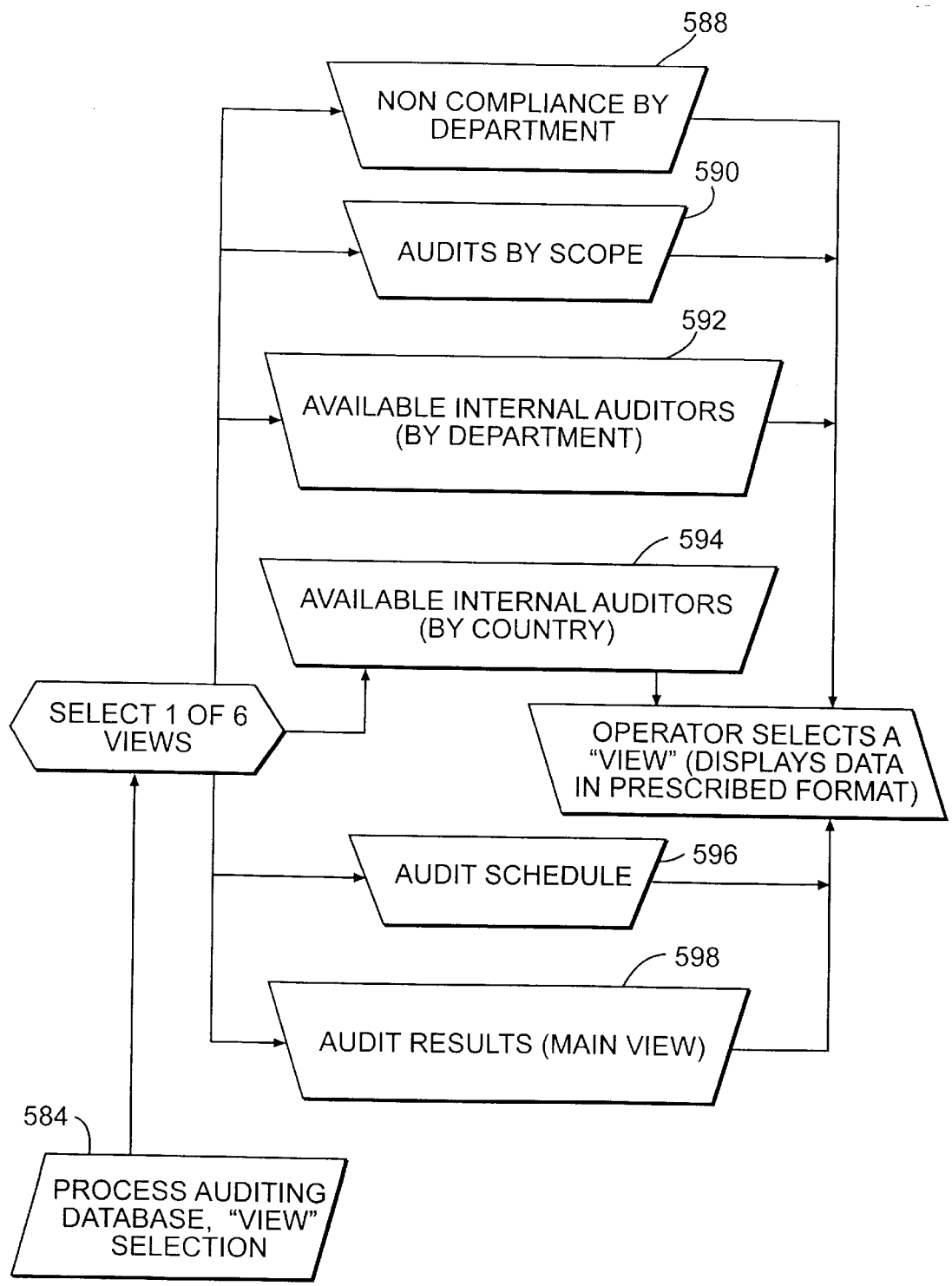
FIG. 62 is a chart for using the view menu of the process audit database incorporating the present invention.

Referring to FIG. 62, the selection of "View" provides the operator with six different selections as follows: The operator can select at 588 a list of non-compliance reports arranged by department, a list of audits arranged by scope at 590, a list of available internal auditors arranged by departments at 592, a list of internal auditors arranged by country at 594. The operator can also retrieve an audit schedule at 596, and audit results at 598.

Figure 63:
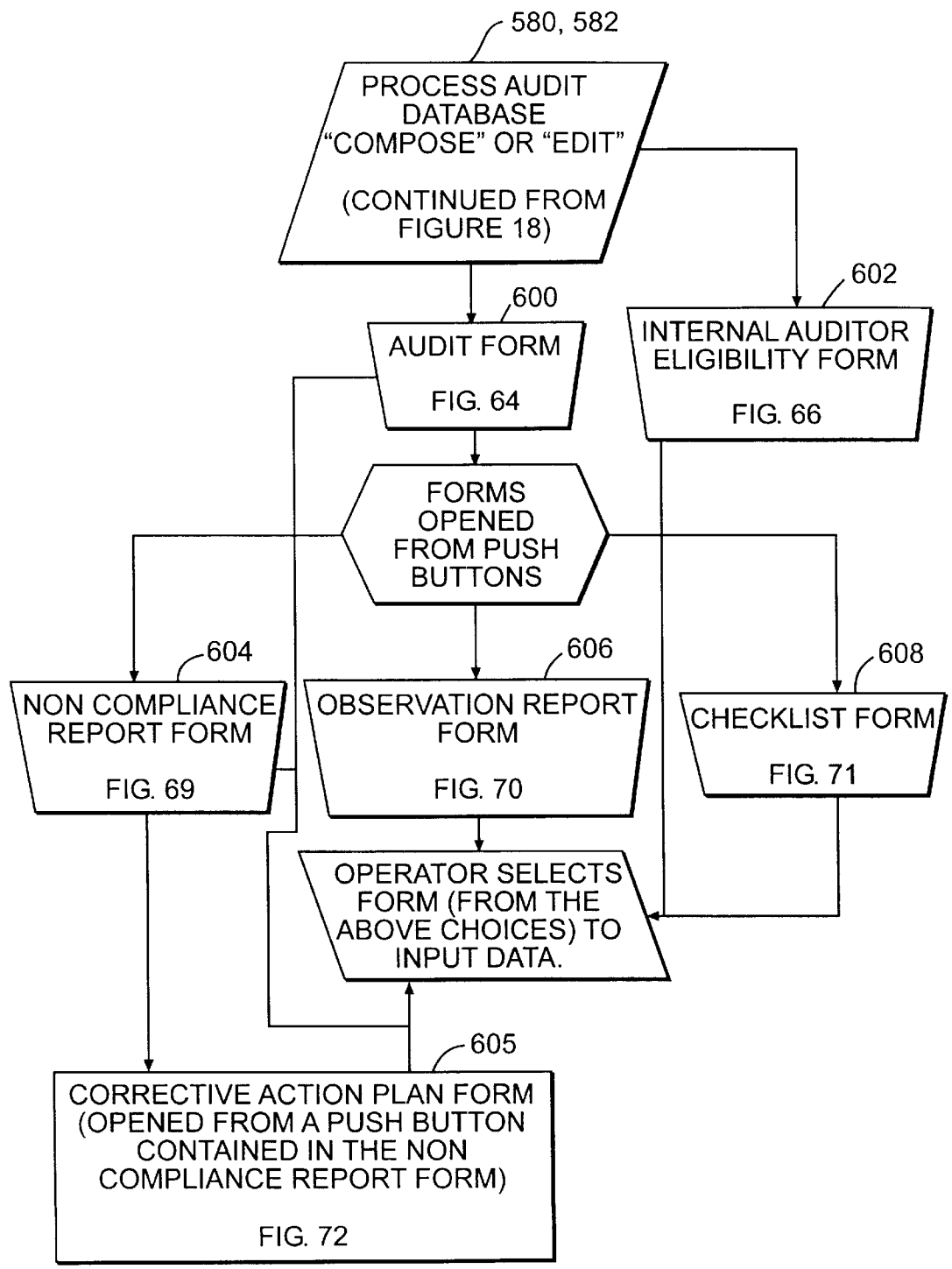
FIG. 63 is a chart for using the compose or edit menu of the process audit database incorporating the present invention.

Referring to FIG. 63, the selection of "Compose" at 580 gives the operator two choices, namely, an Audit form at 600 or an internal auditor eligibility form at 602. The selection of the Audit form gives the operator three choices by operating buttons therein. These are the Non-Compliance Report form at 604, the Observation Report form at 606, and the Chcklist form at 608. A Corrective Action Plan form is opened from a push button contained in the Non-Compliance" report form.

Figure 64:
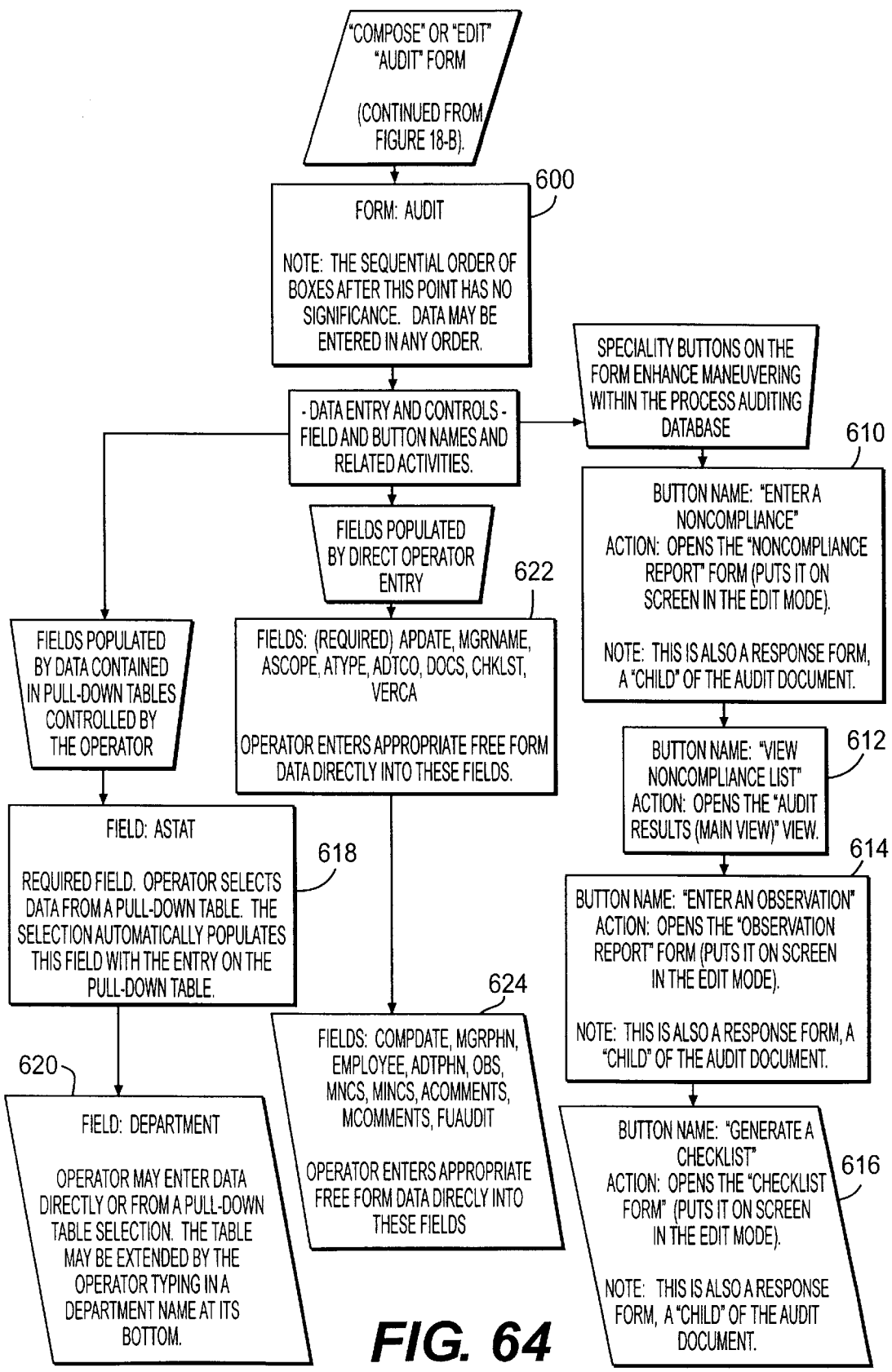
FIG. 64 is a chart using menu item compose or edit for an "Audit" form incorporating the present invention.

Referring to FIGS. 64 and 65, the selection of the form Audit reveals several buttons. A button at 610 named ""Enter a Non-compliance" Action and opens the corresponding noncompliance report form and puts it on the screen in the Edit mode. This form is a response form and a child of the Audit form. The button at 612 named "View Non-Compliance Results" opens the "Audit Results" view. A button at 614 labelled "Enter An Observation" opens the "Observation Report" form and displays it on the screen in the edit mode. This form is also a response form, and a child of the audit document. A button at 616 labelled "Generate a Checklist opens the "Checklist" form, which is also a response form and a child of the "Audit" form. Field "astat" at 618 is a required field where the operator selects data from a pull down menu, which automatically populates the field. The operator may enter data directly or use a selection from a pull down menu at block 620. The following fields all require the entry of data by the operator. The operator enters required appropriate free form scheduled audit date in field "apdate" , the name of the manager whose department is being audited in field "mgrname", the scope of the audit to be performed in the field "ascope", the type of audit in field "atype", the name of the company for whom the auditor works at field "adtco", the identity of the documents that need to be reviewed for this audit in the field "docs", the identity of the checklists to generate in the field "chklst, and the entry of the corrective actions to verify from the previous audit in the field "verca", all as shown at block 622. Entry of data in the following fields is not compulsory. The audit completion date is entered in the field "compdate", the phone number of the department manager is entered in the field "mgrphn", the number of observations is entered in the field "obs", the number of major non-compliances is entered in field "Mncs", the number of minor non-compliances in field "mincs". In addition the managers comments are entered in the field "mcomments, the auditors comments in the field "acomments", and a follow up audit date for this audit, all of which are shown in block 624 and in spaced arrangement on the form of FIG. 65.

Figure 66:
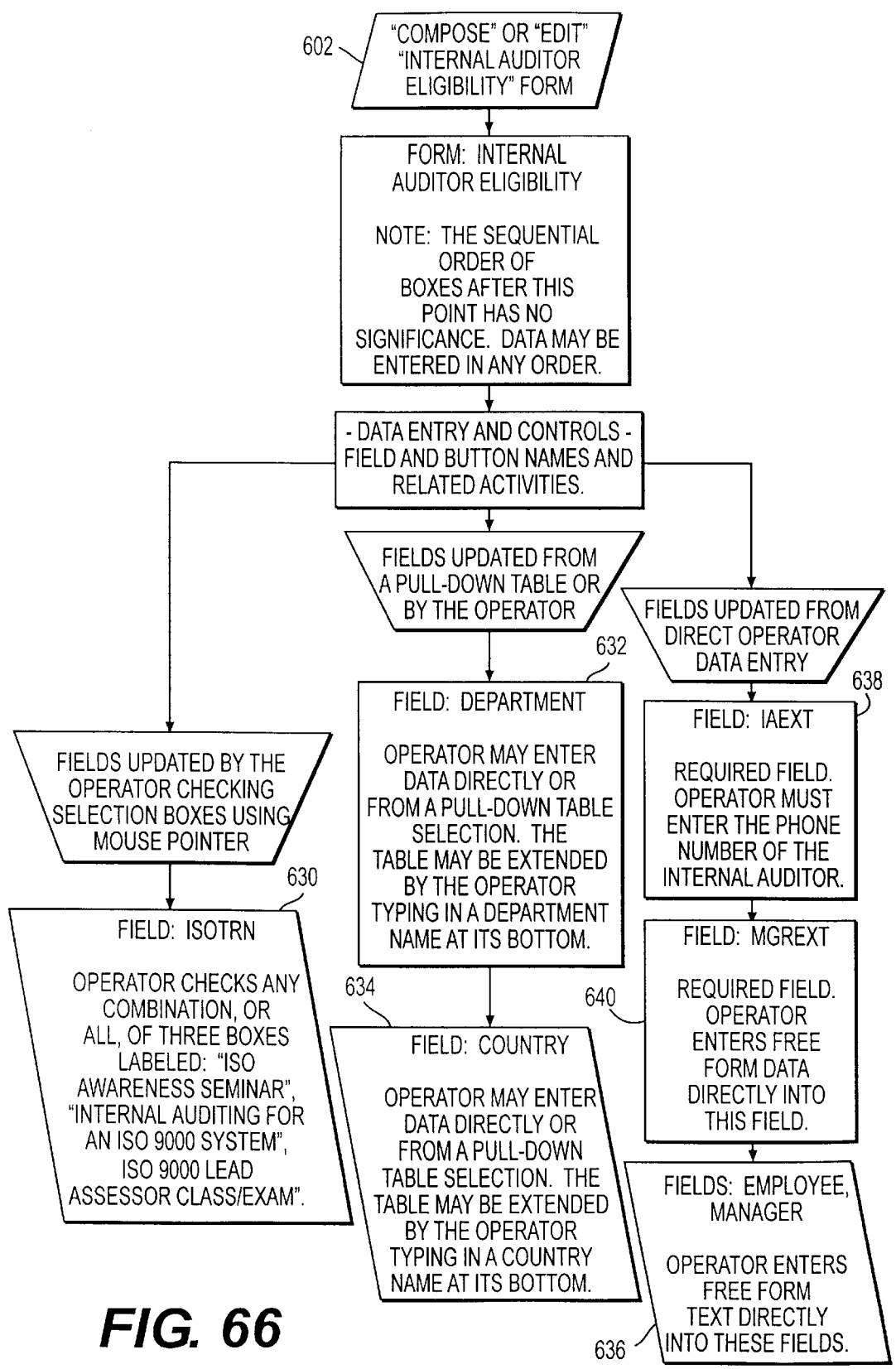
FIG. 66 is a chart using menu item compose or edit for "Internal Auditor Eligibility" form.

The form for determining the eligibility of the internal auditor will be described in connection with FIG. 66, FIG. 67, and FIG. 68. The operator checks one of three boxes in a field "isotrn" at block 630 to determine whether the auditor has attended an ISO awareness seminar, had experience as an internal auditor for an ISO 9000 system, or attended classes and passed an examination to be qualified as an ISO 9000 lead assessor. The operator may enter data directly or from a pull down table the name of the department involved in the audit at field 632 and the country of the audit at 634. In fields "employee, manager" at 636, and fields "iaext" and "mgrext" at blocks 638 and 640, the operator must enter the data relating to the identity of the auditor and the internal auditors phone, as well as the managers telephone.

Figure 69:
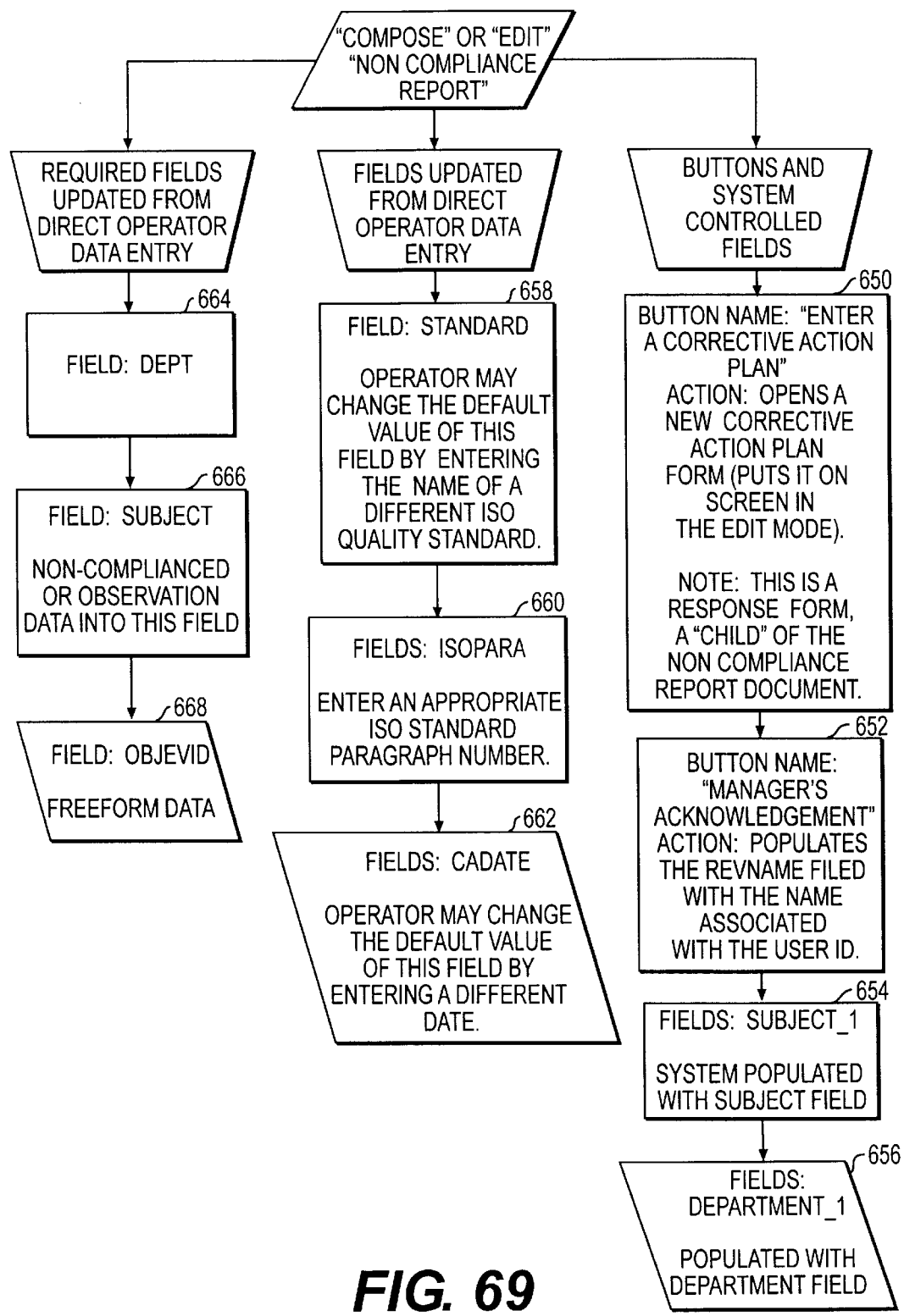
FIG. 69 is a chart of a "Non-compliance Report" form as a result of pressing the non-compliance report button on the "Audit" form.

The operation of the system in response to pressing the "Non-Compliance Report" button on the "Audit" form permits the operator to enter all information necessary to demonstrate non-compliance, and is described in connection with FIG. 69. The operation of a button named "Enter a Corrective Action Plan" at 650 opens a new "Corrective Action Plan" form and puts it on the screen in the edit mode. This form is a response form and a child of the Non-Compliance Report document. A button "Mgr's Acknowledgment" at 652 populates the "revname" field with the name associated with the user identification. The system populates a field "subject-1" at 654 with data entered into "subject" field by the operator; and the system populates a field "department-1 at 656 with data entered in the "department" field by the operator. A field "standard" at 658 is populated by a particular ISO standard. The operator may enter a different standard of the series. A field "isopara" at 660 is completed by the operators entering of appropriate ISO standard paragraph numbers that have not been complied with. A field "cadate" at 662 has a default value of the current date. This may be changed by the operator. There are several required fields for the non-compliance report. As in other reports a "dept" field at 664 is required to enter the name of the department being audited from a pull down table. A field "subject" at 666 is required to be populated by the operator entering the level of non-compliance or observation data. A field "objevid" at 668 is a required field, and is populated by a description of the objective evidence of non-compliance. If not objective, the information should be inserted as an observation. As in the previously described forms, if the required fields are not populated, the operator is unable to store the document in the system.

Figure 70:
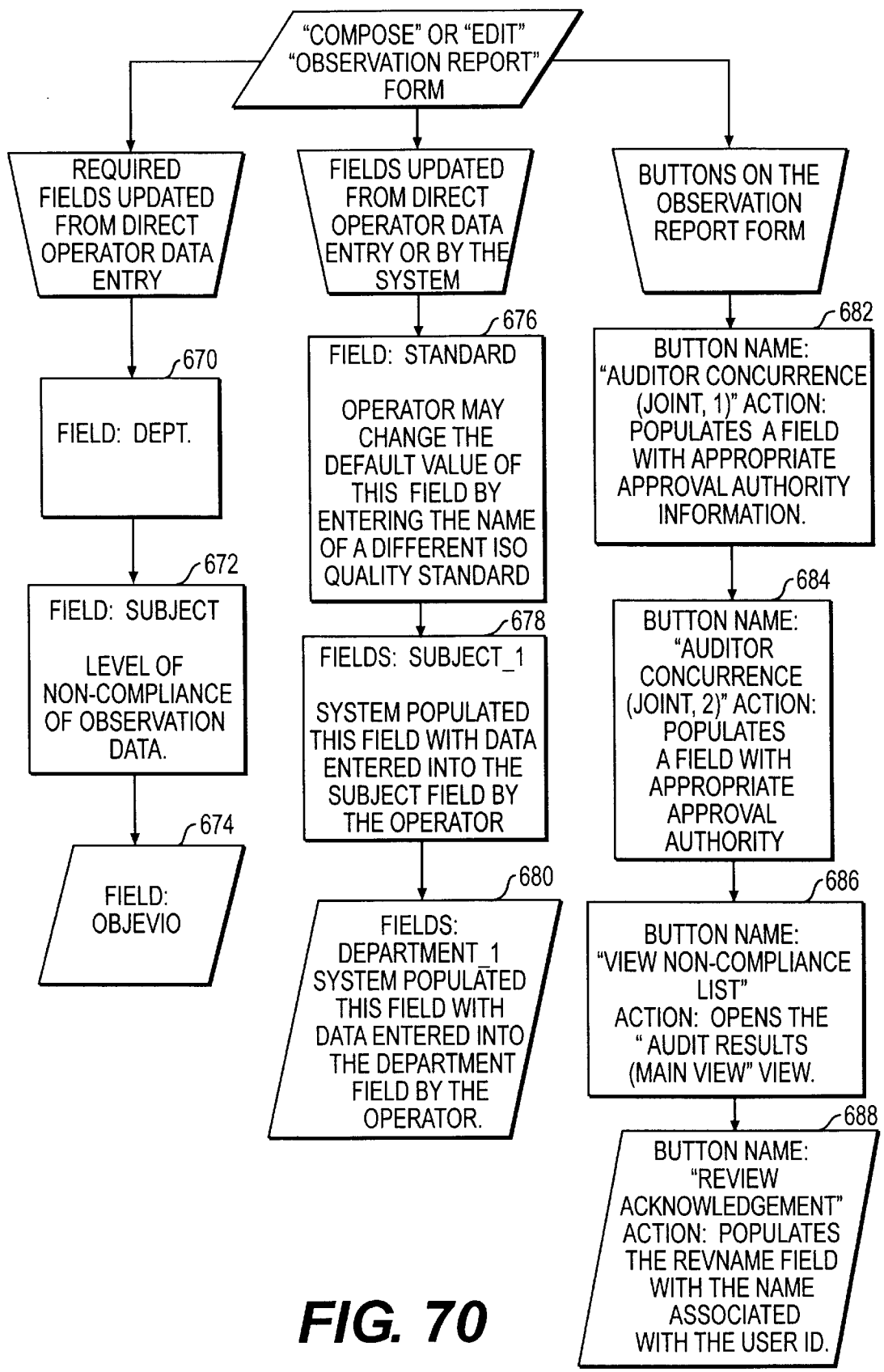
FIG. 70 is a chart of an "Observation Report" form as a result of pressing the enter an observation button on the "Audit" form.

Referring to FIG. 70, the pressing of the "Enter an Observation" button at 614 on the audit form, displays a form similar to the non-compliance report, and as in such report, the operator is required to select or enter the appropriate data in fields "dept" at 670, in ""subject" at 672, and in "objevid" at 674. The fields "standard" at 676, "subject-1"

at 678, and "department-1 at 680 are populated by the system with the same information type as in the non-compliance report.

The observation report include buttons named "Auditor Concurrence(joint 1)" at 682 and "Auditor Concurrence (joint 2)" at 684, which populate respective fields with appropriate approval authority information as described in connection with the previous description of security and revision control. A "View Non-Compliance" list button at 686 opens and displays the audit results view, and a button "Review Acknowledgement" at 688 when operated populates the "revname" field with the user identification, also as described in the Revision and Security Control description.

Figure 71:
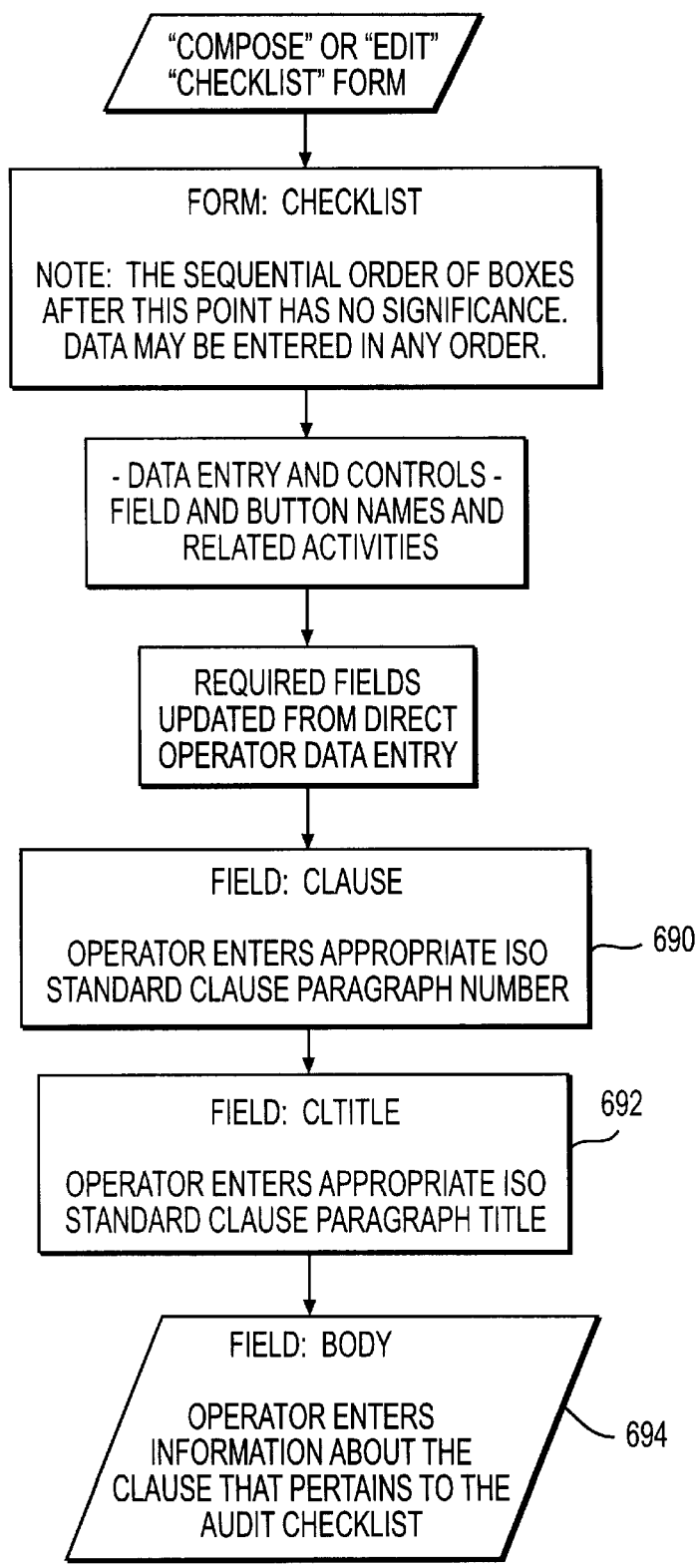
FIG. 71 is a chart of a "Checklist" form as a result of pressing the generate a checklist button on the "Audit" form.

Referring to FIG. 71, in response to clicking on the button at 616 of the Audit form generates a checklist form wherein all fields are required to be filled in by direct operator entry. The operator enters in field "clause" at 690 the appropriate ISO Standard clause paragraph number, and in a field "cltitle" at 692 the appropriate title of the particular ISO clause, and in a field "body" at 694 the information about the clause that relates it to the audit checklist.

Figure 72:
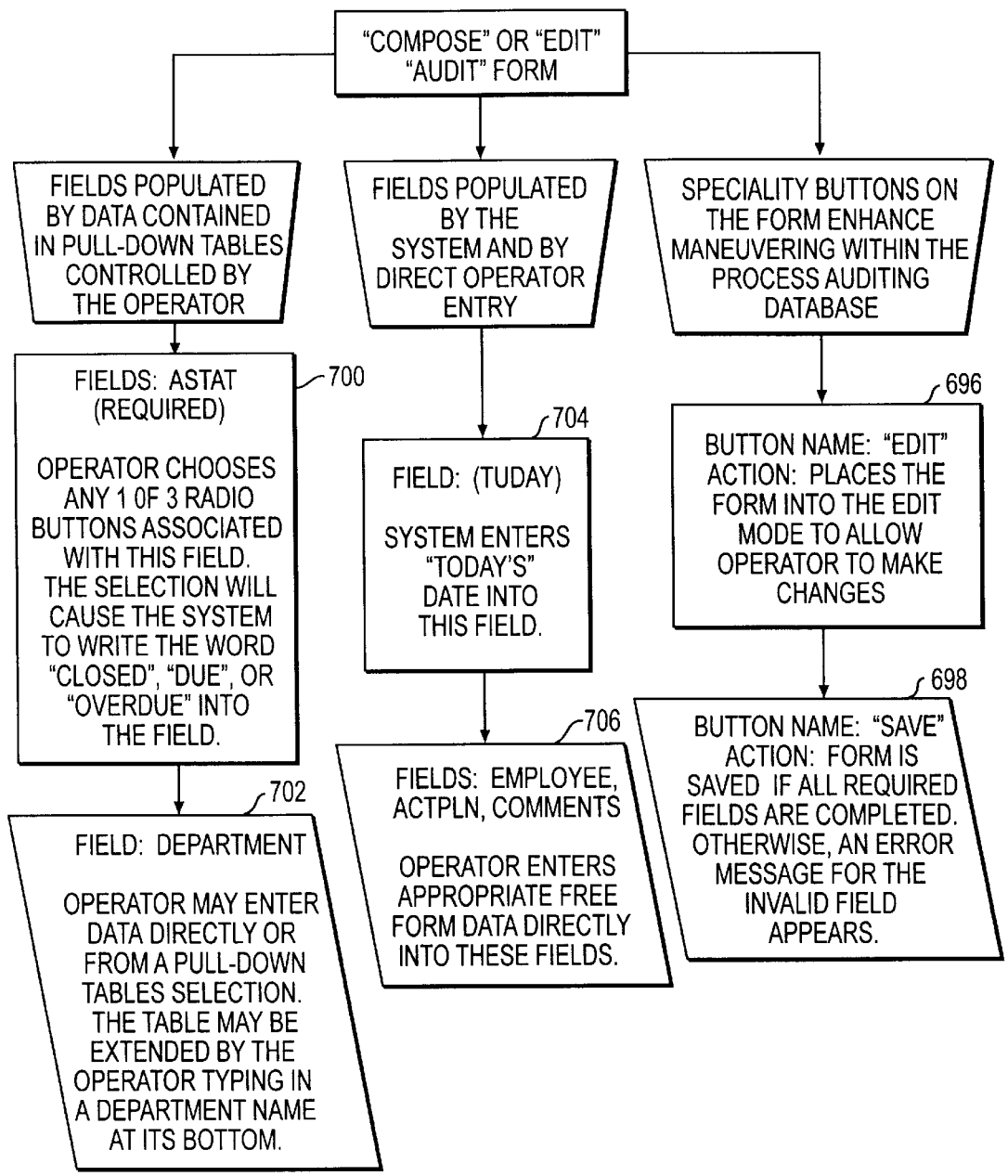
FIG. 72 is a chart using menu item to compose or edit a "Corrective Action Plan" form incorporating the present invention.

Referring to FIG. 72, a form "Corrective Action Plan" is selected at 605. This form has a button "Edit" at 696, which permits the operator to make changes, and a button "Save" at 698, which permits the operator to store the document after all required fields are completed. This form has a field "astat" at 700, which selects the status of the plan as being "Closed", "Due", or "Overdue", and the field "department" at 702, where the appropriate department name can be selected from a pull down table or entered directly. The system enters todays date in the field "tuday" at 704, and the operator enters in free form data, the action plan, the employees to be involved, and any other comments in fields "employee, "actpln", and "comments" at 704 and 706 respectively.

This database includes program instructions that checks to ensure that the form is not a Corrective Action Plan form. If it is not a Corrective Action Plan form, then the values in the fields "Form", "Subject", "isopara", "clause" and "Revname" are formatted and stored in the variable "Text", then the value of the variable "Text" and all the DocDescendants (children) are presented to the operator slightly indented and below the parent document in this column. If the form is a Corrective Action Plan form, then the values in the fields "form" and "actem" are formatted and stored in the variable "Text". The value of the variable "Text" and all DocDescendants (children) are presented to the operator slightly indented and below the parent document in the appropriate view.

The database also includes program instructions that check to ensure that the form is not a Checklist form. If it is not a Checklist form, then the values in the fields "Form", "cltitle", "isopara", "clause" are formatted and stored in the variable "Text", then the value of the variable "Text" and all the DocDescendants (children) are presented to the operator slightly indented and below the parent document in this column.

The program instructions also check to determine that the value of "Subject" is not equal to a specified value. If it is, then the values in the fields "Subject", "", "isopara", "cadate" and "Revname" are formatted and stored in the variable "Text", then the value of the variable "Text" and all the DocDescendants (children) are presented to the operator slightly indented and below the parent document in this column. If the value of "Subject" is not equal to the specified value, then the values in the fields "Subject", and "Revname" are formatted and stored in the variable "Text", then the value of the variable "Text" and all the DocDescendants (children) are presented to the operator slightly indented and below the parent document in the list.

In summary, the detailed specification describes a computer readable medium and system where the document management module 10 creates an audit trail by retaining previous iterations of a controlled document as a child document of a current document where it is possible to view the first issued document, subsequent changes to content and movement to "draft" status, then re-approval and reissue; and wherein a master list is automatically generated which includes a document number, title, review authority, approval authority, and titles, which is a vehicle for satisfying the requirements of Sections 4.5, 4.16, and 4.17 of the ISO standards as set forth in the referenced publication.

The audit management module 20 provides an electronic trail of individual audit activities as well as audit schedules. A controlling planning document is created, and checklists, audit findings, corrective action reports, and a record of managements acknowledgement of audit findings are all maintained as child documents of the planning documents. Corrective action reports indicate current status (open or closed) in a summary view, which facilitates follow-up auditory activities. The audit management module 20 also supports items which do not fall into non-compliance status, but may in the future. These are identified as observations and ties them to the audit in which they were found.

Audit schedules are produced automatically by the system simply by planning individual audits and filling in the planning document. A list of all non-compliances by department is automatically generated just by filling out the audit report. Each non-compliance also references the ISO Clause against which it was cited and whether it was a major or minor non-compliance. This module also provides a listing of all conducted or planned audits by the scope of the audit to ensure that all clauses are covered within the prescribed period. To ensure objectivity, available internal auditor records by both department and country are maintained in the database to assist in planning. This allows the internal audit function to be moved to frontline organizations and assists in cross-functional training and propagation of information.

Thus, the audit management module is a vehicle for complying with Section 4.14, as well as Sections 4.16 and 4.17 of ISO 9000 standards as set forth in the referenced publication.

The project management module 18 creates and audit trail for all project activities, and enhances on organizations ability to take advantage of lessons learned on previous projects.

The controlling documents on all projects is the project definition document. All other documents relating to the project are child documents and retained as an audit trail. These documents are: Project Plan, Tasks, Project Issues, Task Issues, Meeting Minutes and requirement documents. Individual test results are logged from within the Test Plan. Test results are child documents of test plans. A user may log an unlimited number of test results against any test plan. Project REview Meeting Minutes, Agendas, Action Items, and Status Reports can be logged from within the controlling document creating a clean, complete audit trail.

This project management module is a vehicle for complying with Sections 4.2, and 4.4 as well as 4.17 of the ISO 9000 standards.

The module Meetings and Reports 20 are handled by providing a controlling document for a particular activity.

For meetings, the minutes of the meeting document is the controlling document. Meeting agendas and action items are child documents and can be maintained with the correct iteration for meeting minutes on any given topic.

For Customer complaints, the complaint form is the controlling document. Action items for activities leading to resolution of the complaint are the child documents, and again are maintained with the specific complaint which they address. Dates on the Customer Complaint form auto populate for the user with date complaint was opened and a default complaint resolution date 30 days forward. The complaint resolution date is editable. Follow-up dates, activities, and comments sections are provided with an automatic tickler for overdue activities in the summary view. Action Items may be logged against complaints as child documents and as part of the audit trail. Key issues from the controlling document of each type: Meeting Minutes, Action Items, Customer Complaints, Status Reports, & Monthly Reports are presented to the user in a summary view for ease of reference. This prevents the need to open each document for later retrieval of information. Each iteration of the document is kept under the topic heading in reverse date order to ensure that the most recent information is readily available to the user.

Therefore, the meetings and records module is a vehicle for complying with Sections 4.2, 4.14, 416., and 4.17 of ISO 9000 as set forth in the referenced publications.

Action Items in any database have an automatic status field which shows the action item as "Open" until the due date has come and gone. Then the action item status automatically changes to "OverDue." Closure of the action item files it under closed actions, but a flag is set indicating that the action was overdue when closed.

These items are a vehicle for complying with Sections 4.14, 4.16, and 4.17 of ISO 9000 standards as referenced.

The meetings & Reports module can also function as an Executive Information System. The summary view provided in this module allows as an executive to assess current activities and ongoing initiatives by looking in a single place. Only open and active action items are shown in this view. Closed actions are retained, but presented in a detail view, not the main Executive Information View. Used as an information system, this module eliminates the needs for meetings solely to impart status information. Meetings can then be used as problem solving or pro-active planning sessions enabling a more efficient use of time.

The training management section allows a management team to quantify both the capability and proficiency of employees in areas of expertise gained only through on the job training as well as through formal internal or external training classes.

This is constructed in such a way as to allow an employee transferring within an organization to take all training records, including on the job training and subsequent proficiency ratings with them into the hiring organization.

Logging completed training is accomplished by clicking on a button on the control document. A new form is presented to the user and both the employee and supervisor's names are automatically provided by the application.

An action plan can be developed by management to increase proficiency levels either across an organization, across a shift (by supervisor), or at the individual level. This can be done by individual process, related processes, or benchmarked against a formal development plan.

Multiple career development plans can be created for an employee. Fields on this form such as the employee and supervisor's names are automatically filled in by the application to reduce required typing. The career development plan is to assist a manager in develop their employees into career growth within the company. It is a tool used to chart an employees's professional growth from year to year. A record of management's and the employee's comments is maintained for future reference.

Within the Training Management portion, multi-functional team planning tools are also available. The user is presented with a listing of all skillsets available (gained both through on the job training and formal instruction) and the employees with expertise in that specific discipline. This enables the formation of cross-functional teams with the requisite expertise to get the job done.

This portion of the program is a vehicle for complying with the management review requirement of Section 4.1 and Sections 4.2 and 4.14 of ISO standards as referenced.

The training management documents are exemplified by the Job Description document is configured in such a way as to facilitate an employees maintenance of all training records including on the job training and subsequent proficiency ratings into the hiring dept. Within such documents multi-functional planning tolls are available, such as a listing of all available skillsets gained both through on the job training and formal instruction. These documents are a vehicle for complying with Sections 4.2, 4.9, 4.16 and 4.18 of the provisions of ISO 9000.

Review and approval of individual documents is done by clicking on a mouse on a bottom provided in the document control section of each document. Approval of a document automatically removes it from the list of documents awaiting approval.

Unapproving a document pending content document is also done by clicking on a button. When a document is unapproved, ti automatically reverts to draft status and is added back into the list of documents waiting for approval. The Quality Manual is held within the Documentation Management Module. It is organized in such a way as to be able to dynamically manage changes without the need to re-issue the entire manual for small changes. The phrases "Printed Copies are Uncontrolled Documents" and "It is the responsibility of the user to ensure that they are using the most recent version of this Document" are embedded into each controlled document. This eliminates the need for a revision control process for pointed material.

Throughout the entire system embedded help is available. The embedded help assists a user in determining which information should be data-filled in the various fields. In some cases the embedded help assists the user in formulating plans, ensuring the addressing of issues and filing documents after saving. This feature is common throughout the system and is a vehicle for complying with ISO Clauses 4.9 and 4.18 of the referenced publication.

The foregoing structure and function are vehicles for complying with Sections 4.2, 4.5, 4.9, 4.16, 4.17, and 4.18 of the ISO 9000 standards as in the referenced publication.

It will be apparent to those skilled in the art that various modifications and variations can be made in the computer readable medium and the method and system of the present invention without departing from the spirit or scope of the invention. Thus, it is intended that the present invention cover the modifications and variations of this invention provided that they come within the scope of the appended claims and their equivalents.

What is claimed is:

1. A computer readable medium having a program for establishing and maintaining documented procedures to control documents, data and records sufficient to demonstrate conformance to specified quality standards requirements and establishing and maintaining the effective operation of a quality standards system including procedures for planning and implementing quality audits, said computer readable medium comprising:

a plurality of stored forms related to different business activities; and a plurality of program instructions including instructions configured to:

create a first document in response to the entry of data in a plurality of fields of a corresponding one of the plurality of forms, store the first document, list the identity of the first document, prior to approval, in a list of documents awaiting approval, list the identity of the first document in a master list of documents, display the first document to permit an operator to edit data in a first portion of the plurality of fields of the first document to create a current document, copy data contained in a second portion of the plurality of fields of the first document into corresponding fields of the current document together with data in the first portion of the plurality of fields to complete the current document, update the status of the first and current document, and indicate the storage of the first document upon a subsequent display of the current document to maintain an audit trail that includes a previous view of the first document.

2. The computer readable medium of claim 1 wherein the plurality of program instructions to update the first and current documents comprise instructions configured:

to remove the first document from the list of documents waiting approval, to list the identity of the current document in the list of documents waiting approval and the master list, and to remove any approval designations from the 2nd plurality of fields maintained in the current document.

3. The computer readable medium of claim 1 wherein the plurality of program instructions are configured:

to require the insertion of data in designated fields of the current document, and to prevent the storage of said current document without populating the designated fields.

4. The computer readable medium of claim 1 wherein the plurality of program instructions are configured to require that a field dedicated to the identification of a quality standard pertaining to the current document be populated as a condition precedent to storing the current document.

5. The computer readable medium of claim 3 wherein the plurality of program instructions are configured: to include instructions to identify in a viewable list selected fields other than said designated fields lacking the entry of data.

6. The computer readable medium of claim 4 further comprising:

an identification and traceability matrix of quality standard requirements;

wherein the plurality of program instructions include instructions to identify documents and related quality standard requirements, and instructions to associate the related requirement with the document while said document is waiting approval.

7. The computer readable medium of claim 1 wherein the second portion of the plurality of fields of the first and current documents each include a portion having fields dedicated to entry of data relating to security and revision control of the first and current documents.

8. The computer readable medium of claim 1 wherein the instructions to update the status of the current document include designating draft status in text on the current document prior to final approval, and removing the draft status text upon final approval.

9. The computer readable medium according to claim 1 wherein the one of the stored plurality of forms is a form dedicated to documenting critical computer procedures and critical computer systems used in the business activity, said form, comprising:

a first field requiring entry by an operator of a short description of said one of the critical computer process and system with which the form is concerned:

a second field dedicated to entry by an operator of data indicating whether or not the one of the process and system would be able to be recovered in the event of a catastrophic occurrence;

a third field dedicated to required entry of a time period to recover the process and system;

a fourth field requiring entry by the operator of reasons why one of the process and system is non-recoverable for the time period entered in the third field;

instructions configured to prevent the document from being stored in the medium in the absence of data in the third field; and instructions to prevent the document from being stored in the absence of data in the fourth field when non-recoverable is entered in the second field.

10. The computer readable medium according to claim 1 wherein the current document is an agenda of a meeting relating to the activity, the current document, comprising:

a first field populated by data entered by the operator identifying the sponsoring department;

a second field populated by data representing a title for the meeting;

a third field populated by data entered by the operator identifying the names of the persons attending the meeting;

a fourth field populated by a name from the username field at sign in; and a fifth field populated by data from the second field; and a plurality of free form text fields populated by the operator with data describing the issues, comments and business of the meeting; and wherein the first document is minutes of the meeting.

11. The computer readable medium according to claim 1 further comprising:

plurality of lists of created current documents and all previous documents as children of the current documents, said plurality of lists including a master list of stored documents, a list of stored documents awaiting approval, and a list of stored documents and quality standards requirements related to each respective document in the list.

12. A computer readable medium according to claim 1 wherein the plurality of program instructions comprise instructions, to remove entries relating to approval of the current: document subsequent to approval thereof and to add to the current document data indicating that the current document is a draft document in response to an instruction to unapprove the current document.

13. A computer readable medium according to claim 1 wherein the first and current documents constitute a personnel job description form.

14. The computer readable medium according to claim 1, wherein the plurality of instructions is a vehicle to demonstrate conformance with quality standards requirements.

15. A computer implemented method for establishing and maintaining documented procedures to control all documents and data to demonstrate conformance to specified requirements and the effective operation of a quality system including procedures for planning and implementing quality audits, comprising:

storing a plurality of forms, each having a plurality of fields, when populated to create documents relating to a particular organizational activity by entering appropriate data in arranged fields of the form, entering data in one of the plurality of forms to create a first document;

storing the first document in memory;

identifying an approval status of the first document;

displaying the first document;

entering data in at least one of a first plurality of fields of the first document to create a current document;

maintaining in the current document data populating at least one of a second plurality of the fields in the first document to complete the current document;

linking the first and current document with the first document being a child of the current document;

updating approval status of the first document and providing a document approval status to the current document; and indicating existence of the first document when displaying the current document to generate an audit trail of the current document.

16. The computer implemented method of claim 15 wherein the updating of the first document and providing approval status to the current document comprise:

removing the first document from a list of documents waiting approval, and listing the identity of the current document in the list of documents waiting approval.

17. The computer implemented method of claim 16 wherein the updating of the current document further comprises:

identifying the current document as a draft document when displayed as a document needing approval and including the document in a list of documents waiting approval.

18. The computer implemented method of claim 9 comprising:

requiring the population of designated fields of the displayed current document, and preventing the storage of said current document at times when the designated fields in the displayed form are unpopulated.

19. The computer implemented method of claim 18 comprising:

identifying in a viewable list selected fields, other than the designated fields, lacking data.

20. The computer implemented method of claim 15 further comprising populating a selected field of the current document with selected requirements of a quality standard to relate the document to the requirements.

21. The computer implemented method of claim 15 further comprising associating documents with applicable quality standard requirements from a traceability matrix.

22. The method of claim 15 wherein the one of the stored plurality of forms is a form dedicated to documenting critical computer procedures or critical computer systems used in the business activity, said method comprising:

entering a short description of said one of the critical computer process and system with which the stored form is concerned:

entering an indication of whether or not the one of the process and system would be able to be recovered in the event of a catastrophic occurrence;

entering a time period to recover the process and system;

entering an explanation of why one of the process and system is non-recoverable for the time period entered in the third field;

preventing the document from being stored in the medium in the absence of data in the third field; and preventing the document from being stored in the absence of data in the fourth field when non-recoverable is entered in the second field.

23. The method of claim 15 wherein the current document is an agenda of a meeting relating to the activity, the method comprising:

entering data identifying the sponsoring department;

entering data representing a title for the meeting;

entered data identifying the names of the persons attending the meeting;

entering a name from a username field at sign in;

entering the data populating the second field; and entering data in free form text with data describing the issues, comments and business of the meeting; and wherein the first document is-minutes of the meeting.

24. A method according to claim 15 comprising:

creating a plurality of lists of created current documents and all previous documents as children of the current documents, said creating of the plurality of lists including: lists creating a master list of stored documents, creating a list of stored documents waiting approval, and creating a list of stored documents with ISO standards clauses related to each respective document in the list.

25. A method according to claim 15 comprising:

removing entries relating to approval of the current document subsequent to approval thereof and adding to the current document data indicating that the current document is a draft document in response to an instruction to unapprove the current document.

\* \* \* \* \*